(12) United States Patent
Iijima

(10) Patent No.: US 6,909,479 B2
(45) Date of Patent: Jun. 21, 2005

(54) LIQUID CRYSTAL DISPLAY DEVICE AND ELECTRONIC APPARATUS

(75) Inventor: Chiyoaki Iijima, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/006,660

(22) Filed: Dec. 10, 2001

(65) Prior Publication Data

US 2002/0154257 A1 Oct. 24, 2002

(30) Foreign Application Priority Data

Dec. 22, 2000 (JP) .......................................... 2000-390419
Jun. 21, 2001 (JP) .......................................... 2001-188179
Oct. 19, 2001 (JP) .......................................... 2001-322670
Nov. 30, 2001 (JP) .......................................... 2001-367090

(51) Int. Cl.[7] .......................................... G02P 1/1335
(52) U.S. Cl. ........................ 349/109; 349/106; 349/113; 349/114
(58) Field of Search ................................. 349/113, 106, 349/114, 109, 61, FOR 118

(56) References Cited

U.S. PATENT DOCUMENTS

| | | | | |
|---|---|---|---|---|
| 4,828,365 | A | * | 5/1989 | Stewart et al. .............. 349/109 |
| 6,084,650 | A | | 7/2000 | Sekiguchi |
| 6,124,909 | A | * | 9/2000 | Miyashita et al. ........... 349/109 |
| 6,707,519 | B1 | * | 3/2004 | Okumura et al. ............ 349/114 |

FOREIGN PATENT DOCUMENTS

| | | |
|---|---|---|
| JP | A-10-319386 | 12/1998 |
| JP | A-11-183891 | 7/1999 |
| JP | 11183892 | 7/1999 |
| JP | 2000019563 | 1/2000 |
| JP | 2000-111902 | 4/2000 |
| WO | WO 99/28782 | 6/1999 |

\* cited by examiner

Primary Examiner—Tom Thomas
Assistant Examiner—Matthew C Landau
(74) Attorney, Agent, or Firm—Oliff & Berridge, PLC

(57) ABSTRACT

The present invention provides a color transflective liquid crystal display that is capable of display with good coloring and high visibility in both a reflective mode and a transmissive mode while suppressing deterioration in color reproduction caused by unevenness of the spectral properties of the illumination light, if any. The liquid crystal display can include a liquid crystal display panel including pixels formed of a plurality of sub-pixels each corresponding to different colors, and an illumination device, wherein the liquid crystal display panel includes a transflective layer and a color filter of color corresponding to each of the sub-pixels. The transflective layer includes transmissive portions for transmitting illumination light, wherein the transmissive portion is formed such that the dimension of the transmissive area corresponding to the transmissive portion of at lease one sub-pixel out of the plurality of sub-pixels and the dimension of the transmissive area corresponding to the transmissive portion of another sub-pixel, differ.

28 Claims, 29 Drawing Sheets

[FIG. 4]
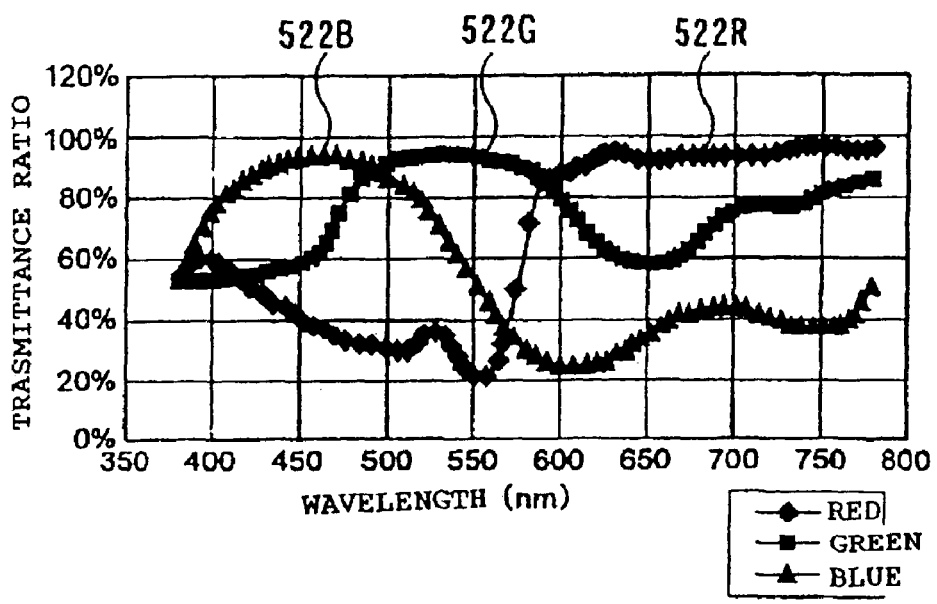
[FIG. 5]
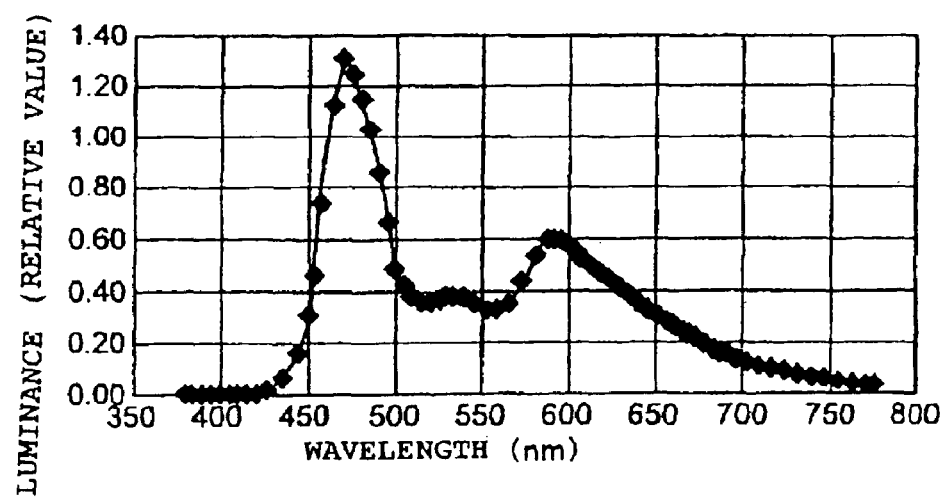

[FIG. 6]
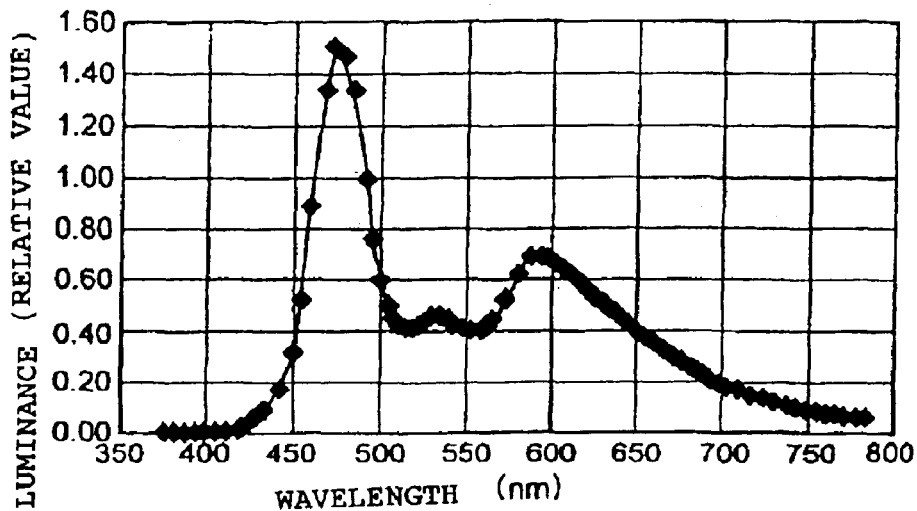
[FIG. 7]
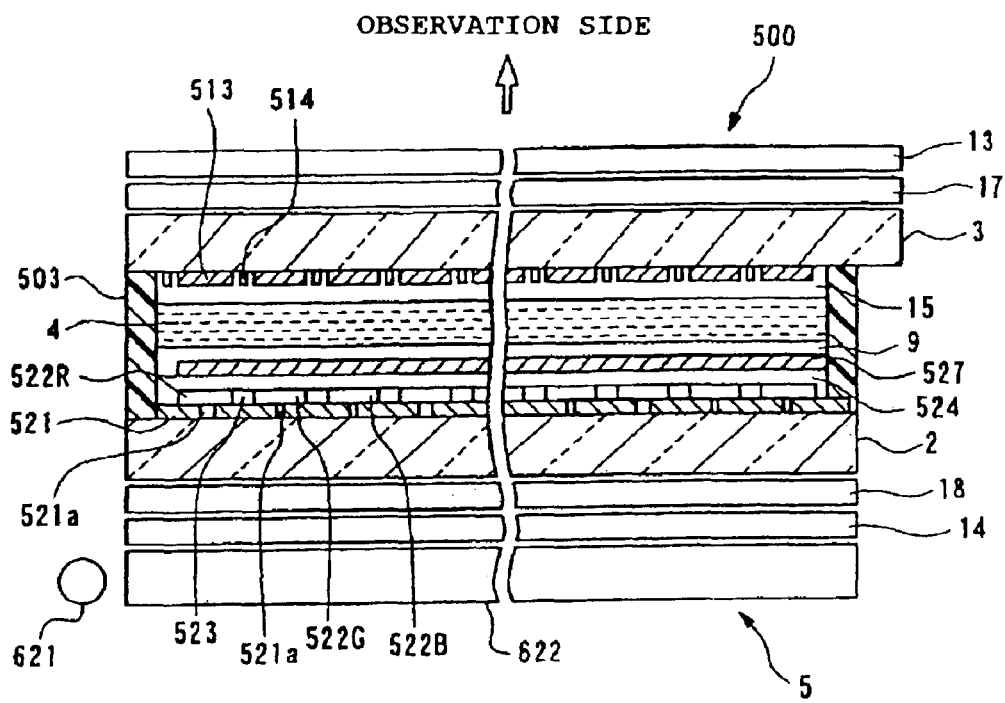

[FIG. 8]
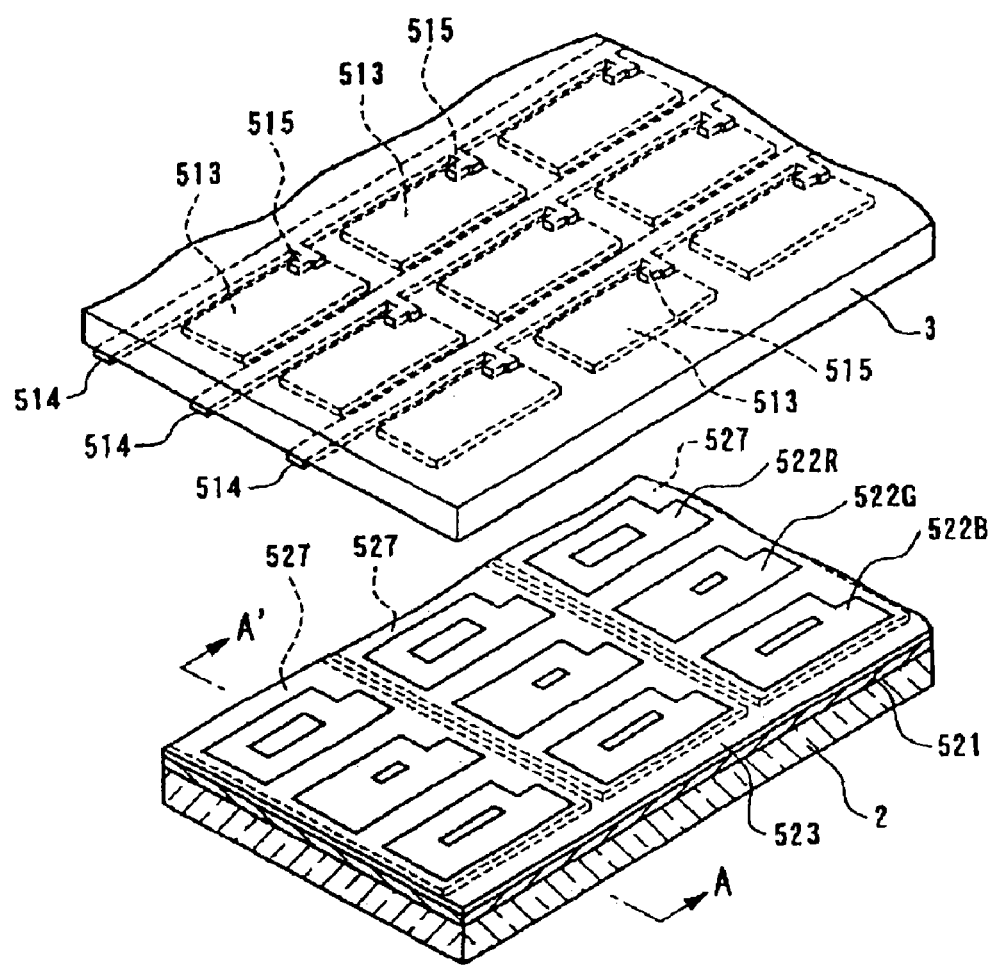

[FIG. 10]
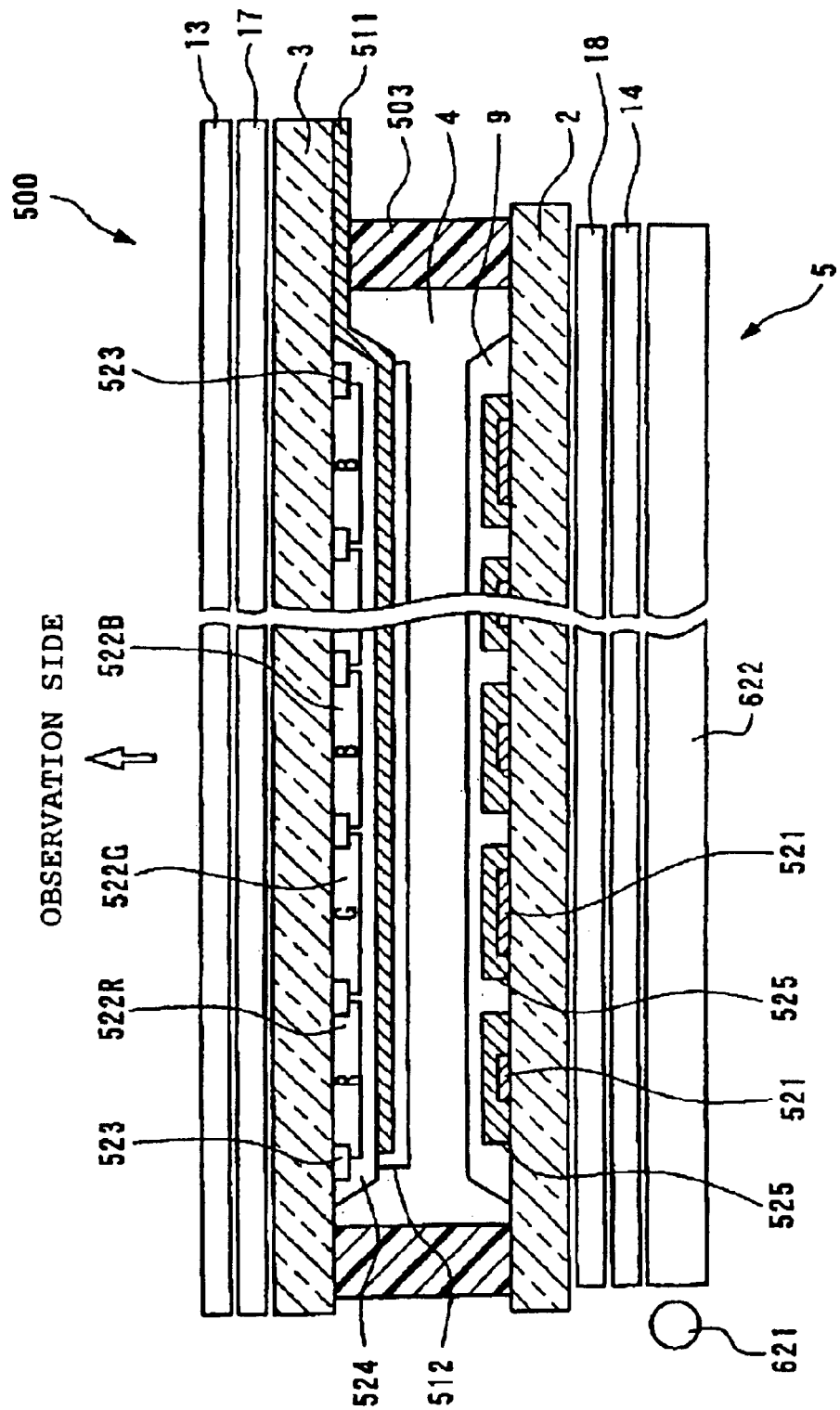

[FIG. 11]
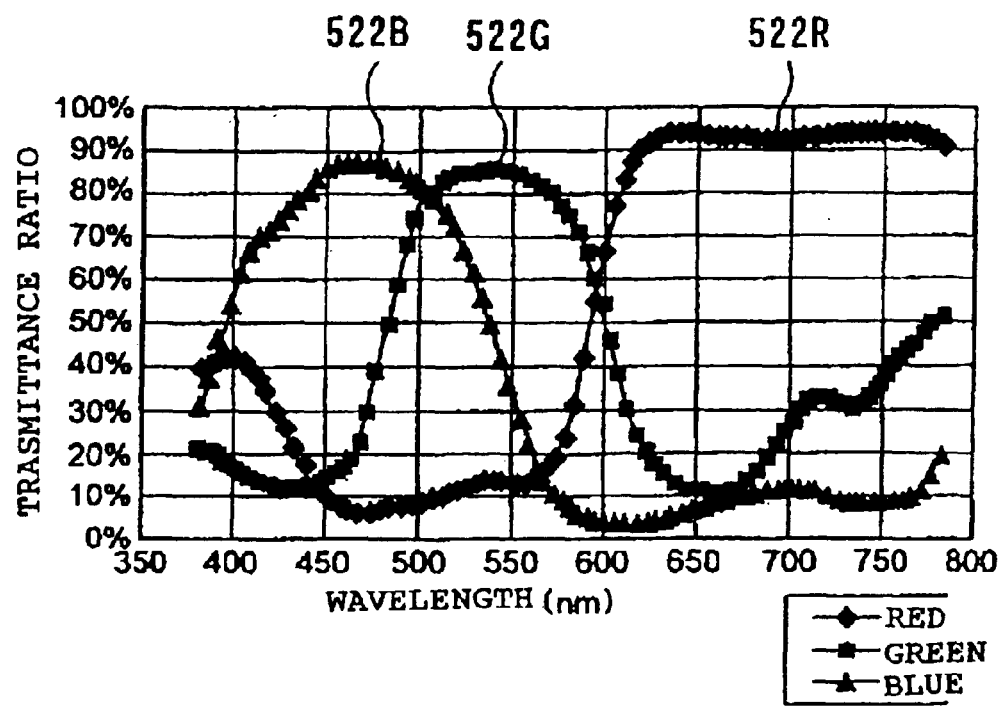

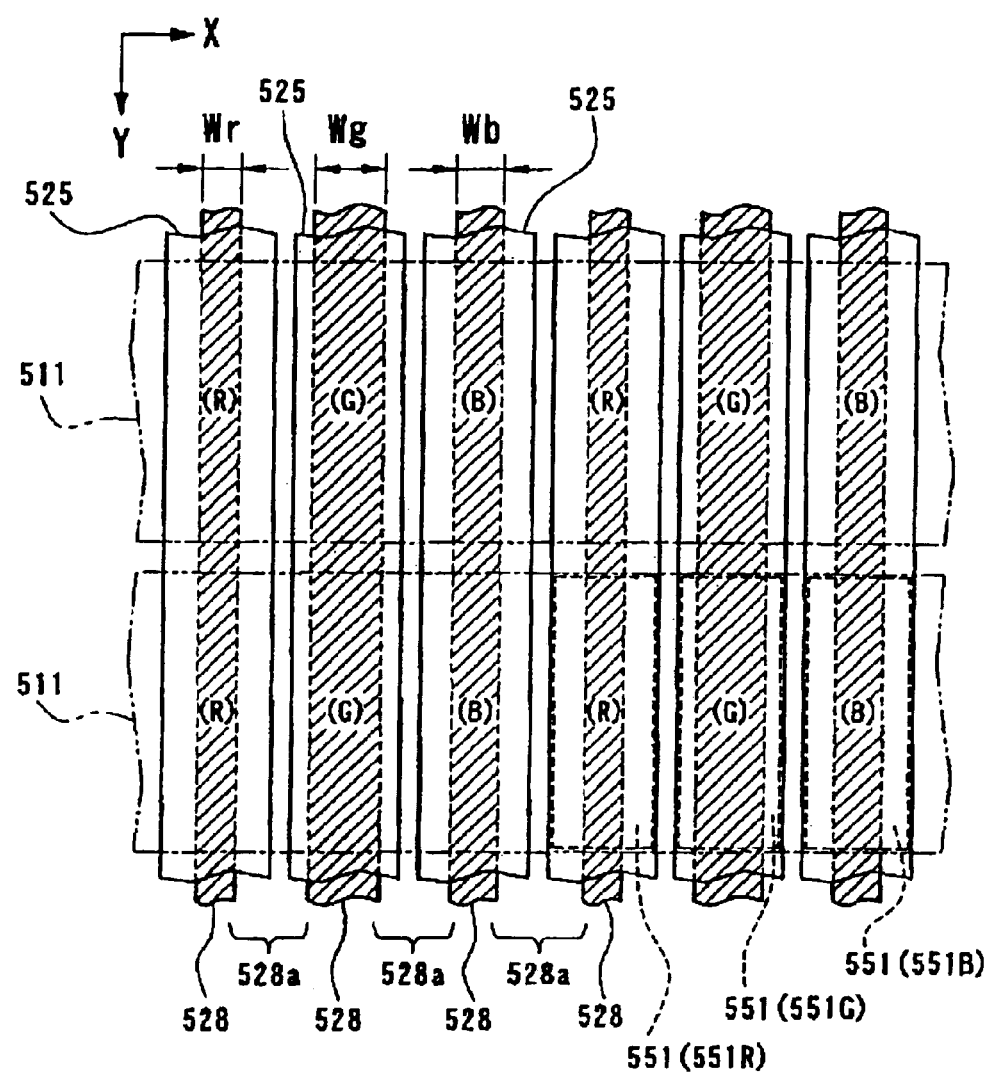
[FIG. 12]

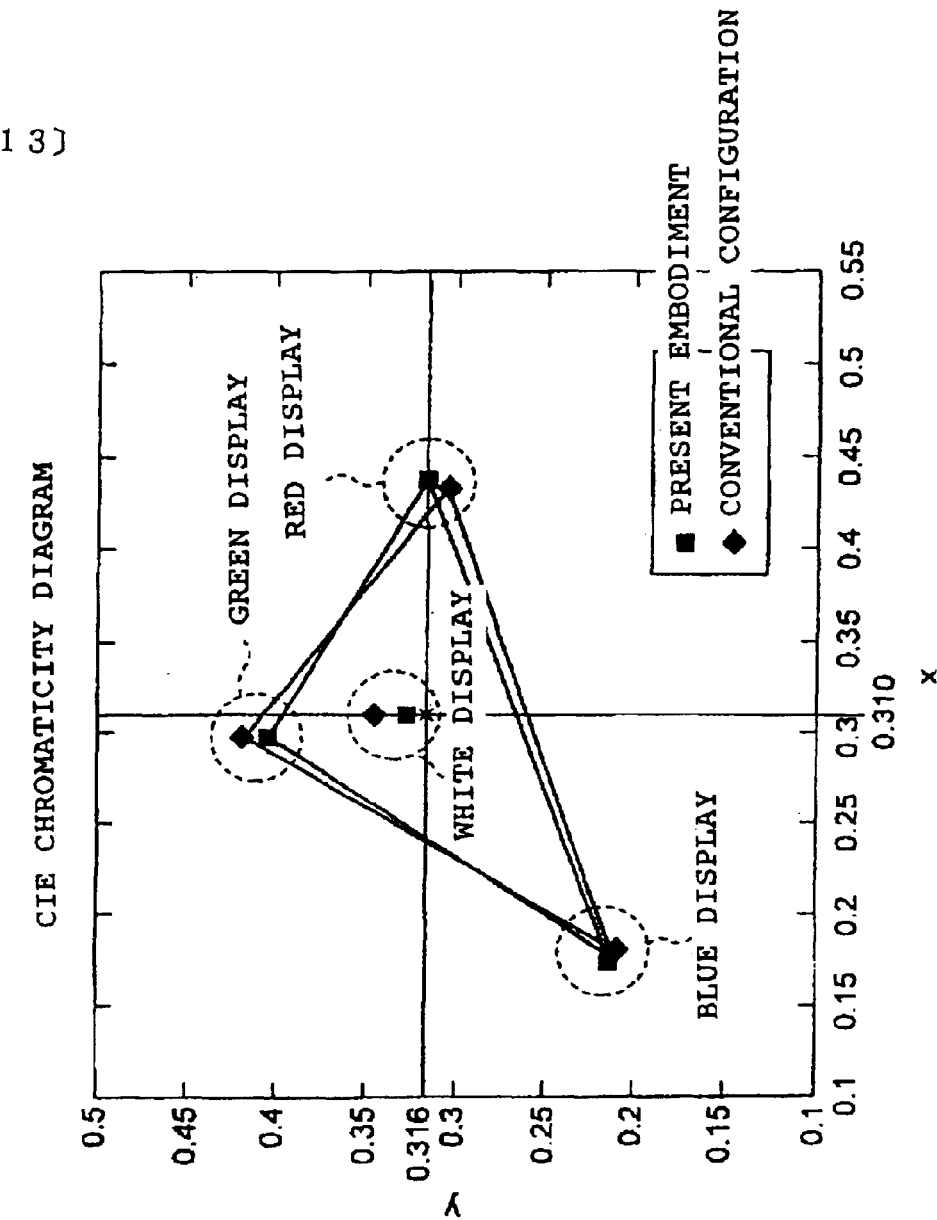
[FIG. 13]

[FIG. 14]
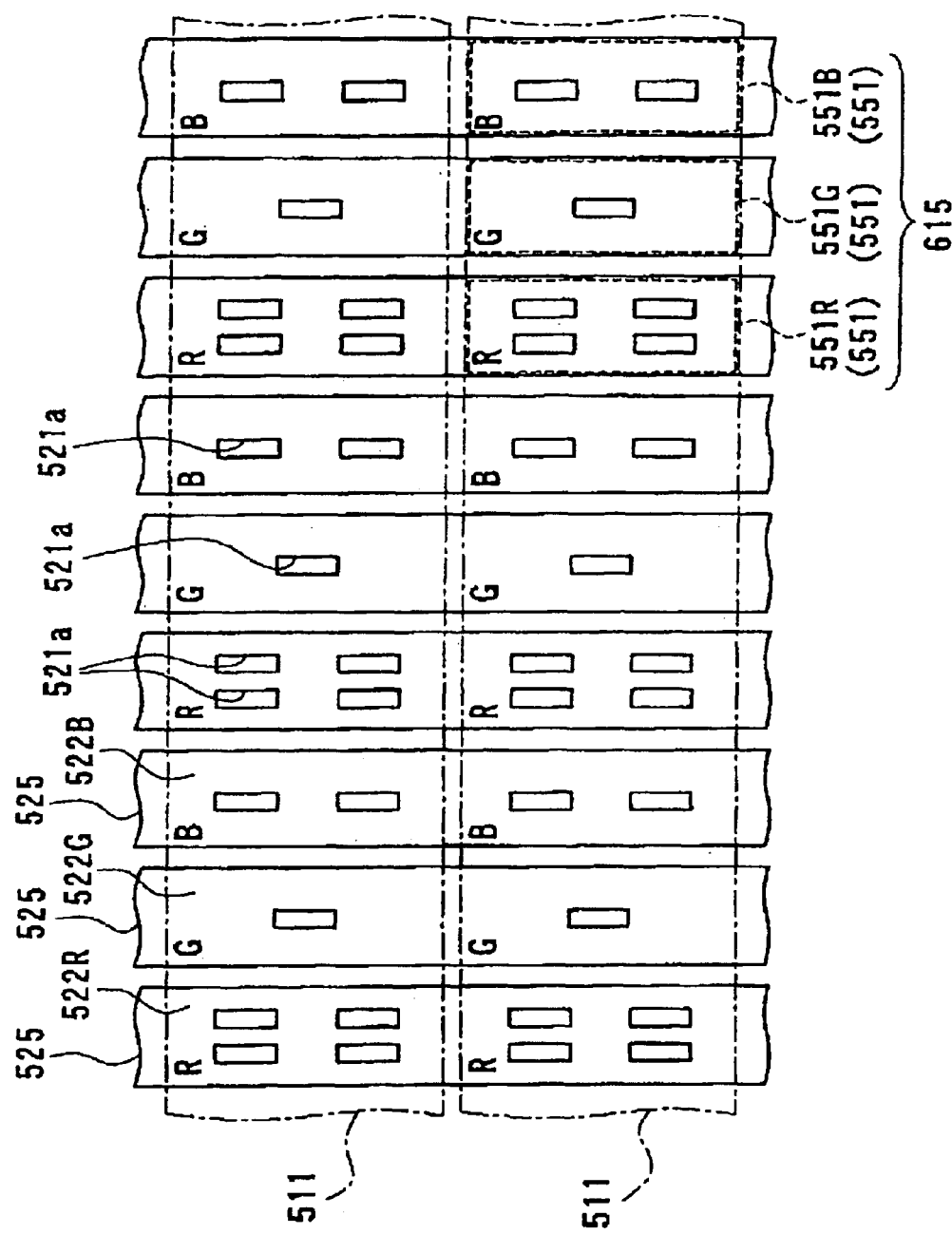

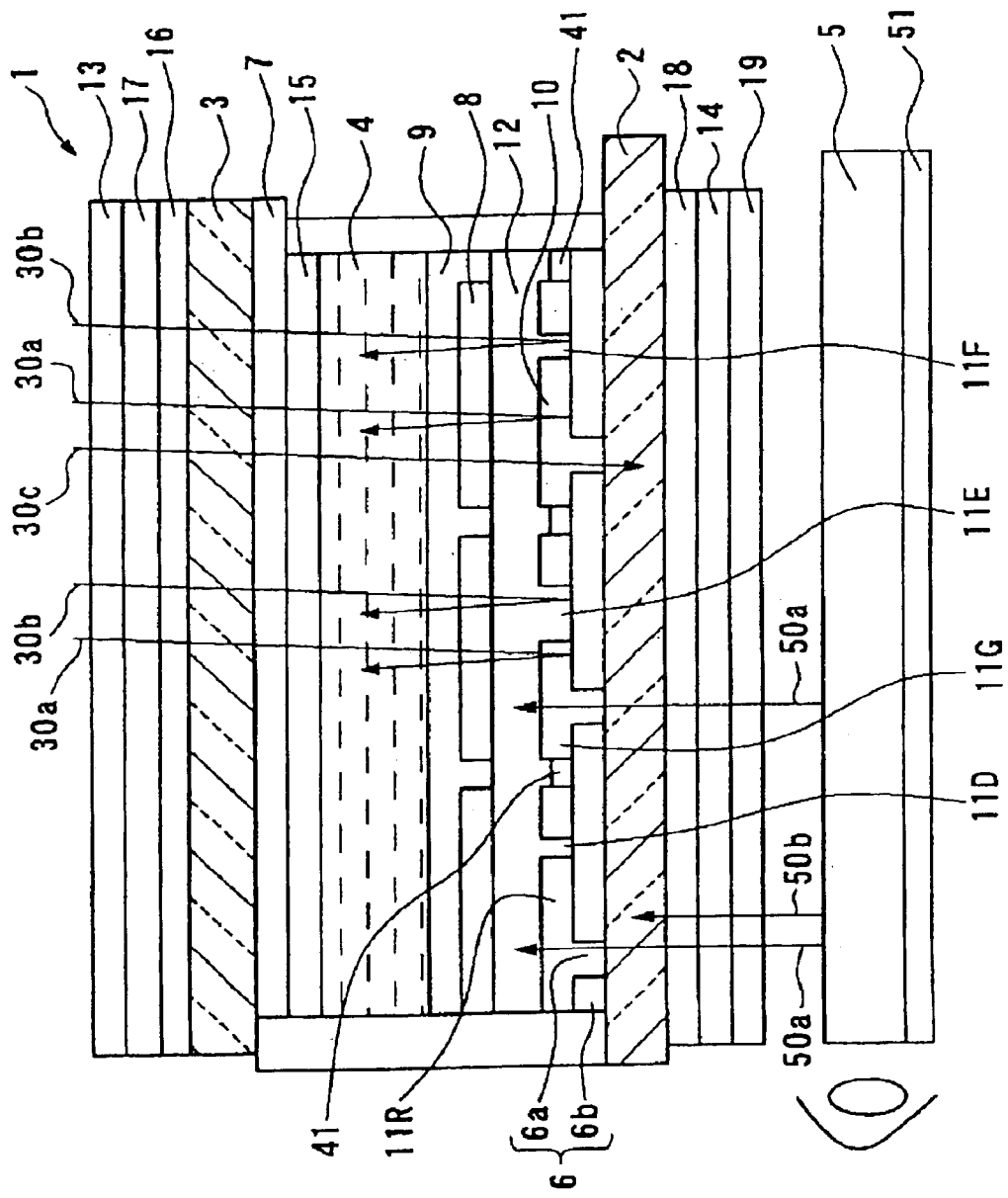
[FIG. 15]

[FIG. 16]
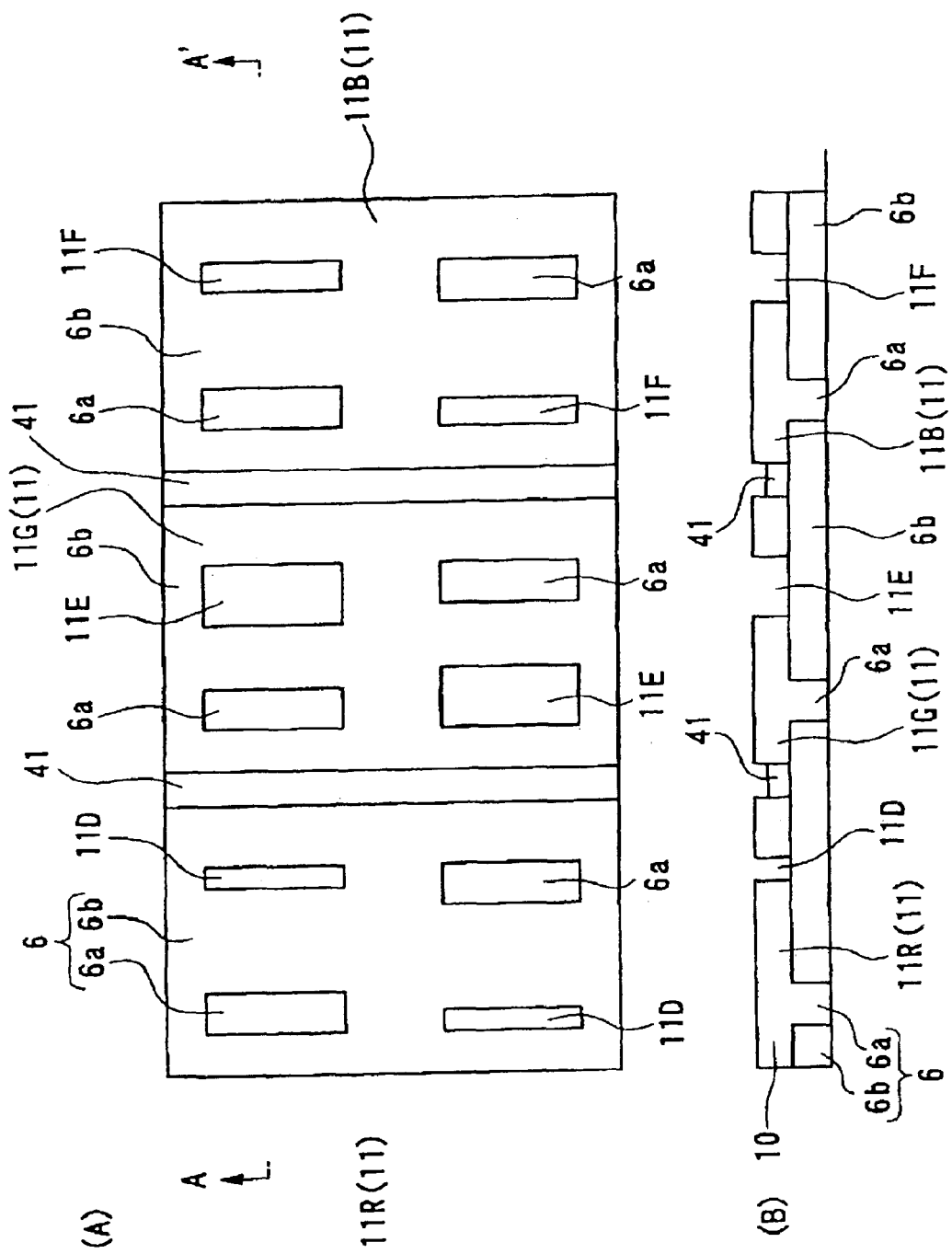

[FIG. 17]
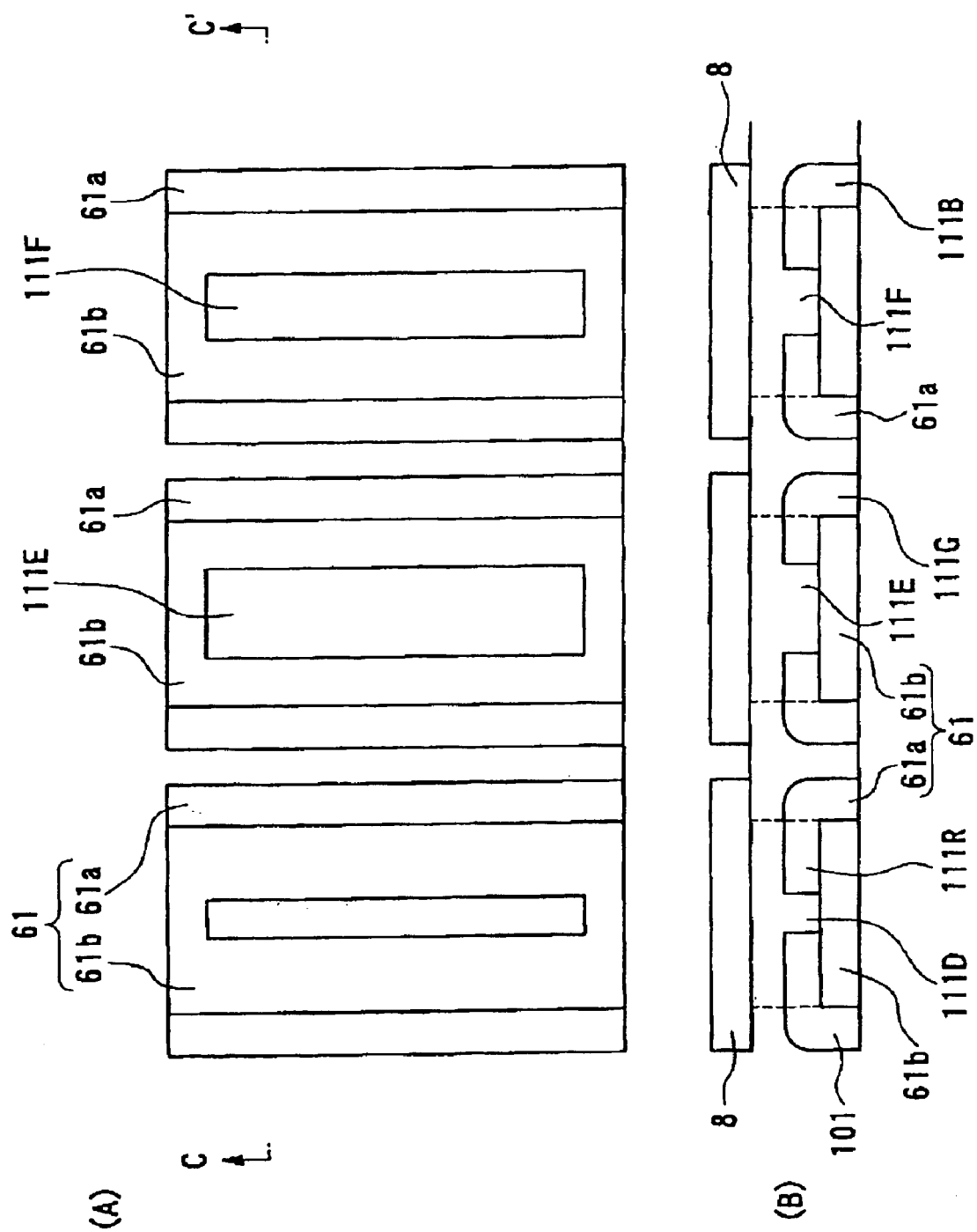

[FIG. 18]
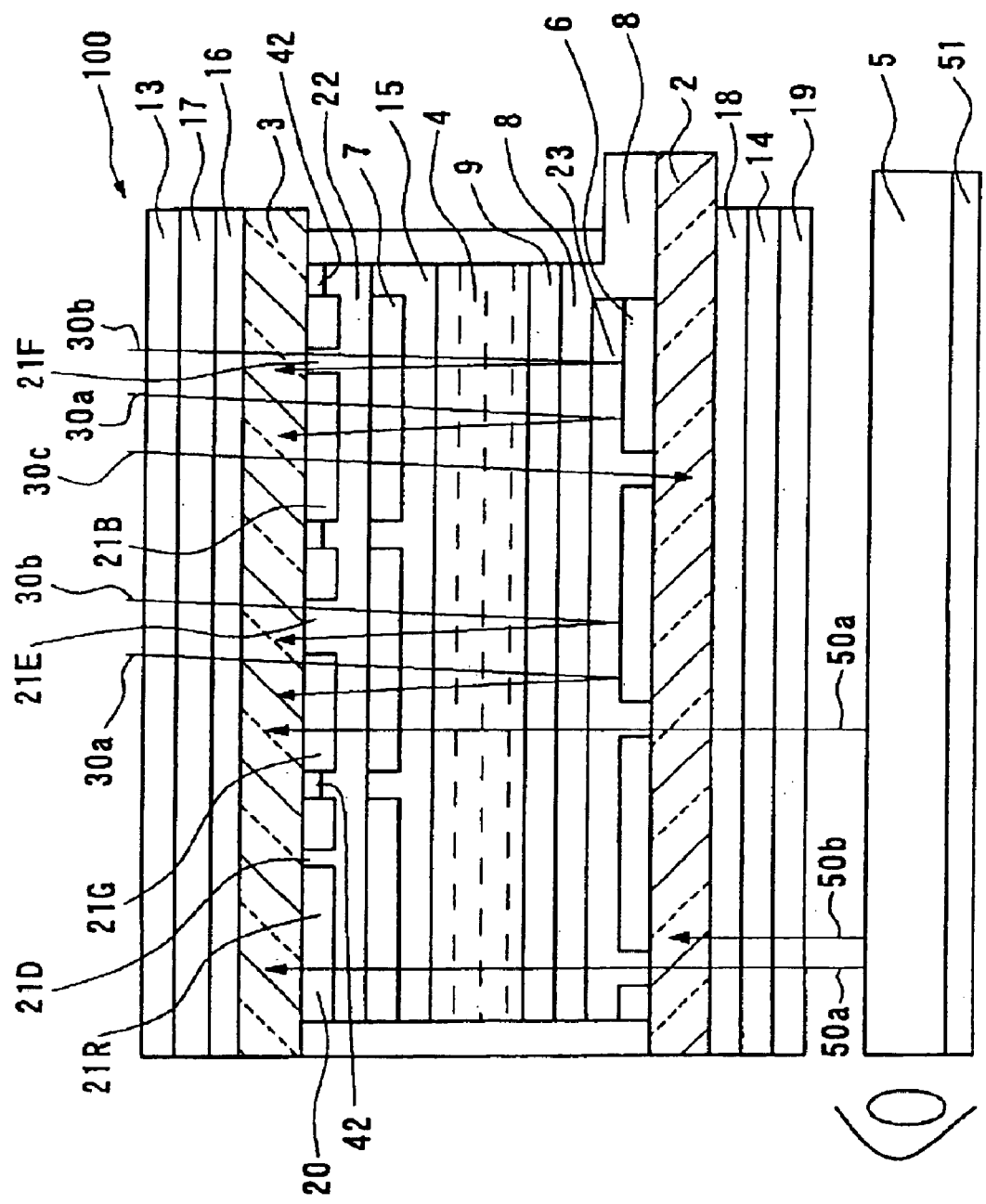

[FIG. 19]
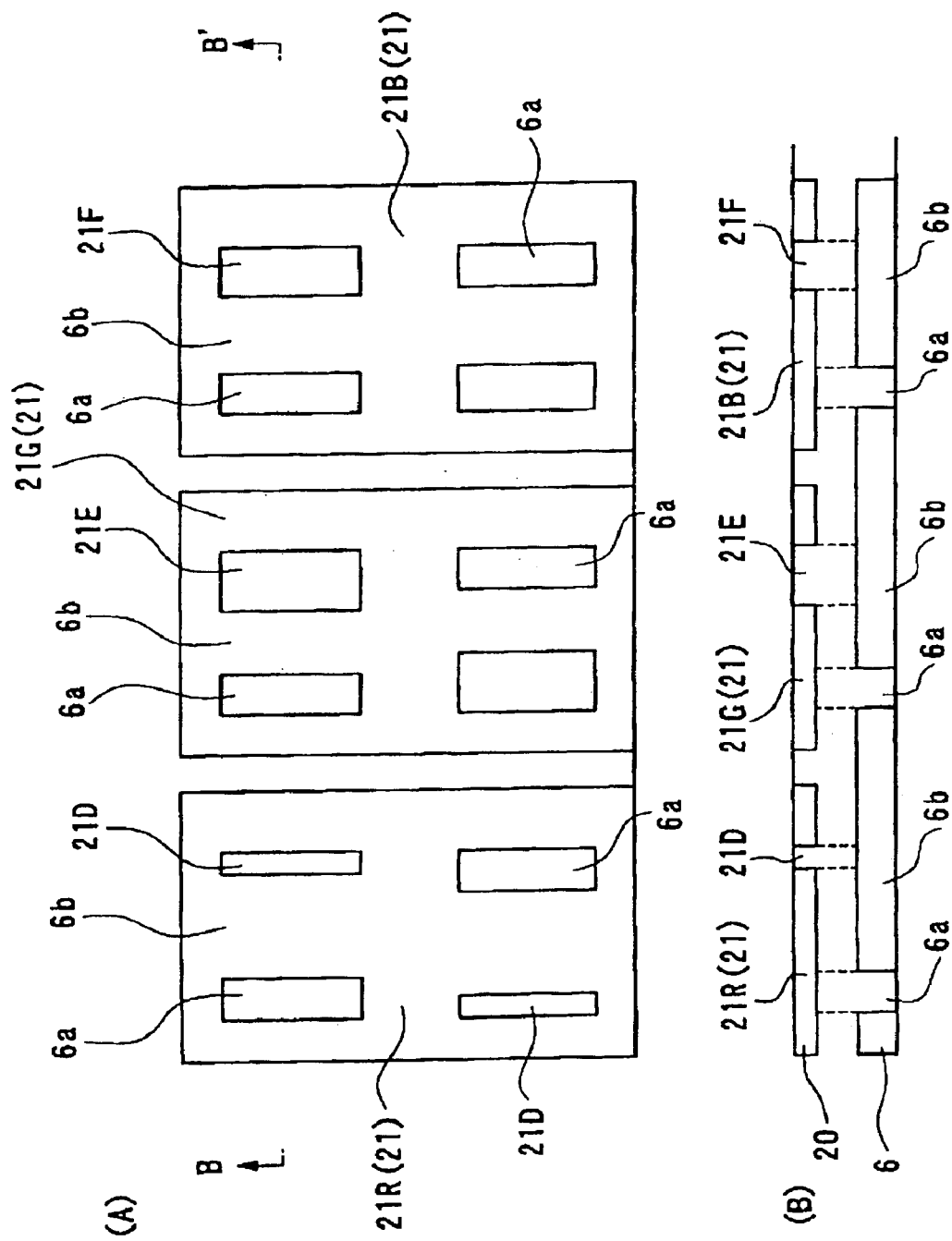

[FIG. 20]
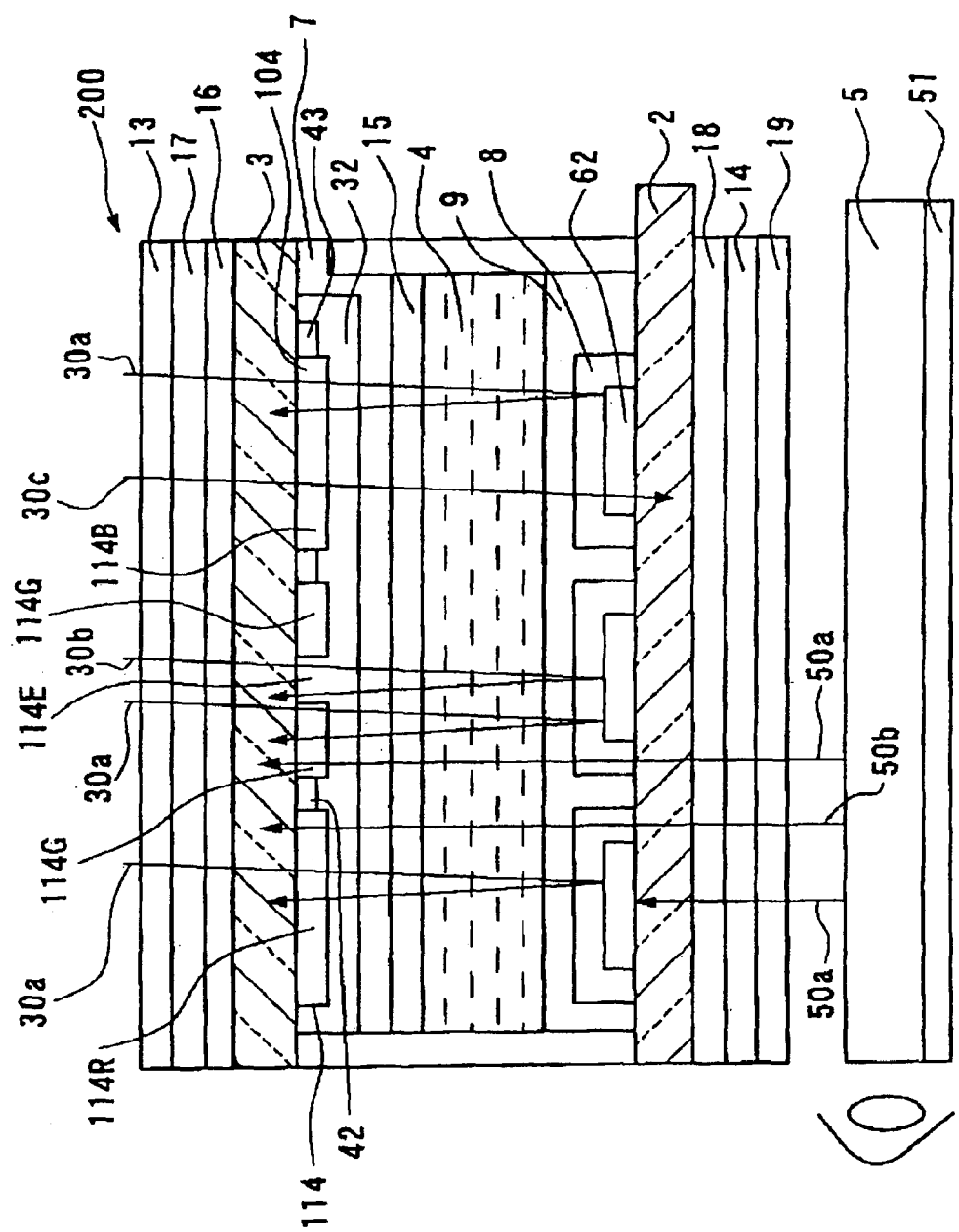

[FIG. 21]
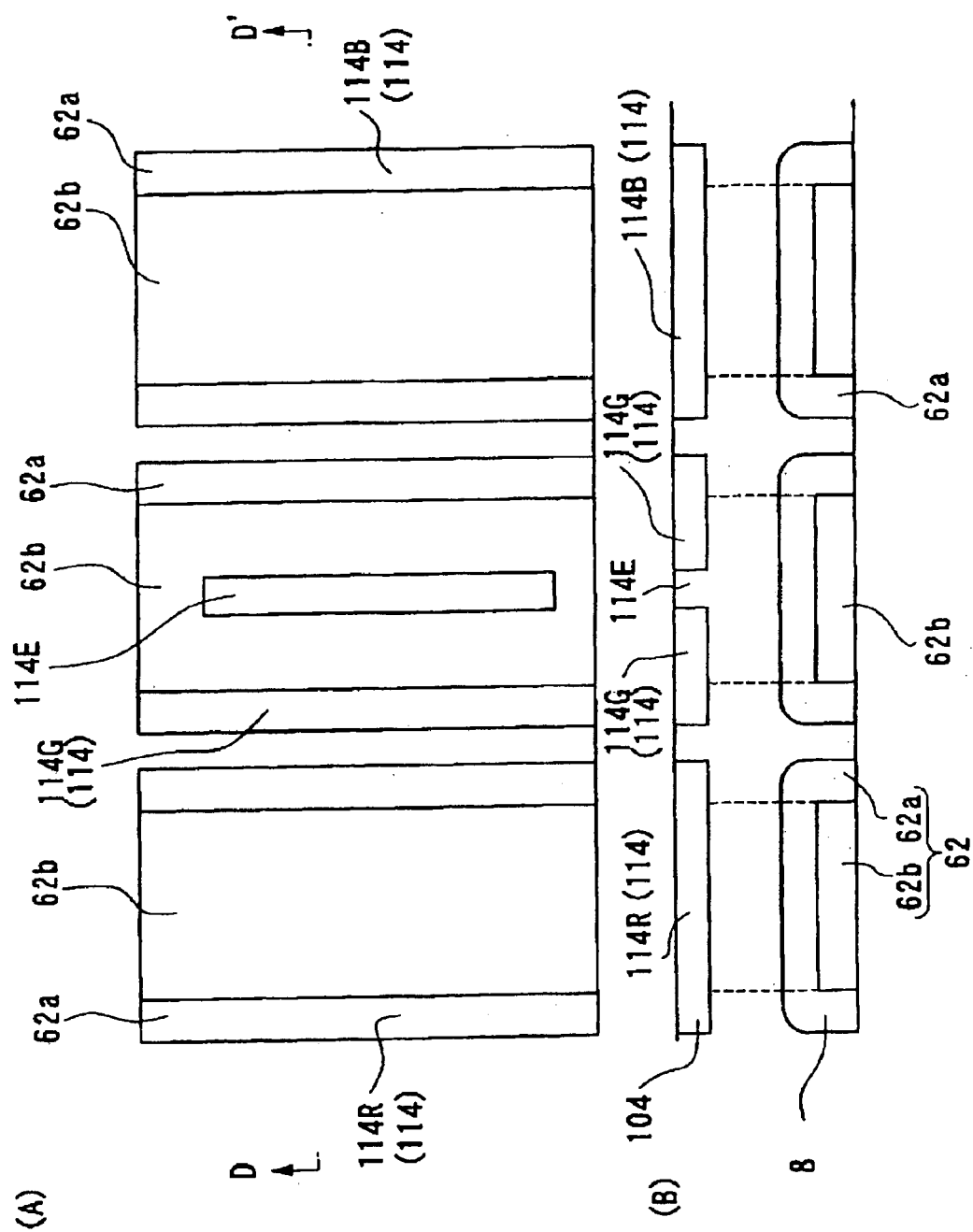

[FIG. 22]
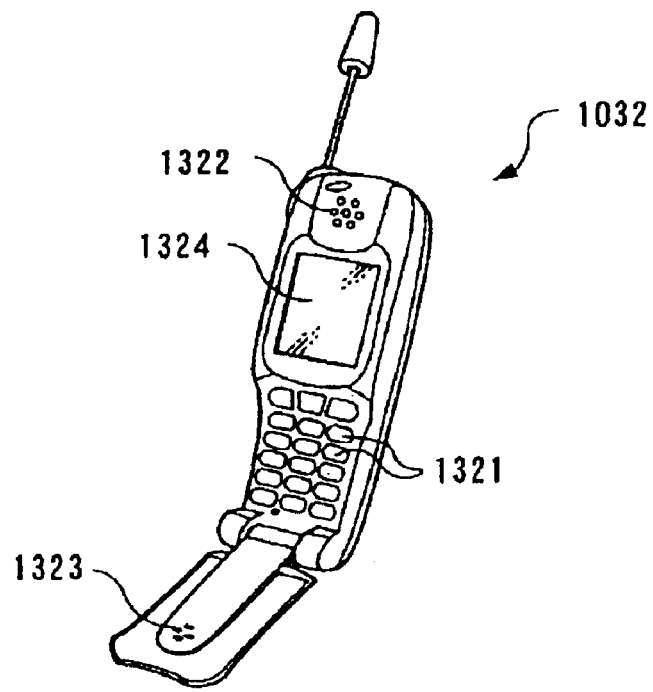
[FIG. 23]
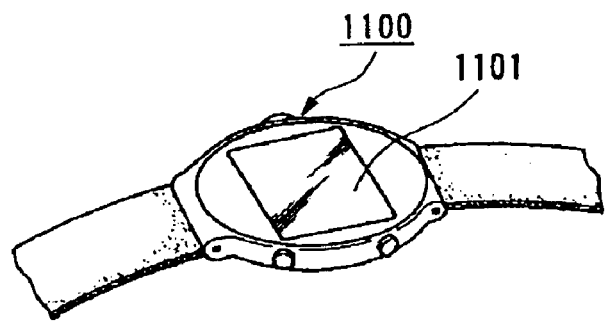
[FIG. 24]
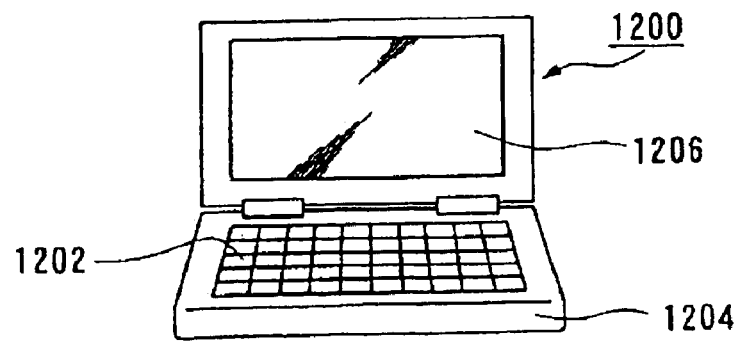

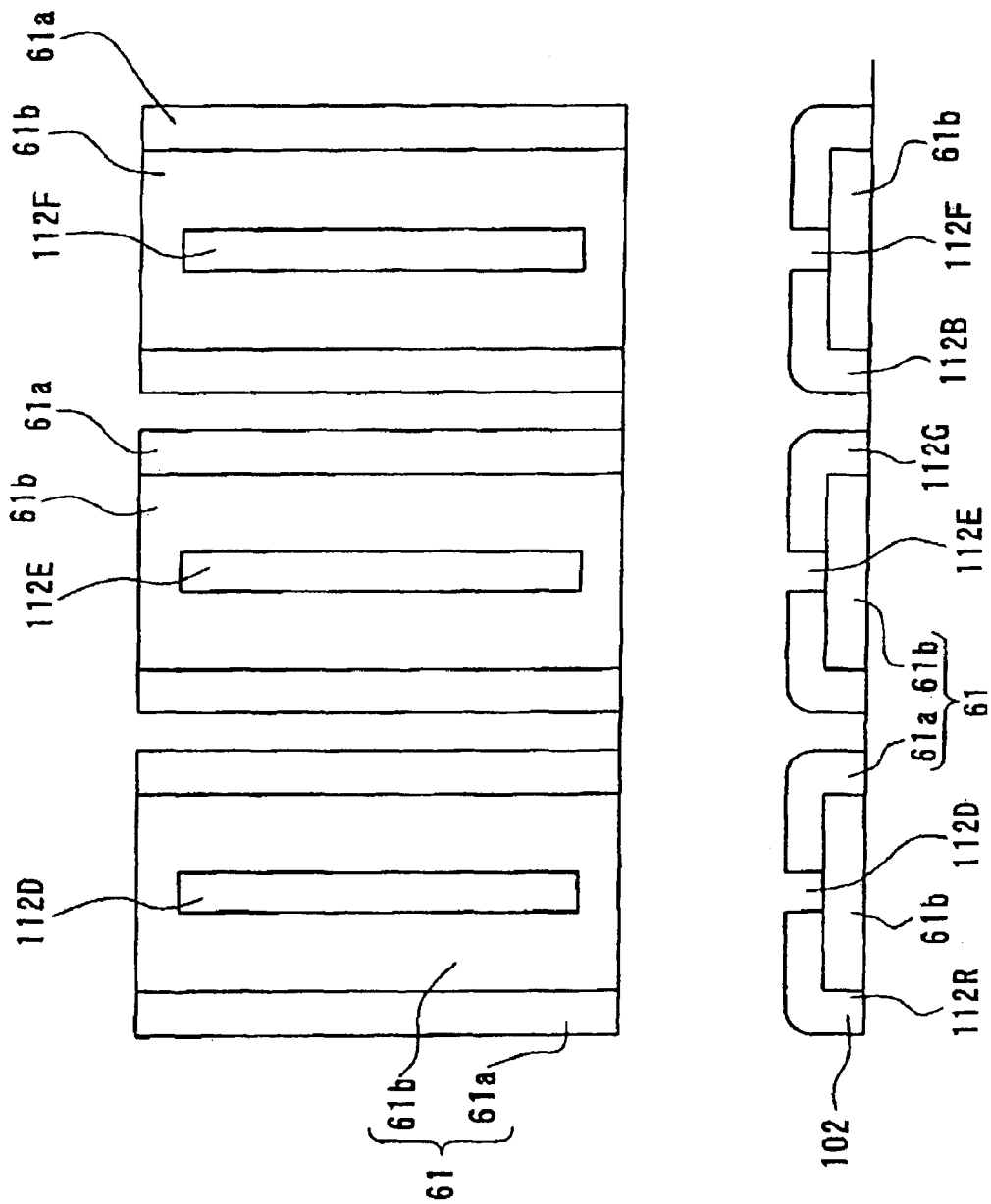
[FIG. 25]

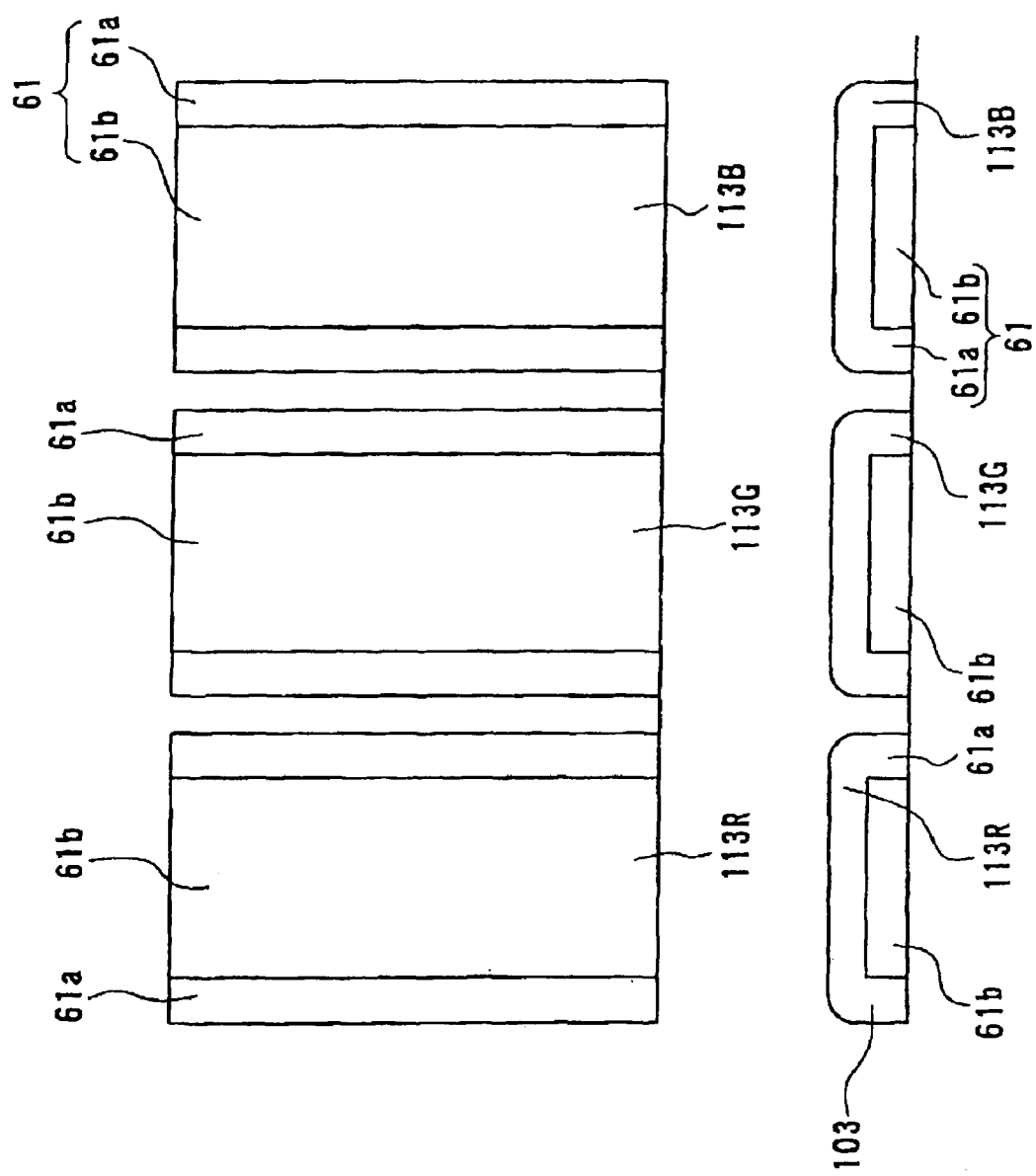
[FIG. 26]

[FIG. 27]
(A)
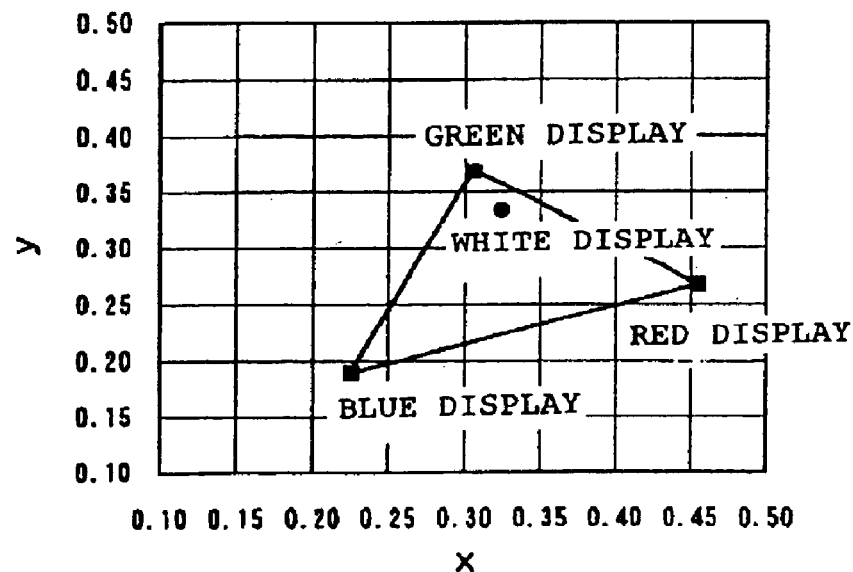
(B)
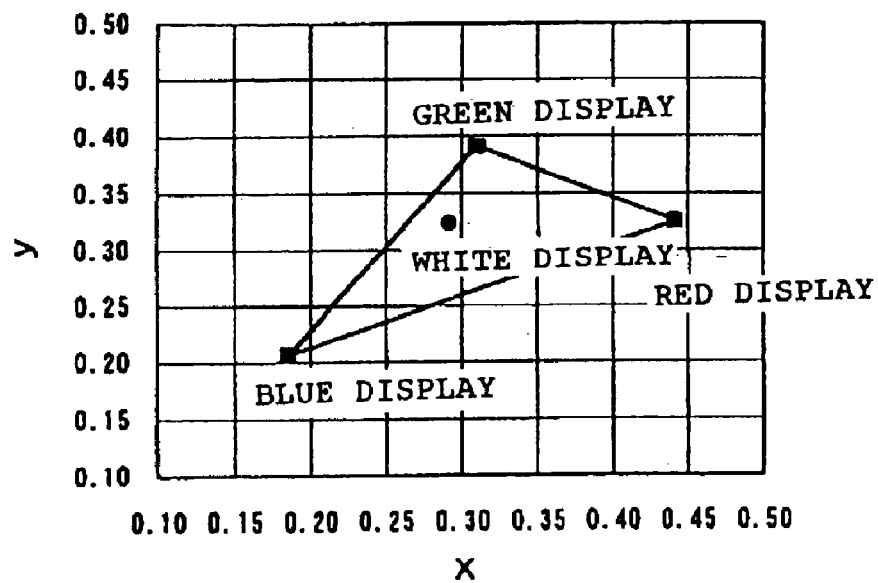

[FIG. 28]
(A)
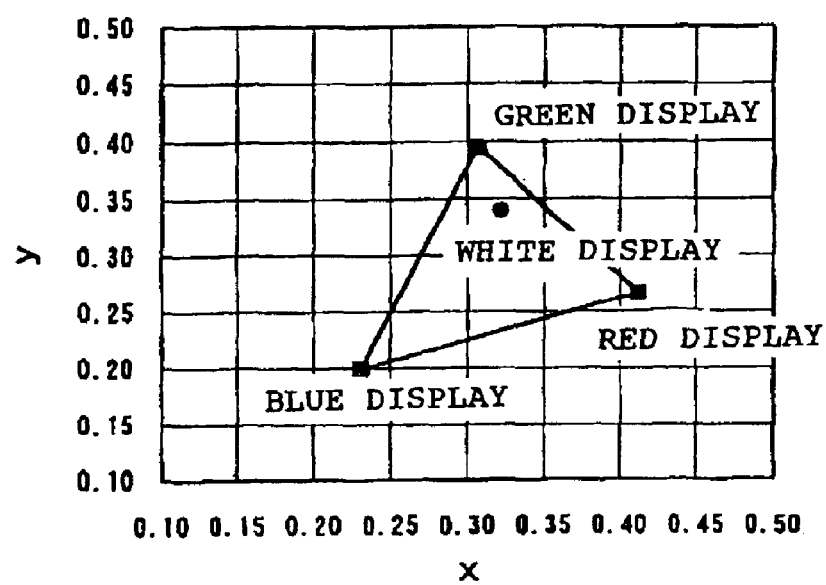
(B)
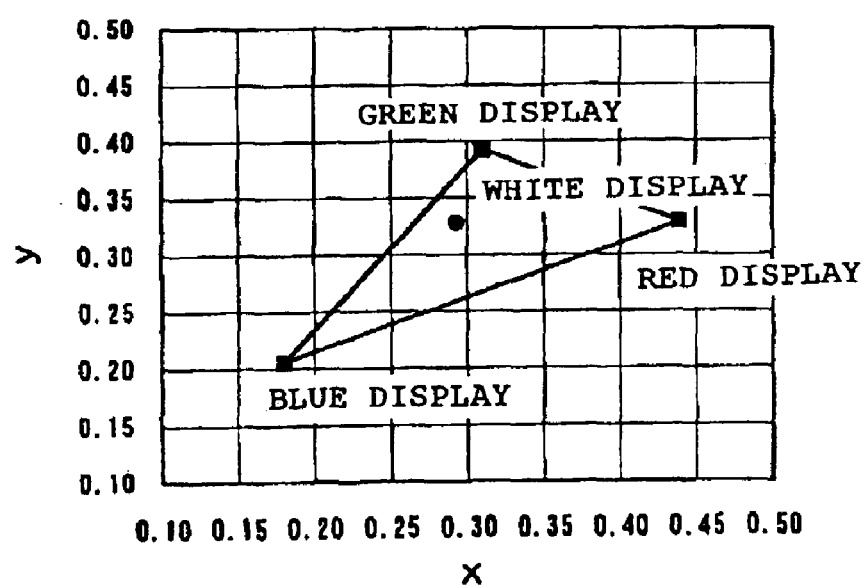

[FIG. 29]
(A)
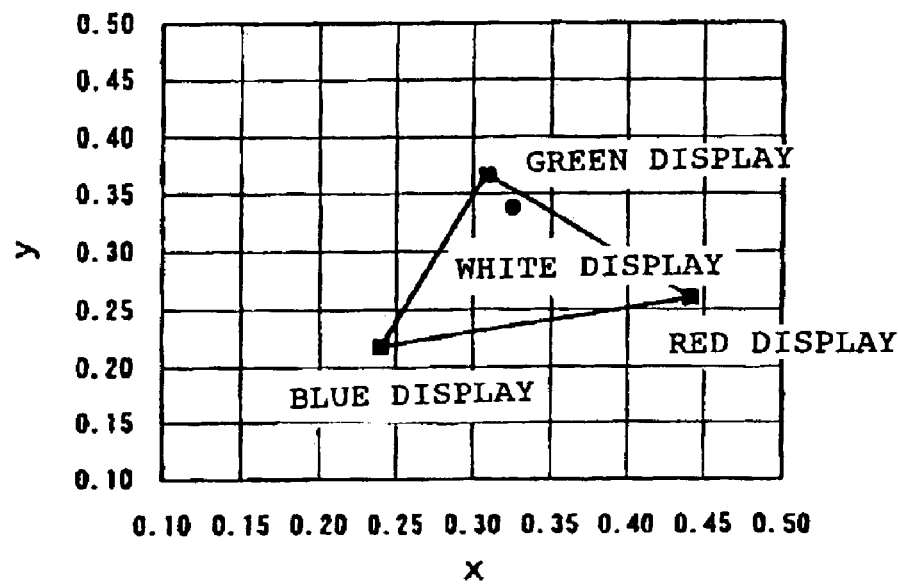
(B)
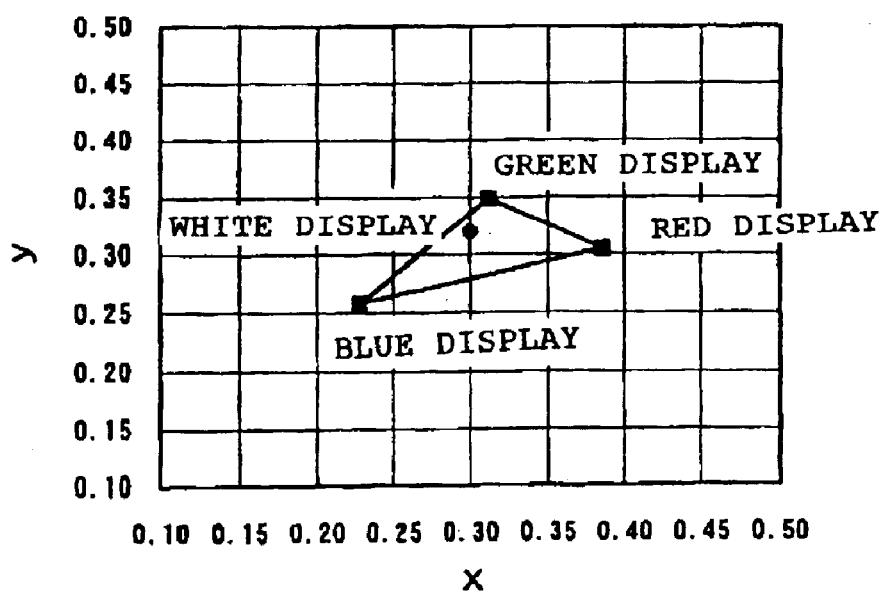

[FIG. 30]
(A)
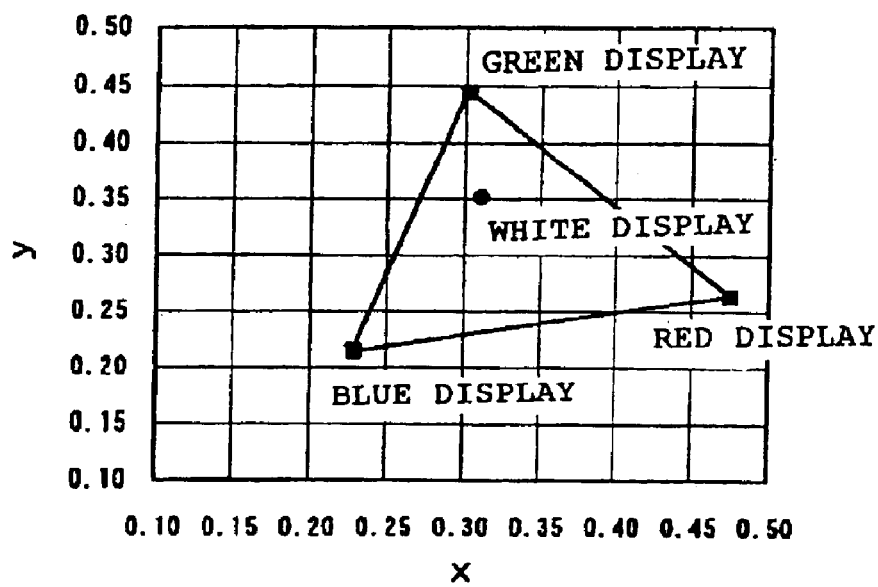
(B)
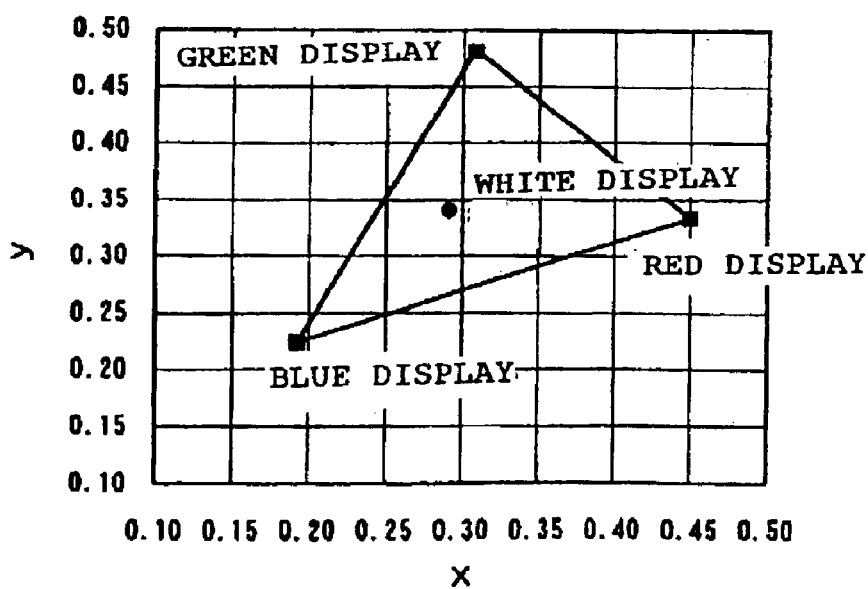

[FIG. 31]
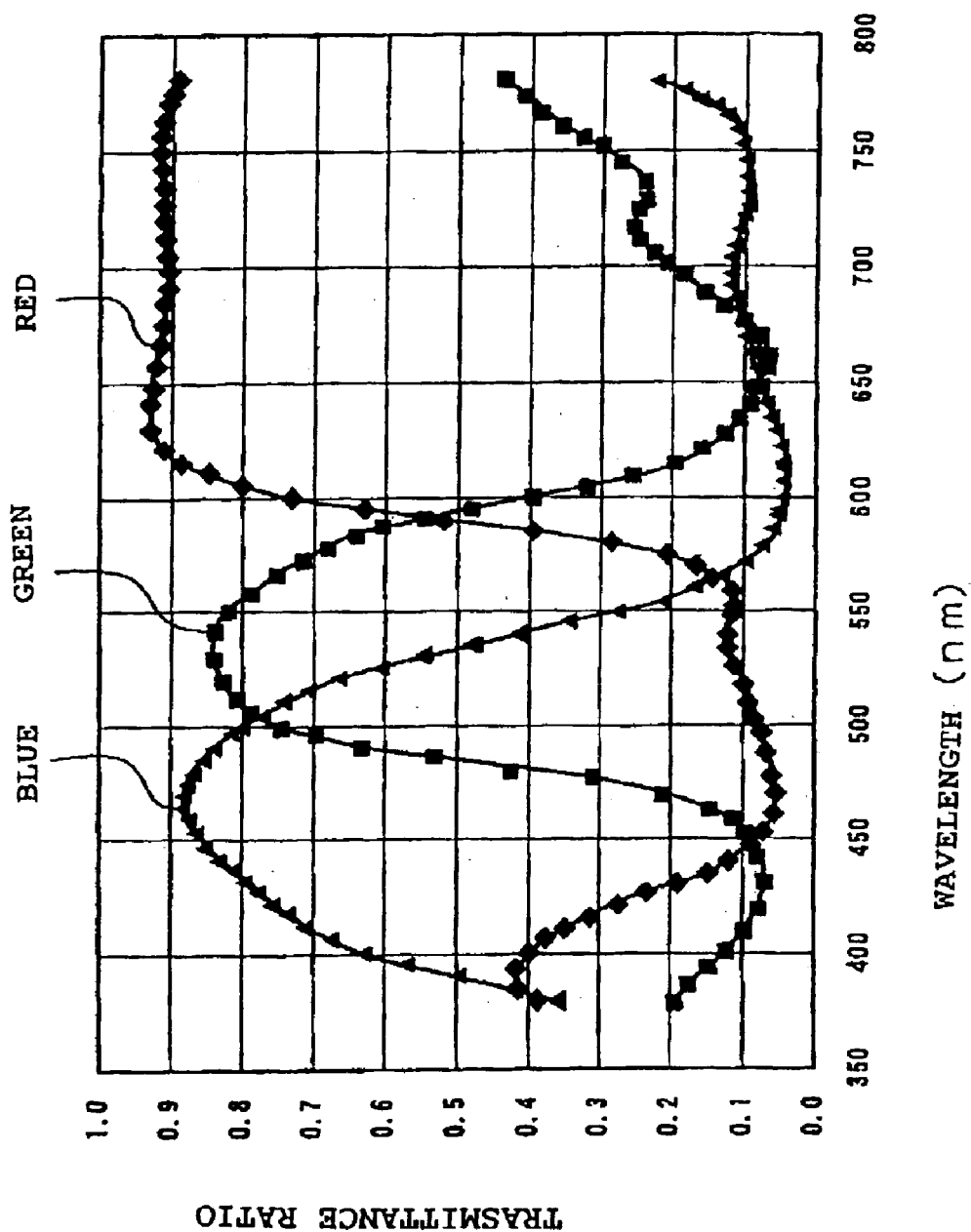

[FIG. 32]
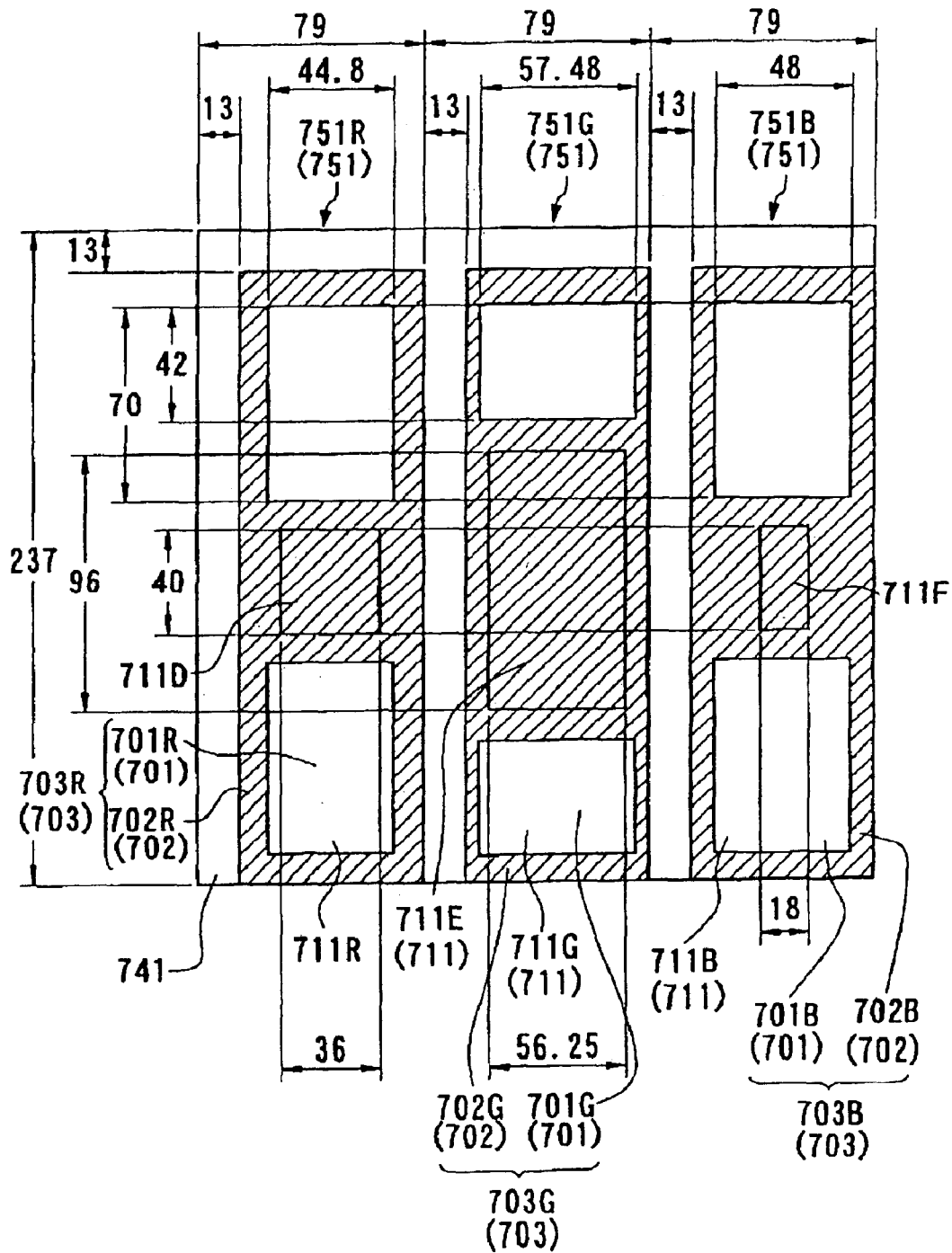

[FIG. 33]
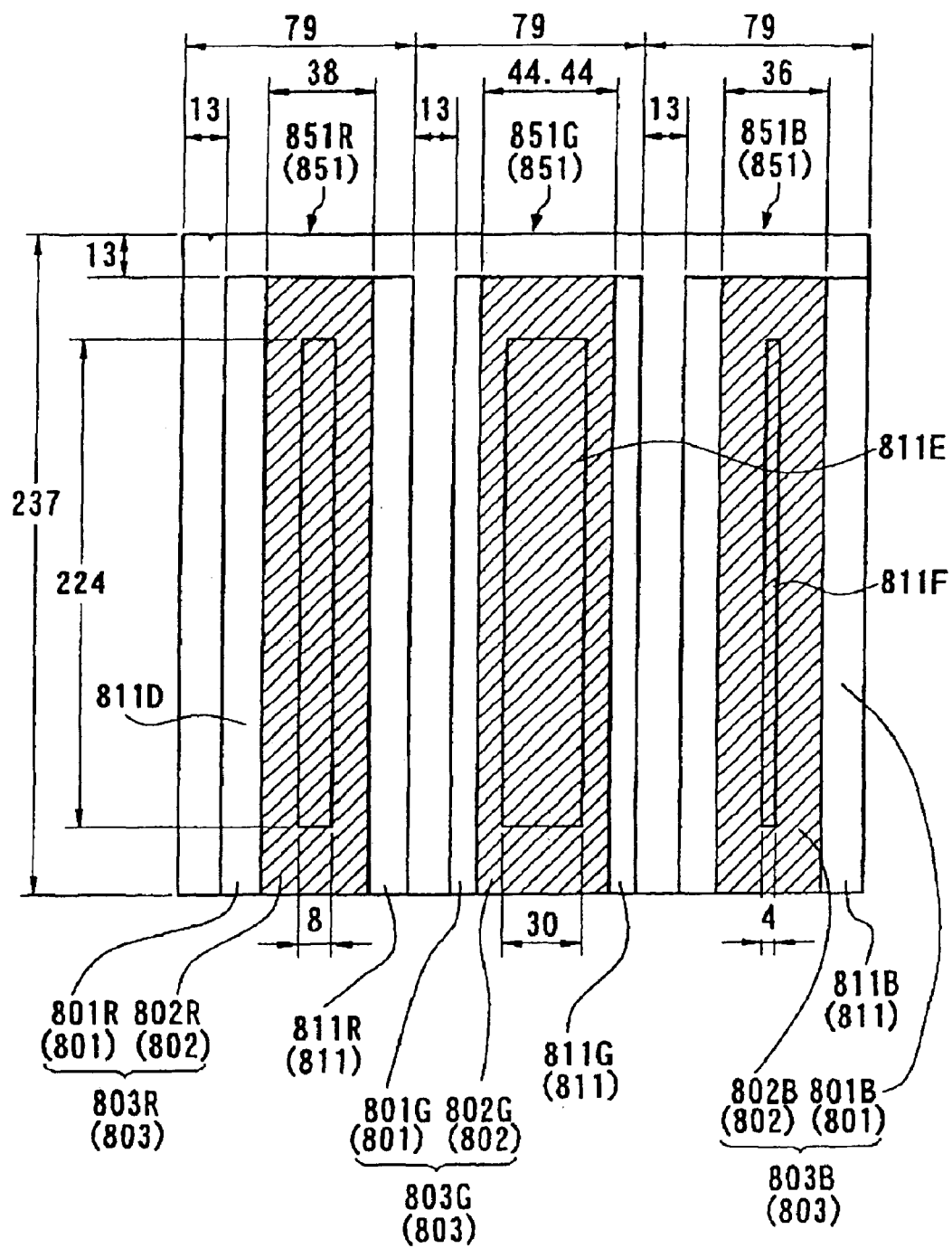

LIQUID CRYSTAL DISPLAY DEVICE AND ELECTRONIC APPARATUS

BACKGROUND OF THE INVENTION

1. Field of Invention

The present invention relates to a liquid crystal display and to electronic apparatus, and particularly relates to a transflective liquid crystal display capable of display with good coloring and high visibility in both reflective mode and transmissive mode, and also relates to an electronic apparatus using the same.

2. Description of Related Art

Currently, reflective liquid crystal displays are advantageous in that electric power consumption is low, since they do not have light sources such as back-lights, and have conventionally been widely used as accessory display units or the like for various types of mobile electronic apparatus and so forth. However, reflective liquid crystal displays use external light, such as natural light like sunlight, or illumination light, to perform display. Accordingly, reflective liquid crystal displays can suffer from the disadvantage that the display is not readily visually recognized in dark situations.

Accordingly, liquid crystal displays have been proposed wherein external light is used in bright situations in the same manner as with standard reflective liquid crystal displays, and an internal light source such as a back-light is used in dark situations so as to make the display visible. In other words, this liquid crystal displays employs a display method serving as both reflective type and transmissive type. The display method can be switched between a reflective mode and transmissive mode according to the surrounding brightness, thereby enabling a clear display even in dark situations while reducing electric power consumption. Thus, external light contributes to display in a reflection type display, and light emitted from an illumination device (back-light) (this light hereafter referred to as "illumination light") contributes to display in a transmissive display. In the present specification, this type of liquid crystal display will be referred to as "transflective liquid crystal display".

A transflective liquid crystal display generally includes a liquid crystal display panel wherein liquid crystals are sandwiched between a pair of substrates, and an illumination device provided on the opposite side of the liquid crystal display panel in relation to the observation side for casting light on the substrate face of the liquid crystal display panel. Further, a reflective layer (transflective layer) including a plurality of opening portions is disposed on the substrate at the opposite side of the liquid crystal display panel in relation to the observation side.

Also, in recent years, advancements in mobile electronic apparatuses and office automation equipment has come to demand colorization of liquid crystal displays. In many cases, colorization is requested from electronic apparatuses including the above described transflective liquid crystal display, as well.

As for a color transflective liquid crystal display to meet these demands, a transflective liquid crystal display having a color filter has been proposed. Such a color transflective liquid crystal display with a color filter is arranged such that external light entering the liquid crystal display in the reflective mode passes through the color filter, is reflected by the reflector, and passes through the color filter again. Also, in the transmissive mode, light from the back-light also passes through the color filter. The same color filter is used for both the reflective mode and the transmissive mode.

SUMMARY OF THE INVENTION

With the above-described color transflective liquid crystal displays, light passes through the color filter twice in the reflective mode and once in the transmissive mode, tad thereby realizing a color display as described above.

Accordingly, in the event that importance is given to display in the reflective mode where light passes through the color filter twice, for example, and accordingly a color filter with light colors is provided, display with good coloring cannot be readily obtained in the transmissive mode wherein the light passes through the color filter only once. However, in the event that, in an attempt to solve this problem, importance is given to the transmissive mode where light passes through the color filter once, and accordingly a color filter with dark colors is provided, the display in the reflective mode where light passes through the color filter twice becomes dark, and consequently sufficient visibility cannot be obtained. Thus, with conventional color transflective liquid crystal displays, it has been difficult to obtain a display with good coloring and high visibility both in the reflective mode and transmissive mode.

Also, illumination light emitted from illumination devices comprising LEDs (Light Emitting Diode) or cold cathode tubes or the like as a light source often do not have uniform luminance (intensity) throughout all wavelengths in the visible light range. Using such light with non-uniform distribution in luminance to perform transmissive display can result also in nonuniformity of the spectral properties of light passing through the liquid crystal display panel and emitted towards the observation. As a result, there has been the problem of deterioration in color reproduction that the display will be bluish in the case of using illumination light that has higher luminance in the wavelength corresponding to the blue color as compared to the luminance of other wavelengths, for example, to perform transmissive display.

The present invention has been made in view of the above problems, and accordingly it is an object thereof to provide a color transflective liquid crystal display wherein, even in the event that the spectral properties of the illumination light used for transmissive display are not uniform, resultant deterioration in color reproduction can be suppressed. Also, with the color transflective liquid crystal display employing both a reflective mode and a transmissive mode, display with good coloring and high visibility can be obtained both in the reflective mode and transmissive mode.

Also, it is an object of the present invention to provide an electronic apparatus including the above-described liquid crystal display with excellent visibility.

A liquid crystal display according to the present invention can include a liquid crystal display panel formed of liquid crystals sandwiched between a pair of substrates facing each other, and further include pixels having a plurality of sub-pixels each corresponding to different colors. The display can also include an illumination device provided to the opposite side of the liquid crystal display panel in relation to the observation side for illuminating the liquid crystal display panel with illumination light. The liquid crystal display also has a transflective layer disposed on the opposite side of the liquid crystals in relation to the observation side with a transmissive portion for transmitting the illumination light formed thereto, wherein the transmissive portion is formed such that the dimension of a transmissive area corresponding to the transmissive portion at least at one sub-pixel out of the plurality of sub pixels, and the dimension of a transmissive area corresponding to the transmissive portion at another sub-pixel, differ, and a color filter provided corresponding to each of the sub-pixels, for transmitting light of a wavelength corresponding to a color of the sub-pixel.

According to this liquid crystal display, the percentage of transmissive area of any one of the plurality of sub-pixels forming the pixels is made to differ from the percentage of transmissive area of other sub-pixels, thereby enabling the essential light transmittance of the sub-pixels as to the illumination light of the illumination device to be arbitrarily selected. Accordingly, even in the event that there are irregularities in the spectral properties of the illumination light (luminance and quantity of light of the illumination light at each wavelength, spectral energy, etc.), the irregularities of the spectral properties of the light emitted from the liquid crystal display panel towards the observation side can be reduced by compensating for the irregularities. Further, the percentage of the transmissive area of sub-pixels of one of the colors can be intentionally increased for a color of display by the liquid crystal display panel to be selected.

Now, with the present invention, the dimension of the transmissive area at each sub-pixel is preferably a dimension according to the spectral properties of the illumination light. Even in the event that there are irregularities in spectral properties of the illumination light, making the percentage of transmissive area at each sub-pixel be a percentage according to the spectral properties compensates for the irregularities, and excellent color reproduction can be realized. Specifically, an arrangement may be conceived wherein the dimension of the transmissive area at each sub-pixel is a dimension according to the luminance of the wavelength of the illumination light corresponding to the color of the sub-pixel. That is, making the dimension of the transmissive area at a sub-pixel of a color corresponding to a wavelength of the illumination light with great luminance be smaller than the dimension of the transmissive area at a sub-pixel of a color corresponding to a wavelength of the illumination light with small luminance, light in the illumination light with more luminance can be made to have relatively less luminance in the observation light. On the other hand, light in the illumination light with less luminance can be made to have relatively more luminance in the observation light. In this case, making the dimension of the transmissive area at each of the sub-pixels differ for each sub-pixel corresponding to a different color (i.e., such that the dimension of the transmissive area is the same for sub-pixels corresponding to the same color) is advantageous in simplifying configuration.

Also, a case may be conceived wherein the spectral properties of the illumination light differ according to the position within the substrate face of the liquid crystal display panel. In this case, the dimension of the transmissive area at each of the sub-pixels is preferably made to differ in configuration according to the position of the sub-pixel within the substrate face of the liquid crystal display panel. This arrangement allows the irregularities in spectral properties of the illumination light within the substrate face (i.e., inconsistencies between the spectral properties at one position within the substrate face and spectral properties at another position) to be compensated, so that color reproduction can be more reliably improved.

Also, a configuration for the transmissive portion may be conceived wherein an opening portion corresponding to each of the sub-pixels is formed in the transflective layer. When this configuration is employed, the opening portion can be formed by removing by etching or the like a part of the transflective layer formed beforehand, and accordingly the manufacturing process can be simplified. Now, an arrangement wherein one opening portion is provided for each sub-pixel may be conceived, but in this case, opening portions will be concentrated on a part of the areas of the sub-pixels, which could lead to occurrence of graininess of the display. In order to solve this problem, an arrangement may be conceived wherein the opening portion comprises opening parts of generally the same dimension that are formed mutually separated for the number according to the dimension of the transmissive area at the sub-pixels. Thus, the opening portions can be dispersed over the entirety of the sub-pixel, so that occurrence of graininess, as described above, can be avoided.

Also, as a different form of the transflective layer in a liquid crystal display according to the present invention, the transflective layer may have the transmissive portion formed such that an area along at least one side of a plurality of sides defining each sub pixel serves as the transmissive area.

Also, in order to achieve the above objects, the liquid crystal display according to the present invention, serving as a transflective liquid crystal display which performs displaying by switching between a transmissive mode and a reflective mode, may include a liquid crystal layer sandwiched between an upper substrate and a lower substrate facing one another, and a transflective layer which has a transmissive area for transmitting light, and a reflective area for reflecting incident light from the upper substrate side, and which is disposed on the inner side of the lower substrate. The display can further include a color filter disposed on the upper side of the transflective layer, upon which a plurality of pigment layers of different colors according to each of sub-pixels forming a display area are arrayed, and an illumination device disposed on the outer side of the lower substrate, wherein the pigment layers are formed over the entirety of an area overlapping the transmissive area in a planar manner and an area overlapping the reflective area in a planar manner, and at least one color pigment layer is formed only at a part of an area overlapping the reflective area in a planar manner. The dimension of the pigment layer formation area, where the pigment layers are formed, being formed so as to be different between at least one color pigment layer of the plurality of pigment layers of differing colors, and another color pigment layer.

With such a liquid crystal display, the pigment layers can be formed on the entire area overlapping the transmissive area in a planar manner and an area, excluding a part of the area, overlapping the reflective area in a planar manner, with a pigment layer formation area where each of the pigment layers is formed, and an area where each of the pigment layers is not provided at part of the area overlapping the reflective area (hereafter referred to as "pigment layer non-formation area") in a planar manner. A part of the incident external light entering the liquid crystal display in the reflective mode passes through the pigment layer non-formation area, and the light passing through the color filter twice in the reflective mode is obtained as a light that combines uncolored light passing through the pigment layer non-formation area and colored light passing through the pigment layer formation area.

On the other hand, light incident from the back-light and passing through the transmissive area in the transmissive mode all passes through pigment layer formation areas, and the light passing through the color filter once in the transmissive mode is all obtained as colored light. Thus, the difference in concentration between the light obtained by passing through the color filter twice in the reflective mode and the light obtained by passing through the color filter once in the transmissive mode can be reduced. Consequently, a color transflective liquid crystal display capable of display with good coloring and high visibility both in the reflective mode and transmissive mode, can be realized.

Moreover, with the liquid crystal display according to the present invention, the dimension of the pigment layer formation area is formed to be different between a pigment layer of at least one color out of the pigment layers and pigment layers of other colors, so that the color properties of the color filter can be adjusted by changing the dimension of the pigment layer formation area. Color reproduction can also be improved, so that a liquid crystal display with excellent display quality can be realized.

Also, with the above-described liquid crystal display, the pigment layers preferably can include a red layer, a green layer, and a blue layer, with the dimension of the pigment formation area preferably being formed so as to be smaller for the green layer than for the red layer and blue layer.

Arranging the liquid crystal display thus allows further improvement in color reproduction in the event that the pigment layers include a red layer, a green layer, and a blue layer, and a liquid crystal display with even more excellent display quality can be realized.

Also, the above-described liquid crystal display preferably further includes a transparent film for smoothing the step between the pigment layer formation area and the area where the pigment layers are not provided.

Arranging the liquid crystal display thus can eliminate adverse effects, such as irregularities occurring in cell gaps that causes unevenness in display, due to the step between the pigment layer formation area and the area where the pigment layers are not provided, and accordingly the reliability of the liquid crystal display can be improved. With the above-described liquid crystal display, the transmissive area is formed by the transflective layer being opened in a window-like manner.

Also, the above-described liquid crystal display may be configured such that band-shaped transparent electrodes are disposed on the inner side of the lower substrate, and the transmissive area of a band shape is formed in the transflective layer by having the transparent electrode pattern width be formed wider than the transflective layer pattern width.

In the above-described liquid crystal display, the transflective layer is preferably formed of aluminum or an aluminum alloy, with the pigment layer containing a blue layer, and the dimension of the pigment layer formation area being provided so as to be smaller for the blue layer than for the red layer.

With the liquid crystal display configured thus, the dimension of the pigment tin, layer formation area is provided so as to be smaller for the blue layer than for the red layer, so that even in the event that the light reflected by the transflective layer is colored blue due to the transflective layer being formed of aluminum, the light is compensated by passing through the color filter twice. Thus, a liquid crystal display with excellent color reproduction and high display quality can be realized.

Also, in the above-described liquid crystal display, the transflective layer is preferably formed of silver or a silver alloy, with the pigment layer containing a red layer and blue layer, and the dimension of the pigment layer formation area being provided so as to be smaller for the red layer than for the blue layer.

With the liquid crystal display configured thus, the dimension of the pigment layer formation area is provided so as to be smaller for the red layer than for the blue layer, so that even in the event that the light reflected by the transflective layer is colored yellow due to the transflective layer being formed of silver, the light is compensated by passing through the color filter twice. Accordingly, a liquid crystal display with excellent color reproduction and high display quality can be realized.

Also, with the above-described liquid crystal display, the color properties of the color filter are preferably adjusted by changing the dimension of the pigment layer formation area.

With such a liquid crystal display, the difference in color concentration between the light passing through the color filter twice in the reflective mode and the light passing through the color filter once in the transmissive mode can be reduced, while color reproduction is improved. Consequently, a color transflective liquid crystal display capable of display with good colorization, high visibility, and excellent color reproduction both in the reflective mode and transmissive mode, can be realized.

Also, in order to achieve the above objects, the liquid crystal display according to the present invention, serving as a transflective liquid crystal display which performs displaying by switching between a transmissive mode and a reflective mode, can include a liquid crystal display panel formed of a liquid crystal layer sandwiched between a upper substrate and lower substrate facing each other, and including pixels that has a plurality of sub-pixels each corresponding to different colors and form a display area, and an illumination device provided to the opposite side (outer side of the lower substrate) of the liquid crystal display panel in relation to the observation side, for illuminating the liquid crystal display panel with illumination light. The liquid crystal display further can further include a transflective layer disposed on the opposite side (inner side of the lower substrate) of the liquid crystal layer in relation to the observation side, and a color filter provided above the transflective layer with a plurality of pigment layers of different colors corresponding to each of the sub-pixels arrayed thereupon, for transmitting light of a wavelength corresponding to the color of each sub-pixel. In the liquid crystal display, a transmissive portion for transmitting the illumination light is formed on the transflective layer that has a transmissive area for transmitting light and a reflective area for reflecting incident light from the upper substrate side, and the transmissive portion is formed such that the dimension of the transmissive area corresponding to the transmissive portion at least at one sub-pixel of the plurality of sub-pixels. The dimension of the transmissive area corresponding to the transmissive portion at another sub-pixel, differ. Also, in the liquid crystal display, the pigment layers can be formed over the entirety of an area overlapping the transmissive area in a planar manner and an area overlapping the reflective area in a planar manner, and at least one color pigment layer is formed at a part of an area overlapping the reflective area in a planar manner. Further, in the liquid crystal display, the dimension of a pigment layer non-formation area where the pigment layers are not formed at least at one sub-pixel of the plurality of sub-pixels, and the dimension of a pigment layer non-formation area at another sub-pixel, differ.

With such a liquid crystal display, the transmissive portion can be formed such that the dimension of the transmissive area corresponding to the transmissive portion at least at one sub-pixel of the plurality of sub-pixels, and the dimension of the transmissive area corresponding to the transmissive portion at another sub-pixel, differ. Also the dimension of a pigment layer non-formation area where the pigment layers are not formed at least at one sub-pixel of the plurality of sub-pixels, and the dimension of a pigment layer non-formation area at another sub-pixel, differ.

Accordingly, with such a liquid crystal display, the display colors and brightness are adjusted by changing the ratio of the transmissive area and reflective area in the sub-pixels, between one of the plurality of sub-pixels and another sub-pixel. Also, the color properties of the color filter can be adjusted by changing the ratio of the dimension of the pigment layer formation area and the pigment layer non-formation area, between at least one color pigment layer of the pigment layers and another color pigment layer, so that the display colors and brightness are adjusted.

With conventional transflective liquid crystal displays, increasing the transmittance by enlarging the transmissive area such that a bright display can be obtained in the transmissive mode, has the problem in that the reflectivity decreases and the display becomes dark in the reflective mode. Thus, it has been difficult to realize a transflective liquid crystal display wherein a bright display can be obtained in both the reflective mode and transmissive mode.

Conversely, with the above-described liquid crystal display, even in the event that the transmittance is improved by enlarging the transmissive area for a bright display to be obtained in the transmissive mode and that the reflective area becomes small, sufficient reflectivity for a bright display in the reflective mode can be obtained by enlarging the dimension of the pigment layer non-formation area. Thus, a problem does not occur that the display becomes dark in the reflective mode.

Thus, according to the above-described liquid crystal display, the brightness can be effectively adjusted, and a bright display can be achieved whether in the reflective mode or the transmissive mode.

Further, with such a liquid crystal display, the display colors can be adjusted by changing the ratio of the transmissive area and reflective area in the sub-pixels. Also, the display colors can be adjusted by changing the ratio of the dimension of the pigment layer formation area and the pigment layer non-formation area for each of the pigment layers to adjust the color properties of the color filter. Accordingly, the display colors can be effectively adjusted, and extremely excellent color reproduction can be obtained.

Moreover, the above-described liquid crystal display can include a pigment layer formation area and pigment layer non-formation area, so that the difference in concentration of color between the light passing through the color filter twice in the reflective mode and the light passing through the color filter once in the transmissive mode can be reduced. Thus, a color transflective liquid crystal display capable of display with similarly good coloring and high visibility both in the reflective mode and transmissive mode, can be realized.

Consequently, using the above-described liquid crystal display enables a color transflective liquid crystal display with extremely excellent display quality to be realized.

Also, in order to achieve the above objects, the electronic apparatus according to the present invention can include one of the above-described liquid crystal displays. For example, the liquid crystal display according to the present invention may be used as a display device in various types of electronic apparatuses, such as televisions or monitors, communication equipment such as cellular telephones or PDAs, information processing devices such as personal computers, and so forth. According to the electronic apparatus, even in the event that there are irregularities in spectral properties of the illumination light, this can be compensated to realize a display with high color reproduction, thereby yielding an electronic apparatus comprising a liquid crystal display with excellent visibility. Thus, this is suitable for an electronic apparatus requiring particularly high-quality display.

BRIEF DESCRIPTION OF THE DRAWINGS

The invention will be described with reference to the accompanying drawings, in which like elements are referred to with like numerals, and in which:

FIG. 4 is a graph illustrating the transmittance properties of the color filters corresponding to each color in the liquid crystal display;

FIG. 5 is a graph illustrating spectral properties of the light passing through the liquid crystal display panel and emitted towards the observation side in the liquid crystal display;

FIG. 6 is a graph illustrating spectral properties of the light passing through the liquid crystal display panel and emitted at the observation side in the event that all opening portions in the reflective layer are of the same dimension;

FIG. 7 is a cross-sectional diagram illustrating an example of the configuration of a liquid crystal display according to a second embodiment of the present invention;

FIG. 8 is a perspective view illustrating the principal portions of the liquid crystal display panel in the liquid crystal display;

FIG. 10 is a cross-sectional diagram illustrating the configuration of a liquid crystal a display according to a third embodiment of the present invention;

FIG. 11 is a graph illustrating the transmittance properties of the color filters corresponding to each color in the liquid crystal display;

FIG. 12 is a plan view illustrating the positional relation between the sub-pixels and reflective layer in the liquid crystal display;

FIG. 13 is a CIE chromaticity diagram showing color coordinates of color display by the liquid crystal display;

FIG. 14 is a plan view illustrating the positional relation between the transparent electrodes on the first substrate and the components formed on the second substrate, in a liquid crystal display according to a modification of the present invention;

FIG. 15 is a diagram illustrating an example of a liquid crystal display according to the present invention, and is a partial cross-sectional view illustrating an example of a passive matrix transflective color liquid crystal display, wherein the color filter is provided on the inner side of the lower substrate;

FIG. 16 is a diagram illustrating only the transflective layer, color filter and shielding film of the liquid crystal display shown in FIG. 15;

FIG. 16(A) is a plan view for describing the overlapping of the transflective layer and the color filter;

FIG. 16(B) is a cross-sectional view along A–A' shown in FIG. 16(A);

FIG. 17 is a diagram illustrating only the transflective layer and the color filter and the transparent electrodes on the lower substrate in the liquid crystal display according to the fifth embodiment;

FIG. 17(A) is a plan view for describing the overlapping of the transflective layer and the color filter;

FIG. 17(B) is a cross-sectional view along line C–C' shown in FIG. 17(A);

FIG. 18 is a diagram illustrating another example of a liquid crystal display according to the present invention, and is a partial cross-sectional view illustrating an example of a passive matrix transflective color liquid crystal display, wherein the color filter is provided on the inner side of the upper substrate;

FIG. 19 is a diagram illustrating only the transflective layer and color filter of the liquid crystal display shown in FIG. 18;

FIG. 19(A) is a plan view for describing the overlapping of the transflective layer and the color filter;

FIG. 19(B) is a cross-sectional view along B–B' shown in FIG. 19(A);

FIG. 20 is a diagram illustrating further another example of a liquid crystal display according to the present invention, and is a partial cross-sectional view illustrating an example of a passive matrix transflective color liquid crystal display wherein transparent electrodes are directly provided on the transflective layer;

FIG. 21 is a diagram illustrating only the transflective layer and color filter and transparent electrodes on the lower substrate, in the liquid crystal display shown in FIG. 20;

FIG. 21(A) is a plan view for describing the overlapping of the transflective layer and the color filter;

FIG. 21(B) is a cross-sectional view along line D–D' shown in FIG. 21(A);

FIG. 22 is a perspective view illustrating an example of a cellular telephone;

FIG. 23 is a perspective view illustrating an example of a wristwatch-type electronic device;

FIG. 24 is a perspective view illustrating an example of a mobile information processing device, such as a word processor or a personal computer;

FIG. 25 is a diagram illustrating only the transflective layer and color filter and transparent electrodes on the lower substrate of the liquid crystal display according to the test example 2;

FIG. 25(A) is a plan view for describing the overlapping of the transflective layer and the color filter;

FIG. 25(B) is a cross-sectional view of FIG. 25(A);

FIG. 26 is a diagram illustrating only the transflective layer and color filter and transparent electrodes on the lower substrate of the liquid crystal display according to the test example 3;

FIG. 26(A) is a plan view for describing the overlapping of the transflective layer and the color filter;

FIG. 26(B) is a cross-sectional view of FIG. 26(A);

FIG. 27 is a diagram illustrating the results of measuring the light emitted from the liquid crystal display according to the test example 1;

FIG. 27(A) is a chromaticity diagram of the light obtained in the reflective mode;

FIG. 27(B) is a chromaticity diagram of the light obtained in the transmissive mode;

FIG. 28 is a diagram illustrating the results of measuring the light emitted from the liquid crystal display according to the test example 2;

FIG. 28(A) is a chromaticity diagram of the light obtained in the reflective mode;

FIG. 28(B) is a chromaticity diagram of the light obtained in the transmissive mode;

FIG. 29 is a diagram illustrating the results of measuring the light emitted from the liquid crystal display according to the test example 3;

FIG. 29(A) is a chromaticity diagram of the light obtained in the reflective mode;

FIG. 29(B) is a chromaticity diagram of the light obtained in the transmissive mode;

FIG. 30 is a diagram illustrating the results of measuring the light emitted from the liquid crystal display according to the test example 4;

FIG. 30(A) is a chromaticity diagram of the light obtained in the reflective mode;

FIG. 30(B) is a chromaticity diagram of the light obtained in the transmissive mode;

FIG. 31 is a diagram illustrating the spectral properties of the color filter used in the liquid crystal display according to the test example 4, and is a graph illustrating the relation between the transmittance of the color filter and the wavelengths;

FIG. 32 is a diagram illustrating the transflective layer and color filter in the liquid crystal display according to an eighth embodiment; and FIG. 33 is a diagram illustrating the transflective layer and color filter in the liquid crystal display according to a ninth embodiment.

DETAILED DESCRIPTION OF PREFERRED EMBODIMENTS

Figure 1:
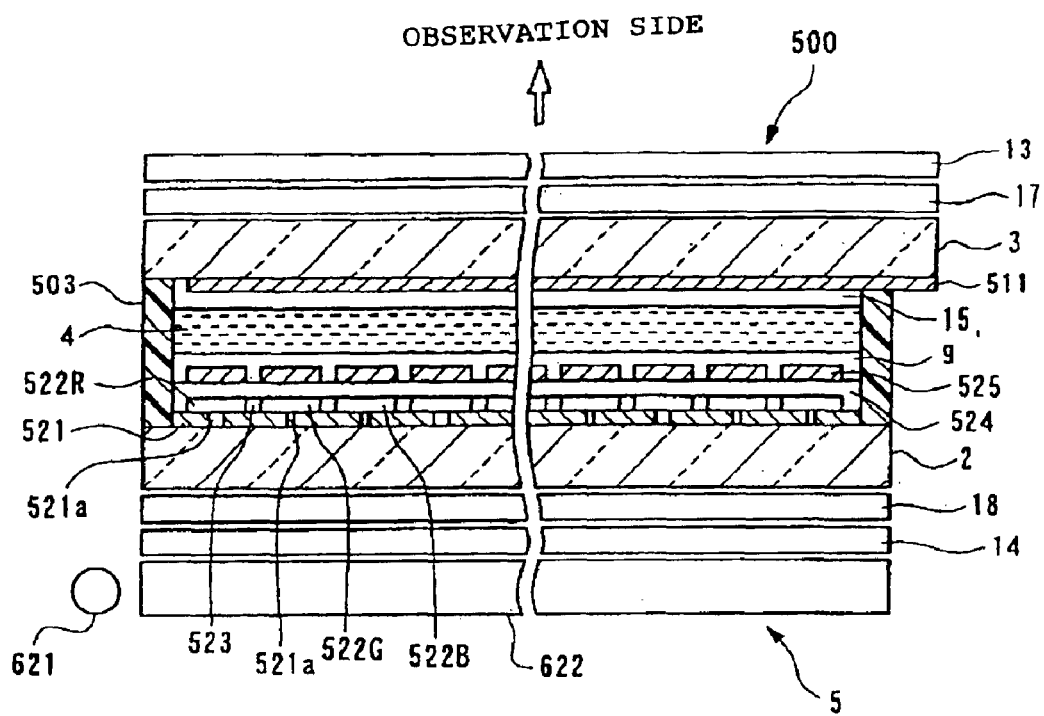
FIG. 1 is a cross-sectional diagram illustrating the configuration of a liquid crystal display according to a first embodiment of the present invention.

The embodiments of the present invention will be described as follows with reference to the drawings. It should be understood that the embodiments illustrate one form of the present invention, but do not limit the invention, and modifications may be made without departing from the spirit and the scope of the present invention.

First, the first embodiment, wherein the present invention is applied to a passive matrix transflective liquid crystal display, will be described with reference to FIG. 1. Note that in FIG. 1 and the subsequent drawings, the scale of the layers and members differ one from another, in order to make the layers and members of a recognizable size in the drawings.

As shown in FIG. 1, this liquid crystal display has a liquid crystal display panel (liquid crystal panel) 500 including a first substrate (upper substrate) 3 and a second substrate (lower substrate) 2 attached to each other with a seal member 503, and liquid crystals (a liquid crystal layer) 4 sandwiched therebetween, and has an illumination device (a so-called back-light unit) 5 disposed at the second substrate 2 side of the liquid crystal display panel 500. Also note that in the following description, the opposite side of the liquid crystal display panel 500 in relation to the illumination device 5 as shown in FIG. 1 will be referred to as the "observation side". That is to say, the "observation side" is the side at which an observer viewing images displayed on the liquid crystal display is situated.

The illumination device 5 can include a plurality of LEDs 621 (only one is shown in FIG. 1) and a light guide plate 622. The plurality of LEDs 621 are arrayed facing the side edge face of the light guide plate 622, and cast light onto this side edge face. The light guide plate 622 is a plate-shaped member for guiding light from the LEDs 621 incident on the side edge face to the substrate face of the liquid crystal display panel 500 (the surface of the second substrate 2) in a uniform manner. Also, a scattering plate or the like is attached to the face of the light guide plate 622 facing the liquid crystal display panel 500 so as to scatter the light emitted from the light guide plate 622 with respect to the liquid crystal display panel 500 in a uniform manner, while a reflector is attached to the opposite face of the light guide plate 622 so as to reflect light heading from the light guiding plate 622 in the direction opposite from the liquid crystal display panel 500, toward the liquid crystal display panel 500 (both omitted in the drawings).

Figure 2:
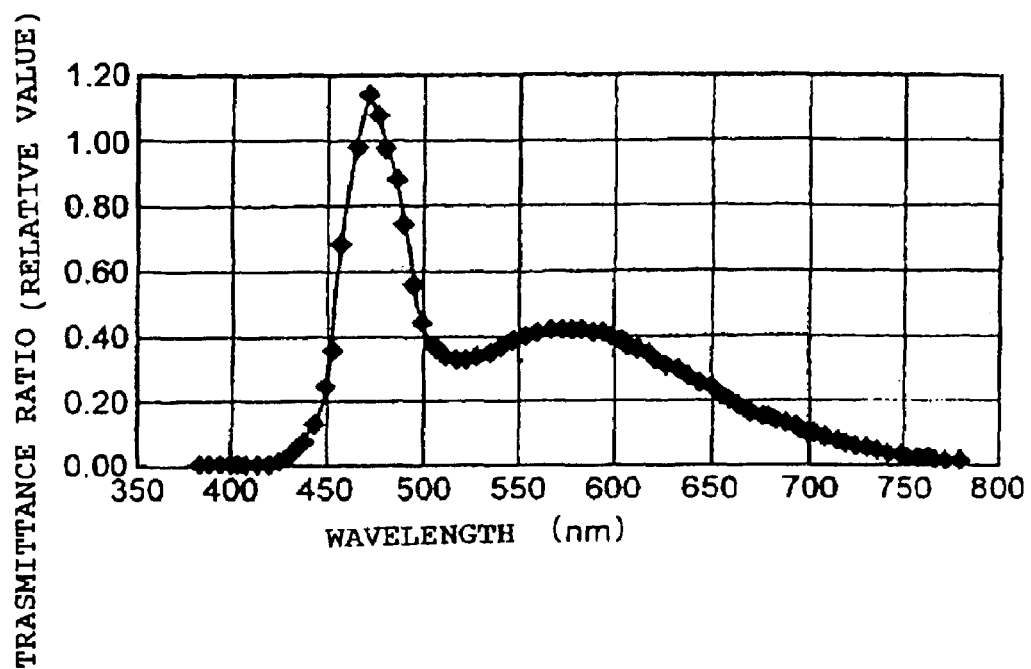
FIG. 2 is a graph illustrating spectral properties of the illumination light cast onto the liquid crystal display panel from the illumination device in the liquid crystal display.

Now, FIG. 2 is a graph illustrating an example of spectral properties of the illumination light (the relation of the wavelength and luminance of the illumination light) cast onto the liquid crystal display panel 500 from the illumination device 5.

That is, in the graph in FIG. 2, the horizontal axis shows the wavelength, and the vertical axis shows the luminance of the illumination light at each of the wavelengths, as a relative value wherein a predetermined luminance is set as "1.00" as a reference value. As shown in this drawing, in the present embodiment, a case is assumed wherein there are irregularities in the luminance in the illumination light over the wavelengths within the visible light range, i.e., wherein the spectral properties of the illumination light are not uniform. Specifically, while the luminance of the illumination light according to the present embodiment is greatest at a wavelength close to 470 nm which corresponds to blue through green light, the luminance at around wavelengths 520 nm or above corresponding to yellow light through red light is comparatively weaker. Though the details will be described in greater detail below, according to the liquid crystal display of the present embodiment, even in cases of performing transmissive display using illumination light with such irregularities in spectral properties, the influence of the irregularities in the spectral properties in the light emitted towards the observation side from the liquid crystal display panel 500 (i.e., the light viewed by the observer, and hereafter referred to as "observation light") is suppressed, and good color reproduction can be realized. Note that with the present embodiment, a case is assumed wherein illumination light with the spectral properties shown in FIG. 2 is cast onto the entire substrate face of the liquid crystal display panel 500.

Returning to FIG. 1, the first substrate 3 and the second substrate 2 of the liquid crystal display panel 500 are plate-shaped transmissive members, such as glass or quartz, plastic, etc.

A plurality of transparent electrodes 511 are formed on the inner surface (the liquid crystals 4 side) of the first substrate 3. The transparent electrodes 511 are band-shaped electrodes extending in a predetermined direction (the left and right directions in FIG. 1), and are formed of a transparent conductive material such as ITO (Indium Tin Oxide) or the like. Further, the surface of the first substrate 3 where the transparent electrodes 511 are formed is covered by an alignment layer 15. This alignment layer 15 is an organic thin film, such as polyimide or the like, and has been subjected to rubbing processing for stipulating the orientation of the liquid crystals 4 when voltage is not applied.

Also, on the outer side of the first substrate 3 (the surface of the outer side), a retardation film 17 and an upper polarizer 13 are layered and disposed in that order.

On the other hand, a reflective layer (transflective layer) 521 having a plurality of opening portions 521a (described in detail later) is disposed on the inner (liquid crystal 4 side) surface of the second substrate 2 and formed of a material with light reflecting property, such as aluminum or silver for example. The incidental light from the observation side of the liquid crystal display panel 500 is reflected at the surface of this transflective layer 521 (more specifically, at the surface other than the area where the opening portions 521a are formed) and is emitted towards the observation side, thereby realizing a reflective display. Now, the inner surface of the second substrate 2 is made to be coarse so as to form a scattering structure (unevenness) at the surface of the transflective layer 521, but this is omitted in the figures.

Also, a ¼ wavelength plate 18 and a lower polarizer 14 are disposed on the outer side (the surface of the outer side) of the second substrate 2.

Further, formed on the inner side surface of the second substrate 2 covered by the transflective layer 521 are a color filter 522 (522R, 522G, 522B), a shielding layer 523, an overcoat layer (smoothing layer) 524 for smoothing the unevenness formed by the color filter 522 and the shielding layer 523, a plurality of transparent electrodes 525, and an alignment layer 9 the same as the above-described alignment layer 15.

Figure 3:
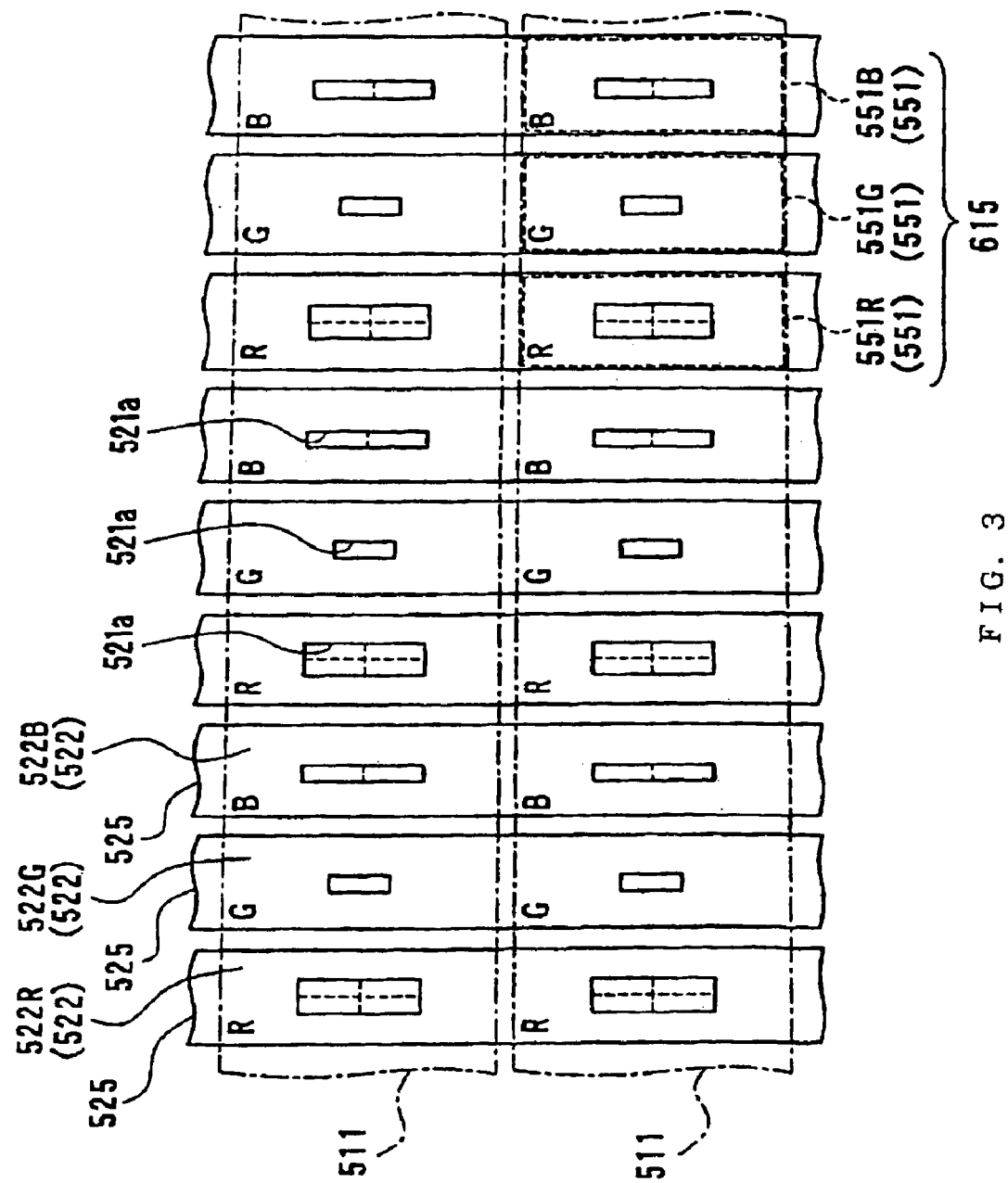
FIG. 3 is a plan view illustrating the positional relation between the transparent electrodes on the first substrate and the components formed on the second substrate of the liquid crystal display.

The transparent electrodes 525 are band-shaped electrodes formed of a transparent conductive material on the surface of the overcoat layer 524. Now, FIG. 3 schematically shows the positional relation between the transparent electrodes 511 (shown by single-dot broken lines), on the first substrate 3, the transparent electrodes 525 on the second substrate 2, and the color filter 522. As shown in the figure, the transparent electrodes 525 extend in a direction intersecting the transparent electrodes 511 (vertical to the paper in FIG. 1). The liquid crystals 4 sandwiched between the first substrate 3 and the second substrate 2 change in orientation thereof in response to voltage being applied between the transparent electrodes 511 and the transparent electrodes 525. In the following description, areas where the transparent electrodes 511 and the transparent electrodes 525 face one another as shown in FIG. 3 will be referred to as "sub-pixels 551 (551R, 551G, 551B)". In other words, the sub-pixels 551 can also be described as the smallest units of areas wherein the orientation of liquid crystal changes according to application of voltage.

The shielding layer 523 is formed in a lattice-like shape so as to cover the gap portions between the sub-pixels 551 arrayed in matrix fashion (that is to say, areas other than the areas where the transparent electrodes 511 and the transparent electrodes 525 face one another), serving to shield from light the gaps between the sub-pixels 551. The color filter 522 is a layer formed of a resin material or the like corresponding to the sub-pixels 551, and as shown in FIG. 3, is colored, with a dye or pigment, either R (red), G (green), or B (blue). In the following, sub-pixels corresponding to the color filters 522R, 522G, and 522B, will respectively be referred to as sub-pixels 551R, 551G and 551B. These three sub-pixels 551R, 551G, and 551B with mutually differing colors form a pixel (dot) 615, which is the smallest unit of the display image.

Now, FIG. 4 is a graph representing the transmittance properties of each of the color filters 522R, 522G, and 522B, with the horizontal axis as the wavelength of light incident on the color filter 522, and the vertical axis as transmittance (the percentage of light emitted as to the amount of incident light). As shown in the figure, the color filter 522R exhibits high transmittance for light with a wavelength 600 nm or more which corresponds to red, the color filter 522G exhibits high transmittance for light with a wavelength of 500 through 600 nm which corresponds to green, and the color filter 522B exhibits high transmittance for light with a wavelength of 400 through 500 nm which corresponds to blue light.

Next, description will be made regarding the form of the opening portions 521a formed in the transflective layer 521 again with reference to FIG. 3.

First, the opening portions 521a are provided near the center of each of the sub-pixels 551 on the transflective layer 521. Illumination light form the illumination device 5 passes through the opening portions 521a and is emitted towards the observation side of the liquid crystal display panel 500, thereby realizing transmissive display. In the following description, of the area of the sub-pixels 551, the area corresponding to the opening portions 521a, i.e., the area through which illumination light from the illumination device 5 passes, will be referred to as "light-transmitting area (transmissive area)".

Further, the opening portions 521a formed on the transflective layer 521 have the dimension thereof selected such that the dimension of the light-transmitting areas differs for each of the three sub-pixels 551R, 551G, and 551B, making up each pixel 615. More specifically, the dimension of the opening portions 521a corresponding to each of the sub-pixels 551R, 551G, and 551B corresponds to the spectral properties of the illumination light emitted from the illumination device 5.

With the present embodiment, as shown in FIG. 2, of the illumination light emitted from the illumination device 5, the luminance of the wavelengths from blue light to green light is relatively great, while the luminance of the wavelength corresponding to red light is relatively small. Accordingly, with regard to the sub-pixels 551G where the green color filter 522G corresponding to the wavelength with the greatest luminance is formed, the dimension of the opening portion 521a corresponding thereto is formed smaller in comparison to the sub-pixels 551R and 551B corresponding to the other colors. Conversely, with regard to the sub-pixels 551R where the red color filter 522R corresponding to the wavelength with the least luminance of the illumination light is, the dimension of the opening portion 521a corresponding thereto is formed larger in comparison to the sub-pixels 551G and 551B corresponding to the other colors. FIG. 3 shows an arrangement wherein the dimension ratio of the opening portions 521a corresponding to the respective sub-pixels 551R, 551G, and 551B is set at "sub-pixel 551R:551G:551B=4:1:2".

Now, FIG. 5 is a graph illustrating the spectral properties of the observed light emitting to the observation side from the liquid crystal display panel 500 in the event that transmissive display is carried out with the above-described configuration. On the other hand, FIG. 6 illustrates the spectral properties of the observed light in the event that transmissive display is carried out with an arrangement wherein all light-transmitting areas are of the same dimension for all sub-pixels 551 (hereafter referred to as "conventional configuration"), as a comparative example with that shown in FIG. 5. In either drawing, the spectral properties of the observed light in the event that transmissive display is carried out using the illumination light with the spectral properties shown in FIG. 2, is shown. In both FIG. 5 and FIG. 6, the horizontal axis shows the wavelength, and the vertical axis shows the luminance of each of the observed light as a relative value with reference to a predetermined luminance (the same luminance in both FIG. 5 and FIG. 6) set as a reference value "1.00".

As shown in FIG. 6, in the event that the conventional configuration is employed, the observed light visually recognized by the observer is light which has an extremely high luminance near the wavelength 470 nm. Accordingly, the image light visually recognized by the observer will be a blue-greenish image. Conversely, with the configuration according to the present embodiment wherein the ratio of the light-transmitting areas in the sub-pixels 551R, 551G, and 551B is 4:1:2, the luminance in the observed light near the wavelength 470 nm is comparatively lower than that in the case shown in FIG. 6, as shown in FIG. 5. Accordingly, a situation wherein that the image light visually recognized by the observer is a blue-greenish image can be avoided even in the event that transmissive display is carried out using illumination light wherein the luminance at wavelengths corresponding to blue through green colors is greater than the luminance at other wavelengths.

Thus, with the configuration according to the present embodiment, of the illumination light, light at wavelengths with relatively small luminance is allowed to sufficiently pass through the transflective layer 521, while light at wavelengths with relatively great luminance is restricted to pass through the transflective layer 521, thereby suppressing the influence that irregularities in the spectral properties of the illumination light have on the observed light.

That is to say, the non-uniformity in the spectral properties of the illumination light is compensated, so that good color reproduction can be realized.

Next, the second embodiment, wherein the present invention is applied to an active matrix transflective liquid crystal display, will be described. Note that the following description illustrates a case using TFDs (Thin Film Diode) which are two-terminal switching devices as switching devices. Also, of the components in the figures described below, the components which are in common with the components shown in FIG. 1 are given with the same reference numerals as in FIG. 1, and description thereof will be omitted.

First, FIG. 7 is a cross-sectional view schematically showing an example of the configuration of the liquid crystal display according to the present embodiment, and FIG. 8 is a perspective diagram illustrating the configuration of the principal components of the liquid crystal display panel making up the liquid crystal display. The cross-section along A–A' in FIG. 8 is equivalent to FIG. 7. As shown in these figures, a plurality of pixel electrodes 513 arrayed in matrix fashion, and a plurality of scanning lines 514 extending in a predetermined direction (the direction vertical to the paper in FIG. 7) in the gap portions of the pixel electrodes 513, are formed on the inner side surface of the first substrate 3. Each of the pixel electrodes 513 is formed of a transparent conductive material, such as ITO or the like, for example. Further, each of the pixel electrodes 513 and the scanning lines 514 adjacent to the pixel electrodes 513 are connected by TFDs 515. Each of the TFDs 515 is a two-terminal switching device with a non-linear current/voltage property.

On the other hand, as with the liquid crystal display according to the first embodiment above, formed on the inner side surface of the second substrate 2 are a transflective layer 521 including a plurality of opening portions 521a, a color filter 522, a shielding layer 523, and an overcoat layer 524 for covering the surface of the second substrate 2 where these are formed. Further, a plurality of data lines 527 extending in a direction intersecting with the scanning lines 514 are formed on the surface of the overcoat layer 524. As shown in FIGS. 7 and 8, the data lines 527 are band-shaped electrodes formed of an transparent conductive material.

Figure 9:
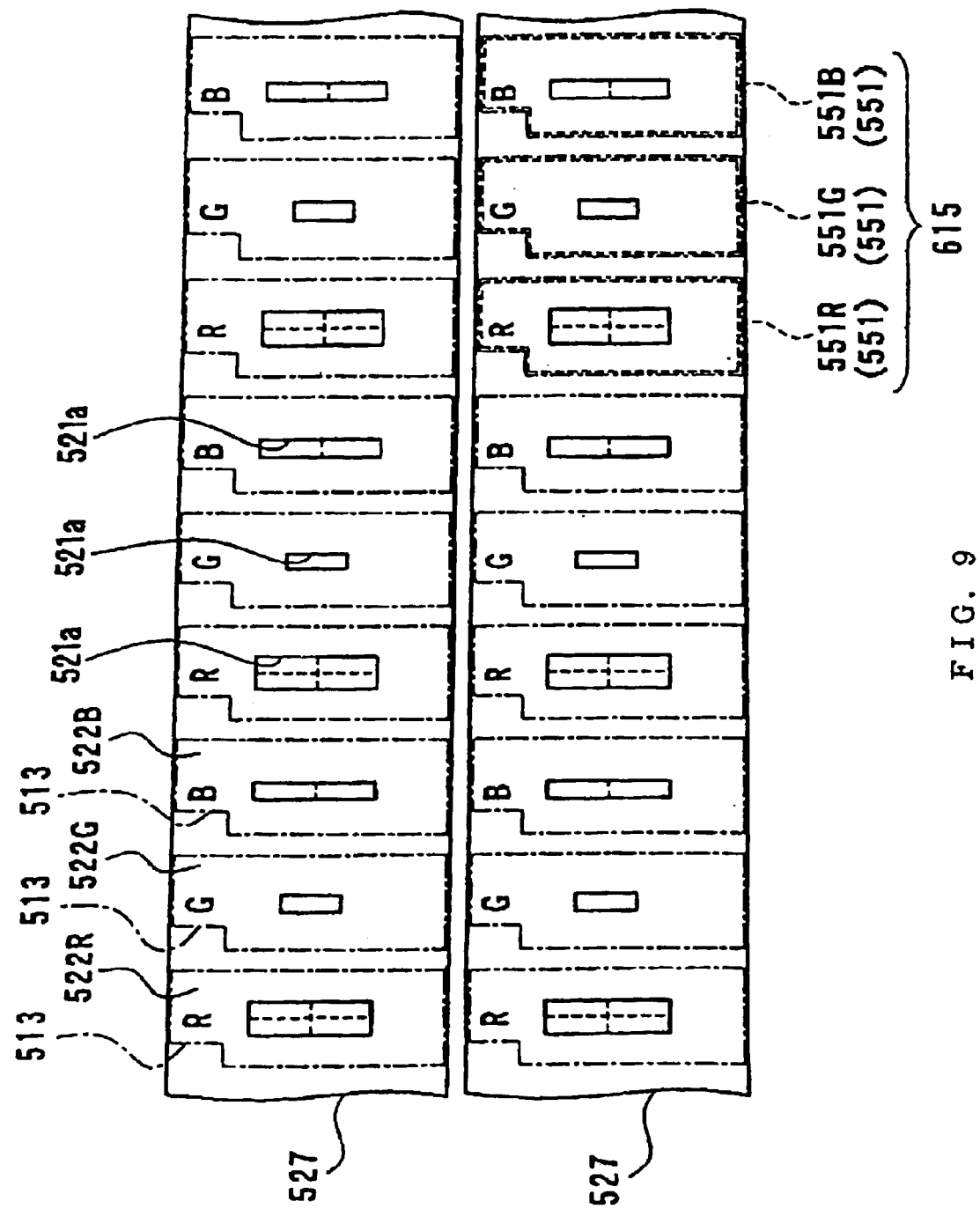
FIG. 9 is a plan view illustrating the positional relation between the pixel electrodes on the first substrate and the components formed on the second substrate of the liquid crystal display.

FIG. 9 shows the positional relation between the pixel electrodes 513 (shown by single-dot broken lines) and the data lines 527. As shown in the figure, the data lines 527 face the plurality of pixel electrodes 513 arrayed in rows on the first substrate 3. With this configuration, the liquid crystals 4 sandwiched between the electrodes change in orientation state in response to voltage being applied between the pixel electrodes 513 on the first substrate 3 and the data lines 527 on the second substrate 2. In other words, with the present embodiment, the areas where the pixel electrodes 513 and the data lines 527 face one another are equivalent to the sub-pixels 551 (more specifically, sub-pixels 551R, 551G, and 551B, corresponding to the respective color filters 522R, 522G, and 522B).

As with the above-described first embodiment, opening portions 521a are formed at positions corresponding to the vicinity of the center portion of each of the subs pixels 551 on the transflective layer 521 in accordance with the present embodiment as well, as shown in FIG. 9. The dimension of each of the opening portions 521a is determined such that the percentage of the transmissive area in each of the sub-pixels 551R, 551G, and 551B, is a percentage corresponding to the spectral properties of the illumination light from the illumination device 5. Now, the present embodiment also assumes performing transmissive display using the illumination light with the spectral properties shown in FIG. 2 referred to above. Accordingly, at the sub-pixel 551G where the green color filter 522G corresponding to the wavelength which has the greatest luminance of the illumination light, the dimension of the opening portion 521a corresponding thereto is smaller in comparison to the dimension of the opening portions 521a corresponding to the sub-pixels 551R or 551B corresponding to the other colors.

That is, the percentage of the light-transmitting area in the sub-pixel 551G is smaller than the percentage of the light-transmitting areas in the sub-pixels 551R or 551B of the other colors. Conversely, at the sub-pixel 551R corresponding to the wavelength which has the smallest luminance of the illumination light, the dimension of the opening portion 521a corresponding thereto is greater and the percentage of light-transmitting area in the sub-pixel 551R is greater in comparison to that of the sub-pixels 551G or 551B of the other colors. In the example shown in FIG. 9, a case is illustrated wherein the dimension ratio of the opening portions 521a in the sub-pixels 551R, 551G, and 551B, is "4:1:2".

The same advantages as those of the first embodiment can be obtained by this configuration, as well.

In the first and second embodiments, examples of a configuration wherein opening portions 521a are provided near the center of areas corresponding to the sub-pixels 551 of the transflective layer 521, with the light-transmitting area being positioned at the center of the sub-pixels 551, has been shown. Conversely, in accordance with the present embodiment, the transmissive areas are areas along the edges of the sub-pixels 551.

FIG. 10 is a cross-section diagram illustrating the configuration of the liquid crystal display according to the present embodiment. Note that the components shown in FIG. 10 that are in common with the components in FIG. 1 shown above are denoted by the same reference numerals. As shown in the figure, the liquid crystal panel 500 according to the present embodiment differs from the liquid crystal panel 500 described in the above embodiments in that the color filter 522 (522R, 522G, 522B), a shielding layer 523, and a overcoat layer 524 are formed on the first substrate 3, and in that the transparent electrodes 511 and alignment layer 15 are formed on the surface of the overcoat layer. Further, the transmittance properties of the color filter 522 according to the present embodiment differs from the transmittance properties of the color filter 522 according to the above-described embodiments shown in FIG. 4.

Now, FIG. 11 is a graph illustrating the transmittance properties of the color filters 522R, 522G, and 522B, according to the present embodiment. As can be understood by comparing this drawing with the above-described FIG. 4, the color purity of the color filters 522 according to the present embodiment, and particularly the color purity of the color filter 522G corresponding to the green color is higher than the color purity of the color filters 522 according to the above-described embodiments. More specifically, this is explained as follows.

Now, taking into account a numerical value Tmax/Tmin, wherein Tmax represents the maximum transmittance of each of the color filters 522 in the wavelength range of 380 nm through 780 nm and Tmin represents the minimum transmittance in the same wavelength range, as a parameter for evaluating color purity (that is to say, the greater the numerical value Tmax/Tmin is, the higher the color purity is). At this time, while the numerical value Tmax/Tmin of the green color filter 522G shown in the above-described FIG. 4 is "1.8", the numerical value Tmax/Tmin of the color filter 522G according to the present embodiment is "8", and accordingly it can be understood that the color purity of the color filter 522G according to the present embodiment is markedly higher than the color purity of the color filter 522G according to the above-described embodiments.

Also, in accordance with the present embodiment, the form of the transflective layer 528 differs from that of the first and second embodiments. That is, in the above-described embodiments, examples of configuration were described wherein the form of the transflective layer 521 (more specifically, the form of the opening portions 521a in the transflective layer 521) is selected such that the areas positioned at the center of the sub-pixels 551 serve as the light-transmitting areas. Conversely, with the present embodiment, the form of the transflective layer 528 is selected such that the areas along two opposing sides of the four sides defining each sub-pixel 551 that is substantially rectangular (the two sides extending in the Y direction) are made to be the light-transmitting areas. The following is a description of the specific form of the transflective layer 528, with reference to FIG. 12.

As shown in FIG. 12, the transflective layer 528 according to the present embodiment has a plurality of portions extending in the Y direction on the second substrate 2. On the other hand, the transparent electrodes 525 are of the same form as that shown in the above-described embodiments, but differ in that they are formed so as to cover the transflective layer 528. Thus, the transflective layer 528 according to the present embodiment is formed in stripes so as to correspond to the transparent electrodes 525. In other words, it can be said that transmissive portions (portions for transmitting illumination light from the illumination device) 528a are formed along the gap portions of the transparent electrodes 525 on the transflective layer 528. As a result of transmissive portions 528a thus formed on the transflective layer 528, the areas along the opposing sides extending in the Y direction, of the four sides defining the perimeter of the generally rectangular sub-pixel 551, serve as light-transmitting areas, as shown in FIG. 12.

In accordance with the present embodiment as well, the form of the transflective layer 528 is selected such that the dimension of the light-transmitting area at least in one sub-pixel 551 differs from the dimension of the light-transmitting areas in the other sub-pixels 551, as with the above-described first and second embodiments.

More specifically, as shown in FIG. 12, a width Wr of a reflective layer corresponding to a row of sub-pixels 551R and a width Wb of a reflective layer corresponding to a row of sub-pixels 551B are approximately equal, and a width Wb of a F: reflective layer corresponding to a row of sub-pixels 551G is wider than the width Wr and the width Wb. Accordingly, the dimension Sr of the light-transmitting area in the sub-pixel 551R and the dimension Sb of the light-transmitting area in the sub-pixel 551B are approximately equal, while the dimension Sg of the light transmitting area in the sub-pixel 551G is smaller than the dimension Sr or dimension Sb.

Here, a case where the ratio of dimension Sr and dimension Sg and dimension Sb is "Sr:Sg:Sb=1.5:1:1.5" is assumed.

Now, as shown in FIG. 4, the transmittance of the green color filter 522G shown in the above embodiment is markedly higher relative to the transmittance of the other color filters 522R or 522b of the other colors. Accordingly, in order to perform ideal white display by using the color filter 522 with the transmittance properties shown in FIG. 4 (i.e., color reproduction compensation), it is required to make the dimension of the light-transmitting area in the green sub-pixel 551G markedly smaller than the dimension of the light-transmitting area in the other color sub-pixels 551R or 551B. The transmittance of the color filter 522G with the transmittance properties shown in FIG. 11 is suppressed to a lower transmittance than the color filter 522G shown in FIG. 4, so that the difference between the dimension of the light-transmitting area in the green sub-pixel 551G and the dimension of the light-transmitting area in the other color sub-pixels 551R or 551B does not need to be secured at as high a level as in the case of using the color filter 522 shown in FIG. 4. That is to say, using the color filter 522G with the transmittance properties shown in FIG. 11 does away with the need for making the dimension of the light-transmitting area in the green sub-pixel 551G all that smaller.

FIG. 13 is a CIE chromaticity diagram indicating color coordinates of colors displayed by the liquid crystal display according to the present embodiment. In FIG. 13, the color coordinates of colors displayed by a liquid crystal display of a conventional configuration are shown as a comparative example with the present embodiment. Note that a "conventional configuration" of a liquid crystal display employs a color filter with the transmittance properties shown in FIG. 13 and has the same dimension for the transmissive areas for all sub-pixels.

In the CIE chromaticity diagram, the color coordinate in the event of performing ideal white display is generally (x, y)=(0.310, 0.316), with this point being indicated in FIG. 13 by an "x". As can be clearly seen from the figure, the color coordinates in the case of performing white display with the liquid crystal display according to the present embodiment are closer to the color coordinates of the ideal white display as compared to the color coordinates in the case of performing white display with the liquid crystal display according to the conventional configuration. In other words, good color reproduction can be realized with the liquid crystal display according to the present embodiment.

The advantages of suppressing the effects which irregularities in the spectral properties of the illumination light may have on the observed light and realizing good color reproduction are obtained with the present embodiment as with the above-described embodiments.

As indicated in the present embodiment and the above-described embodiments, in accordance with the present invention, as long as the percentage of the light-transmitting area in one of the sub-pixels making up a pixel and the percentage of the light-transmitting area in the other sub-pixels making up the pixel differ, the form of the light-transmitting areas of the sub-pixels, i.e., the form of the transmissive portion (opening portion 521a or transmissive portion 528a) in the transflective layer 521 may be any form. Also, the term "transmissive portion" in the present invention can mean "a portion in the transflective layer through which illumination light from the illumination device is transmitted", and is not restricted to opening portions (i.e., holes) formed in the transflective layer.

The above has been a description of an embodiment of the present invention, but the above-described embodiment is only an example, and it should be understood that various modifications may be made to the above embodiment without departing from the spirit and scope of the present invention. Modifications such as given below may be made, for example.

In the above first and second embodiments, the arrangement is such that the dimension of the opening portions 521a corresponding to the sub-pixels 551 is made to differ according to the spectral properties of the illumination light from the illumination device 5, but the arrangement may be as follows. That is, as shown in FIG. 14, the dimension of the opening portions 521a provided in the transflective layer 521 are generally the same, while on the other hand, the number of opening portions 521a provided for each sub-pixel 551 is of a number according to the spectral properties of the illumination light.

For example, in the above-described embodiments, the dimension ratio of the opening portions 521a corresponding to the sub-pixels 551R, 551G, and 551B, is "4:1:2" to correspond to the spectral properties of the illumination light above illustrated in FIG. 2, but with the present modification, the ratio of the number of the opening portions 521a corresponding to the sub-pixels 551R, 551G, and 551B, is made to be "4:1:2", as shown in FIG. 4. The same advantages as those of the above embodiments can be obtained with this configuration as well. Also, as shown in the embodiments, while it is conceivable that graininess might occur in the image visually recognized by an observer as the results of deviation in the position of the opening portions 521a in the sub-pixels 615, in the event that the opening portions 521a are formed corresponding to only a part of the sub-pixels 551. However, according to the configuration illustrated by the present modification, the opening portions 521a can be scattered throughout the sub-pixels 551, and thus it is advantageous that such problems can be avoided.

In the above embodiments, the percentage of light-transmitting area in the sub-pixels 551 is made to differ for each of the sub-pixels 551 corresponding to the same color. Irregularities in the spectral properties of the illumination light can be sufficiently compensated with this configuration in the event that the spectral properties of the illumination light from the illumination device 5 are the same through the entire substrate surface of the liquid crystal display panel 500. However, there may be cases wherein the spectral properties of the illumination light from the illumination device 5 differ according to places in the substrate face. For example, some places in the substrate face may be irradiated with illumination light with the spectral properties shown in FIG. 2, while other places may be irradiated with illumination light with spectral properties other than those shown in FIG. 2.

In such cases, the percentage of the light-transmitting area may be changed according to the position of the sub-pixels 551 in the substrate face (i.e., dimension of the opening portions 521a may be made to differ). For example, while the dimension ratio of the light-transmitting area in the sub-pixels 551R, 551G, and 551B, may be "4:1:2" at a pixel 615 situated at a position wherein illumination light with the spectral properties illustrated in FIG. 2 is irradiated, the dimension ratio of the light-transmitting area in the sub-pixels 551R, 551G, and 551B, may be "3:1:2" at a pixel 615 situated at a position wherein illumination light with somewhat less luminance in the blue light through the green light as compared to the above illumination light is irradiated. In this way, there is no particular need for the percentage of the light-transmitting area of the sub-pixels 551 corresponding to the same color to be all the same throughout the sub-pixels 551. According to the present modification, in addition to the advantages shown with the above embodiments, nonCfl uniformity of spectral properties of the illumination light in the substrate face can be compensated, and thus an advantage that color reproduction can be more reliably improved is obtained.

While the above embodiments illustrate examples wherein the illumination light from the illumination device exhibit the spectral properties illustrated in FIG. 2, it should be apparent that the spectral properties of the illumination light are not restricted to these. That is, even in cases of using illumination light exhibiting spectral properties other than those shown in FIG. 2 for transmissive display, advantages are obtained that irregularities in the spectral properties of the illumination light can be compensated and good color reproduction can be realized, by setting the dimension according to the spectral properties of the illumination light, such as making the dimension of the light-transmitting area in sub-pixels of a color corresponding to a wavelength of the illumination light with great luminance be smaller than the dimension of the light-transmitting area in sub-pixels of a color corresponding to a wavelength with less luminance.

Moreover, the dimension of the light-transmitting area of the sub-pixels does not necessarily need to correspond to the spectral properties of the illumination light. For example, when the dimension of the light-transmitting area in the sub-pixels 551G corresponding to green or the dimension of the light-transmitting area in the sub-pixels 551B corresponding to blue (i.e., the dimension of the opening portions 521a corresponding to these sub-pixels 551) is arranged to be greater than the dimension of the light-transmitting area in the sub-pixels 551R corresponding to red regardless of the spectral properties of the illumination light, it is possible for the display to be intentionally made blue-greenish. That is, in accordance with the present invention, all that is necessary is for the dimension of the opening portion 521a in the transflective layer 521 to be set such that the dimension of the light-transmitting area for one sub-pixel 551 is different from the dimension of the light-transmitting area for another sub-pixel 551.

In the above third embodiment, a case is illustrated wherein the form of the transflective layer 528 is selected such that the areas along two opposing sides of the four sides defining each sub-pixel are made to be the light-transmitting areas, but the form of the transflective layer 528 may be selected such that the area along one side, three sides, or all sides (four sides) of the four sides is used as the light-transmitting area. In other words, in the case of setting the area along the edges of the sub-pixel to be the light-transmitting area, all that is necessary is to make an area along at least one of the plurality of sides defining the sub-pixels be the light-transmitting area. Also, in the third embodiment, a transflective layer 528 in a form of being aligned over a plurality of sub-pixels 551 has been illustrated, but the transflective layer 528 may be of a form separated for each sub-pixel 551.

Though the above embodiments illustrate an example of a case of using a stripe array, wherein the color filters 522 of the same color form a row, other forms of arraying the color filters 522, such as mosaic arrays or delta arrays, may be used.

Also, the above embodiments illustrate a case wherein the transflective layer 521 is formed on the inner surface of the second substrate 2, but an arrangement may be conceived wherein the transflective layer 521 is formed on the outer surface of the second substrate 2. In short, a configuration wherein the transflective layer 521 is situated at the opposite side of the liquid crystal 4 in relation to the observation side will suffice.

Though the above second embodiment describes an example of an active matrix liquid crystal display using TFDs 515 as the switching devices, it should be understood that the applicable scope of the present invention is not restricted to this, and can also be applied to liquid crystal displays using three-terminal switching devices, of which TFTs (Thin Film Transistor) are representative. Note that in the case of using TFTs, a counter electrode can be formed on the entire face of one substrate, while a plurality of scanning lines and a plurality of data lines can be formed on the other substrate so as to extend in the directions where they intersect each other, and pixel electrodes connected to both of these via TFTs are arrayed in matrix fashion. In this case, the areas where the pixel electrodes and the counter electrode face one another function as the sub-pixels.

Though the above embodiments illustrate a case wherein the transflective layer 521 and the transparent electrodes 525 (data lines 527 in the second embodiment) are formed separately, but an arrangement may be made wherein an electrode for applying voltage to the liquid crystal 4 is formed of a conductive material including light-reflecting properties, so that this electrode also functions as the transflective layer 521. That is, as shown in FIG. 1, the transflective layer 521 is not provided, and a reflecting electrode of the same form as the transparent electrode 525 is provided in place thereof. In this case, opening portions of the forms illustrated as examples in the above embodiments and modifications are provided at a portion of the areas of the reflecting electrode corresponding to the sub-pixels (i.e., the areas facing the transparent electrode 511 on the first substrate 30).

FIG. 15 is a diagram illustrating an example of the liquid crystal display according to the present invention, and is a partial cross-sectional diagram illustrating an example of a passive matrix transflective color liquid crystal display wherein a color filter is provided on the inner side of the lower substrate. Also, FIG. 16 is a diagram illustrating only the transflective layer and color filter and shielding film of the liquid crystal display shown in FIG. 15, wherein FIG. 16(A) is a plan view for describing the overlapping of the transflective layer and the color filter, and FIG. 16(B) is a cross-sectional view along A–A' shown in FIG. 16(A).

Note that in the following drawings, the ratio of the film thickness and dimensions of the components are changed as appropriate to facilitate viewing of the drawings.

The liquid crystal display shown in FIG. 15 has a schematic configuration including a liquid crystal panel (liquid crystal display panel) 1, and a back-light (illumination device) disposed at the rear side of the liquid crystal panel 1 (at the outer side of the lower substrate 2).

Also, the liquid crystal panel 1 has a schematic configuration including a liquid crystal layer 4 of STN (Super Twisted Nematic) liquid crystals or the like sandwiched between the lower substrate 2 and upper substrate 3 disposed facing one another.

The lower substrate 2 is formed of glass, resin or the like, with a transflective layer 6 disposed on the inner face side of the lower substrate 2, a color filter 10 layered on the upper side of the transflective layer 6, and with a shielding film 41 of a black-colored resin material or the like provided between the pigment layers 11R, 11G and 11B making up the color filter 10. Also, a transparent smoothing film 12 for smoothing the unevenness formed by the color filter 10 is layered on the color filter 10. Further, stripe-shaped transparent electrodes (segment electrodes) 8 formed of a transparent electroconductive film such as indium tin oxide (hereafter referred to as "ITO") or the like are extended in the vertical direction to the paper on the smoothing film 12, and an alignment layer 9 of polyimide or the like is disposed above the transparent electrodes 8 so as to cover the transparent electrodes 8.

Also, a ¼ wavelength plate 18, a lower polarizer 14, and a reflecting polarizer 19, are disposed on the outer side of the lower substrate 2.

On the other hand, the upper substrate 3 is formed of glass or resin or the like, with stripe-shaped transparent electrode (common electrode) 7 formed of a transparent conductive film such as ITO or the like on the inner side of the upper substrate 3, extending in the direction orthogonal to the transparent electrodes 8 provided on the lower substrate 2 (the sideways direction in the drawing), and with an alignment layer 15 of polyimide or the like disposed below the transparent electrode 7 so as to cover the transparent electrode 7.

Also, on the outer side of the upper substrate 3, a forward scattering plate 16, a retardation film 17, and an upper polarizer 13 are layered and disposed in that order on the upper substrate 3.

Also, a reflector 51 is disposed on the lower face side of the back-light 5 (the side opposite from the liquid crystal panel 1).

Next, the planar overlapping of the transflective layer 6 and the color filter 10 in the liquid crystal display shown in FIG. 15 will be described. The transflective layer 6 is formed of a metal film with high reflectivity such as aluminum or the like, and as shown in FIG. 16, is formed by opening the metal film in the form of windows. The transflective layer 6 comprises, for each pixel, transmissive areas 6a for transmitting light emitted from the back-light 5 and incident light from the upper substrate 3 side, and a reflective area 6b for reflecting incident light from the upper substrate 3 side.

On the other hand, the color filter 10 is provided corresponding to each pixel making up the display area, having pigment layers repeatedly arrayed in the order of the red layer 11R, the green layer 11G, and the blue layer 11B, with the red layer 11R, the green layer 11G and the blue layer 11B extending in the direction vertical to the paper so as to be orthogonal to the transparent electrode 7 provided on the upper substrate 3 described above.

The pigment layers 11R, 11G, and 11B can be provided on the entirety of the area overlapping the transmissive areas 6a of the transflective layer 6 in a planar manner, and an area excluding a part of an area overlapping the reflective area 6b of the transflective layer 6 in a planar manner with the pigment layers 11R, 11G, and 11B opened in window fashion, as shown in FIG. 16. Thus, the color filter 10 includes a pigment layer formation area wherein the pigment layers 11R, 11G, and 11B are provided, and pigment layer non-formation areas 11D, 11E, and 11F which are a part of an area overlapping with the reflective area 6b in a planar manner and where the pigment layers 11R, 11G, and 11B are not provided. Also, with this liquid crystal display, the dimension of the pigment layer formation area, i.e., the dimension of the pigment layers 11R, 11G, and 11B, is set to be smaller in the order of the red layer 11R, blue layer 11B, and green layer 11G.

As shown in FIG. 15, with such a liquid crystal display, external light 30a cast into the liquid crystal display from the upper substrate 3 side in the reflective mode passes through the color filter 10, is reflected by the reflective area 6b of the transflective layer 6, passes through the color filter 10 again, and is emitted externally from the upper substrate 3 side. External light 30b incident onto the liquid crystal display from the upper substrate 3 side in the reflective mode does not pass through the color filter 10 but is reflected by the reflective area 6b, and is emitted externally from the upper substrate 3 side. External light 30c incident on the liquid crystal display from the upper substrate 3 side in the reflective mode passes through the transmissive areas 6a, and accordingly does not become reflected light.

In other words, as the reflected light, there are light 30a which passes through the pigment layers 11R, 11G, and 11B, and light 30b which passes through the pigment layer non-formation areas 11D, 11E, and 11F, and only the light 30a which has passed through the pigment layers 11R, 11G, and 11B is colored, and the light 30b which has passed through the pigment layer non-formation areas 11D, 11E, and 11F is not colored.

Accordingly, the light emitted externally from the upper substrate 3 side when in the reflective mode is the sum of the colored light 30a which has passed through the pigment layers 11R, 11G, and 11B and the uncolored light 30b which has passed through the pigment layer non-formation areas 11D, 11E, and 11F.

Also, the light 50a cast into the liquid crystal display from the back-light 5 when in the transmissive mode passes through the transmissive areas 6a, passes through the pigment layers 11 of the color filter 10, and is colored. Also, the light 50b cast into the liquid crystal display from the back-light 5 when in the transmissive mode is shielded by the transflective layer 6.

Accordingly, the light emitted externally from the upper substrate 3 side when in the transmissive mode becomes light 50a which has passed through the pigment layers 11 of the color filter 10 once and is colored.

With such a liquid crystal display, there are pigment layer non-formation areas 11D, 11E, and 11F at a part of an area overlapping with the reflective area 6b in a planar manner. Thus, as described above, the light obtained in the reflective mode is the sum of the uncolored light 30b which has passed through the pigment layer non-formation areas 11D, 11E, and 11F and the colored light 30a which has passed through the pigment layers 11. On the other hand, the light obtained in the transmissive mode is only the light 50a which passes through the pigment layer 11 and is colored.

Accordingly, the difference in color concentration between the light passing through the color filter 10 twice in the reflective mode and the light passing through the color filter 10 once in the transmissive mode can be reduced. Consequently, a color transflective liquid crystal display capable of a bright display with high visibility both in the reflective mode and transmissive mode, can be realized.

Moreover, with the liquid crystal display shown in FIG. 15, the pigment layer 11 is formed of the red layer 11R the green layer 11G, and the blue layer 11B, with the dimension of the pigment layers 11R, 11G, and 11B being smaller in the order of the red layer 11R, blue layer 11B, and green layer 11G. The color properties of the color filter 10 are adjusted by changing the dimension of the pigment layers 11R, 11G, and 11B, so that the color reproduction can be improved even further, and a liquid crystal display with even more excellent display quality can be realized.

Also, the liquid crystal display shown in FIG. 15 has a transparent film 12 for smoothing the steps between the areas where the pigment layers 11R, 11G, and 11B are provided and the pigment layer non-formation areas 11D, 11E, and 11F, so adverse effects due to steps between the areas where the pigment layers 11R, 11G, and 11B are provided and the pigment layer non-formation areas 11D, 11E, and 11F can be avoided, thereby improving the reliability of the liquid crystal display.

Also, the transflective layer fabricated of a thin metal film absorbs light in addition to reflecting and transmitting light, but with the liquid crystal display shown in FIG. 15, the transflective layer 6 is opened in a window-like manner, thereby forming the transmissive areas 6a. Thus, there is no absorbing of light, thereby improving the reflectivity and transmittance.

With the fifth embodiment, the overall configuration of the liquid crystal display is the same as the fourth embodiment shown in FIG. 15, and accordingly detailed description will be omitted.

Also, the difference between the liquid crystal display according to the fifth embodiment and the liquid crystal display according to the fourth embodiment is only the forms of the transflective layer and the color filter, and thus description of the transflective layer and the color filter will be given in detail with reference to FIG. 17.

FIG. 17 is a diagram illustrating only the transflective layer, the color filter, and the transparent electrodes on the lower substrate in the liquid crystal display according to the fifth embodiment, wherein FIG. 17(A) is a plan view for describing the overlapping of the transflective layer and the color filter, and FIG. 17(B) is a cross-sectional diagram along line C–C' shown in FIG. 17(A).

Note that in FIG. 17, the components held in common with the fourth embodiment are denoted with the same reference numerals.

As with the transparent electrodes 8 provided on the lower substrate 2, the transflective layer 61 is extended and provided in a stripe form in the direction vertical to the c: paper so as to be orthogonal to the transparent electrode 7 provided on the upper substrate 3, and provided with the same pitch as the transparent electrodes 8 provided on the lower substrate 2. Then, as shown in FIG. 17(B), the width of the pattern of the transparent electrodes 8 provided on the lower substrate 2 is formed so as to be greater than the width of the metal film pattern making up the transflective layer 61, so that band-shaped areas where the metal film making up the transflective layer 61 and the transparent electrodes 8 do not overlap in a parallel manner serve as transmissive areas 61a, and the entire area where the metal film is provided serves as a reflective area 61b.

On the other hand, as with the fourth embodiment, the color filter 101 is provided for each of the pixels making up the display area, including pigment layers 111 repeatedly arrayed in the order of the red layer 111R, the green layer 111G, and the blue layer 111B, with the red layer 111R and green layer 111G and blue layer 111B extending in the direction vertical to the paper so as to be orthogonal to the transparent electrode 7 provided on the upper substrate 3.

As shown in FIG. 17, the pigment layers 111R, 111G, and 111B are provided on the entirety of the area overlapping the transmissive areas 61a of the transflective layer 61 in a planar manner, and an area excluding a part of an area overlapping the reflective area 61b of the transflective layer 61 in a planar manner with the pigment layers 111R, 111G, and 111B opened in stripe forms.

Accordingly, the color filter 101 includes a pigment layer formation area where the pigment layers 111R, 111G, and 111B are formed, and pigment layer non-formation areas 111D, 111E, and 111F which are a part of an area overlapping with the reflective area 61b in a planar manner and where the pigment layers 111R, 111G, and 111B are not provided.

Also, with this liquid crystal display, the dimension of the pigment formation area, i.e., the dimension of the pigment layers 111R, 111G, and 111B, is set so as to be smaller in the order of the red layer 111R, the blue layer 111B, and the green layer 111G, as with the fourth embodiment.

Such a liquid crystal display also has pigment layer non-formation areas 111D, 111E, and 111F at a part of an area overlapping with the reflective area 61b of the transflective layer 61 in a planar manner, as with the fourth embodiment, so that a part of the external light incident on the liquid crystal display in the reflective mode passes through the pigment layer non-formation areas 111D, 111E, and 111F, and the light passing through the color filter 101 twice in the reflective mode is the sum of the uncolored light which has passed through the pigment layer non-formation areas 111D, 111E, and 111F and the colored light which has passed through the pigment layers 111. On the other hand, the light which is incident from the back-light 5 in the transmissive mode and passes through the transmissive areas 61a all passes through the pigment layer 111, so that light passing through the color filter 101 once in the transmissive mode is all colored. Accordingly, the difference in color concentration between the light passing through the color filter twice in the reflective mode and the light passing through the color filter once in the transmissive mode can be reduced.

Consequently, a color transflective liquid crystal display capable of display with good coloring and high visibility both in the reflective mode and transmissive mode can be realized.

Moreover, with the liquid crystal display according to the present embodiment as well, the pigment layer 111 is formed of the red layer 111R, the green layer 111G, and the blue layer 111B, with the dimension of the pigment layers 111R, 111G, and 111B being smaller in the order of the red layer 111R, the blue layer 111B, and the green layer 111G. The color properties of the color filter 101 are adjusted by changing the dimension of the pigment layers 111R, 111G, and 111B, so that the color reproduction can be improved even further, and a liquid crystal display with even more excellent display quality can be realized.

Also, in accordance with such a liquid crystal display, with regard to the transflective layer 61, the width of the pattern of the transparent electrodes 8 provided on the lower substrate 2 is formed so as to be greater than the width of the metal film pattern making up the transflective layer 61, thereby forming band-shaped transmissive areas 61a and reflective areas 61b are formed. Thus, irregularities in the longitudinal direction of the openings are reduced as compared to a transflective layer with window-like openings, providing stability from the perspective of manufacturing.

FIG. 18 is a diagram illustrating an example of another liquid crystal display according to the present invention, and is a partial cross-sectional view illustrating an example of a passive matrix transflective color liquid crystal display wherein a color filter is provided on the inner side of the upper substrate. Also, FIG. 19 is a diagram illustrating only the transflective layer and color filter of the liquid crystal display shown in FIG. 18, wherein FIG. 19(A) is a plan view for describing the overlapping of the transflective layer and the color filter, and FIG. 19(B) is a cross-sectional view along B–B' shown in FIG. 19(A).

Note that in FIG. 18 and FIG. 19, the components held in common with the fourth embodiment are denoted with the same reference numerals, and accordingly detailed description thereof will be omitted.

The liquid crystal display shown in FIG. 18 has a schematic configuration having a liquid crystal panel 100 and a back-light (illumination device) 5 disposed at the rear side of the liquid crystal panel 100 (at the outer side of the lower substrate 2).

Also, the liquid crystal panel 100 has a schematic configuration including a liquid crystal layer 4 sandwiched between the lower substrate 2 and upper substrate 3 disposed facing one another, as with the fourth embodiment.

The lower substrate 2 has on the inner side thereof a transflective layer 6 and an insulating film 23 in that order, with a stripe-shaped transparent electrode 8 (a common electrode here) formed of a transparent conductive film such as ITO or the like extending sideways in the drawing upon the insulating film 23, and with an alignment layer 9 disposed above the transparent electrode 8 so as to cover the transparent electrode 8. Also, a ¼ wavelength plate 18, a lower polarizer 14, and a reflecting polarizer 19, are disposed on the outer side of the lower substrate 2, as with the fourth embodiment.

On the other hand, a color filter 20 is layered on the inner side of the upper substrate 3, with a shielding film 42 of a black-colored resin material or the like provided between the pigment layers 21R, 21G, and 21B making up the color filter 20. Also, a transparent smoothing film 22 for smoothing the unevenness formed by the color filter 20 is layered below the color filter 20. Further, stripe-shaped transparent electrodes (segment electrodes here) 7 formed of a transparent conductive film such as ITO or the like are extended in a direction orthogonal to the transparent electrode 8 disposed on the lower substrate 2 (in the vertical direction to the paper) under the smoothing film 22, and an alignment layer 15 is disposed below the transparent electrodes 7 so as to cover the transparent electrodes 7.

Also, a forward scattering plate 16, a retardation film 17, and an upper polarizer 13 are layered and disposed in that order on the outer side of the upper substrate 3, as with the fourth embodiment. Also, a reflector 51 is disposed on the lower face side of the back-light 5 (the side opposite from the liquid crystal panel 1), as with the fourth embodiment.

Next, the planar overlapping of the transflective layer and the color filter in the liquid crystal display shown in FIG. 18 will be described. With the liquid crystal display shown in FIG. 18, the position of the liquid crystal display according to the fourth embodiment shown in FIG. 15 and the position of the color filter thereof are different, but the planar overlapping of the transflective layer and the color filter is the same as that in the fourth embodiment.

The transflective layer 6 is the same as that in the fourth embodiment and, as shown in FIG. 19, is formed by opening metal film in the form of windows, including, for each pixel, transmissive areas 6a and a reflective area 6b.

On the other hand, the color filter 20 includes pigment layers 21 repeatedly arrayed in the order of the red layer 21R, green layer 21G, and blue layer 21B, with the red layer 21R, the green layer 21G, and the blue layer 21B extending in the direction vertical to the paper so as to be orthogonal to the transparent electrode 8 provided on the lower substrate 2.

As shown in FIG. 19, the pigment layers 21R, 21G, and 21B are provided on the entirety of the area overlapping the transmissive areas 6a of the transflective layer 6 in a planar manner, and an area excluding a part of an area overlapping the reflective area 6b of the transflective layer 6 in a planar manner with the pigment layers 21R, 21G, and 21B opened in window fashion. Thus, the color filter 20 includes a pigment layer formation area wherein the pigment layers 21 are provided, and pigment layer non-formation areas 21D, 21E, and 21F which are a part of an area overlapping with the reflective area 6b in a planar manner and where the pigment layers 21R, 21G, and 21B are not provided. Also, with this liquid crystal display, the dimension of the pigment formation area, i.e., the dimension of the pigment layers 21R, 21G, and 21B, is set to be smaller in the order of the red layer 21R, the blue layer 21B, and the green layer 21G, as with the fourth embodiment.

As shown in FIG. 18, with such a liquid crystal display as well, as the light which is emitted externally from the upper substrate 3 side in the reflective mode, there are light 30a which passes through the pigment layers 21R, 21G, and 21B, and light 30b which passes through the pigment layer non-formation areas 21D, 21E, and 21F, and only the light 30a which has passed through the pigment layers 21R, 21G, and 21B is colored, and the light 30b which has passed through the pigment layer non-formation areas 21D, 21E, and 21F is not colored. Accordingly, as with the fourth embodiment, with such a liquid crystal display, the light emitted externally from the upper substrate 3 side in the reflective mode is the sum of the uncolored light 30b and the colored light 30b.

On the other hand, the light externally emitted from the upper substrate 3 side in the transmissive mode also becomes colored light 50a which has passed through the pigment layers 21 of the color filter 20 once, as with the fourth embodiment.

Accordingly, with the liquid crystal display according to the present if embodiment as well, the difference in color concentration between the light passing through the color filter 20 twice in the reflective mode and the light passing through the color filter 20 once in the transmissive mode can be reduced. Consequently, a color transflective liquid crystal display capable of display with good coloring and a high visibility both in the reflective mode and transmissive mode can be realized.

Moreover, with the liquid crystal display shown in FIG. 19, the pigment layer 21 is formed of the red layer 21R, the green layer 21G, and the blue layer 21B, with the dimension of the pigment layers 21R, 21G, and 21B being smaller in the order of the red layer 21R, the blue layer 21B, and the green layer 21G. The color properties of the color filter 20 are adjusted by changing the dimension of the pigment layers 21R, 21G, and 21B, so that the color reproduction can be improved even further, and a liquid crystal display with even more excellent display quality can be realized.

FIG. 20 is a diagram illustrating an example of another liquid crystal display according to the present invention, and is a partial cross-sectional view illustrating an example of a passive matrix transflective liquid crystal display wherein transparent electrodes are directly provided on the transflective layer. Also, FIG. 21 is a diagram illustrating only the transflective layer, a color filter and transparent electrodes on the lower substrate, in the liquid crystal display shown in FIG. 20, wherein FIG. 21(A) is a plan view for describing the overlapping of the transflective layer and the color filter, and FIG. 21(B) is a cross-sectional view along D–D' shown in FIG. 21(A).

Note that in FIG. 20 and FIG. 21, the components held in common with the fourth embodiment are denoted with the same reference numerals, and accordingly, detailed description will be omitted.

The liquid crystal display shown in FIG. 20 has a schematic configuration having a liquid crystal panel 200 and a back-light (illumination device) 5 disposed at the rear side of the liquid crystal panel 200 (at the outer side of the lower substrate 2). Also, the liquid crystal panel 200 has a schematic configuration including a liquid crystal layer 4 sandwiched between the lower substrate 2 and upper substrate 3 disposed facing one another, as with the fourth embodiment.

The lower substrate 2 includes on the inner side thereof a transflective layer 62 formed of a metal film with high light reflecting property such as aluminum or the like, and stripe-shaped transparent electrodes 8 (segment electrodes here) disposed directly on the transflective layer 62 and formed of a transparent electroconductive film such as ITO or the like, both extending vertically in the drawing, and an alignment layer 9 disposed above the transparent electrodes 8 so as to cover the transparent electrodes 8. Also, a ¼ wavelength plate 18, a lower polarizer 14, and a reflecting polarizer 19, are disposed on the outer side of the lower substrate 2, as with the fourth embodiment.

On the other hand, a color filter 104 is layered on the inner side of the upper substrate 3, with a shielding film 43 provided between the pigment layers 114R, 114G, and 114B making up the color filter 104. Also, a transparent smoothing film 32 for smoothing the unevenness formed by the color filter 104 is layered below the color filter 104. Further, a stripe-shaped transparent electrode (a common electrode here) 7 formed of a transparent conductive film ITO or the like is extended in a direction orthogonal to the transparent electrodes 8 disposed on the lower substrate 2 (in the sideways direction to the paper) under the smoothing film 32, and an alignment layer 15 is disposed below the transparent electrode 7 so as to cover the transparent electrode 7.

Also, at the outer side of the upper substrate 3, a forward scattering plate 16, a retardation film 17, and an upper polarizer 13 are layered and disposed in that order, as with the fourth embodiment. Also, a reflector 51 is disposed on the lower face side of the back-light 5 (the side opposite from the liquid crystal panel 1), as with the fourth embodiment.

Next, the planar overlapping of the transflective layer and the color filter in the liquid crystal display shown in FIG. 20 will be described.

The transflective layer 62, as with the fifh embodiment, is provided with the same pitch as the transparent electrodes 8 provided on the lower substrate 2, and as shown in FIG. 21(B), the width of the pattern of the transparent electrodes 8 provided on the lower substrate 2 is formed so as to be greater than the width of the metal film pattern making up the transflective layer 62, so that band-shaped areas where the metal film making up the transflective layer 62 and the transparent electrodes 8 do not overlap in a planar manner serve as transmissive areas 62a, and the entire area where the metal film is provided serves as a reflective area 62b.

On the other hand, the color filter 104 is provided corresponding to each of the pixels making up the display area as with the fourth embodiment, and includes pigment layers 114 repeatedly arrayed in the order of the red layer 114R, the green layer 114G, and the blue layer 114B, with the red layer 114R, green layer 114G, and blue layer 114B extending in the direction vertical to the paper so as to be orthogonal to the transparent electrode 7 provided on the upper substrate 3.

As shown in FIG. 21, the green layer 114G is provided on the entirety of the area overlapping the transmissive areas 62a of the transflective layer 62 in a planar manner, and an area excluding a part of an area overlapping the reflective area 62b of the transflective layer 62 in a planar manner with the green layer 114G opened in stripe fashion. Thus, the color filter 104 has a pigment layer formation area wherein the pigment layers 114R, 114G, and 114B are provided, and a pigment layer non-formation area 114E which is a part of an area overlapping with the reflective area 62b in a planar manner and where the green layer 114G is not provided. Also, with this liquid crystal display, the dimension of the pigment formation area, i.e., the dimension of the pigment layers 114R, 114G, and 114B, is set to be smaller in the order of the red layer 114R, the blue layer 114B, and the green layer 114G.

As shown in FIG. 20, with such a liquid crystal display as well, as the light which is emitted externally from the upper substrate 3 side in the reflective mode, there are light 30a which passes through the pigment layers 114R, 114G, and 114B, and light 30b which passes through the pigment layer non-formation area 114E, and only the light 30a which has passed through the pigment layers 114R, 114G, and 114B is colored, and the light 30b which has passed through the pigment layer non-formation area 114E is not colored. Accordingly, with such a liquid crystal display as well, the light emitted externally from the upper substrate 3 side when in the reflective mode is the sum of the uncolored light 30b and the colored light 30b, as with the forth embodiment.

On the other hand, the light externally emitted from the upper substrate 3 side in the transmissive mode also becomes colored light 50a which has passed through the pigment layers 114 of the color filter 104 once, as with the fourth embodiment.

Accordingly, with the liquid crystal display according to the present embodiment as well, the difference in color concentration between the light passing through the color filter 104 twice in the reflective mode and the light passing through the color filter 104 once in the transmissive mode can be reduced. Consequently, a color transflective liquid crystal display capable of display with good coloring and a high visibility both in the reflective mode and transmissive mode can be realized.

Moreover, with the liquid crystal display according to the present embodiment, the pigment layer 114 is formed of the red layer 114R, the green layer 114G, and the blue layer 114B, with the dimension of the pigment layers 114R, 114G, and 114B being smaller for the green layer 114G than for the red layer 114R and blue layer 114B, and the color properties of the color filter 104 are adjusted by changing the dimension of the green layer 114G, so that the color reproduction can be improved even further, and a liquid crystal display with even more excellent display quality can be realized.

Further, the pigment layer non-formation area 114E is provided only to the green layer 1140 which contributes to colorization of green, which is the most visually effective color, so that excellent colorization can be obtained, and deterioration of reflectance due to providing the pigment layer non-formation area 114E can be reduced.

Further, with the liquid crystal display according to the present embodiment, the transparent electrodes 8 formed of a transparent electroconductive film are directly disposed on the transflective layer 62 formed of a metal film, so that the resistance value of the transparent electrodes 8 can be reduced, thereby reducing color unevenness in display.

With the eighth embodiment, the overall configuration of the liquid crystal display is the same as the fourth embodiment shown in FIG. 15, and accordingly detailed description will be omitted.

Also, the liquid crystal display according to the eighth embodiment has different area for the transmissive areas of the sub-pixels as with the above-described first embodiment, and also is formed so that the dimensions of the pigment layer non-formation areas in the pigment layer differ as with the above-described fourth embodiment. Accordingly, detailed description of the configurations which are the same as the liquid crystal display according to the first embodiment and the liquid crystal display according to the fourth embodiment will be omitted, and description of the forms of the transflective layer and a color filter which are the characteristic parts of the liquid crystal display according to the eighth embodiment will be given in detail, with reference to the drawings.

Note that in the eighth embodiment, description will be made regarding a case of using illumination light wherein the luminance of wavelengths corresponding to green is stronger that the luminance of other wavelengths, and wherein the luminance of wavelengths corresponding to blue is weaker than the luminance of other wavelengths.

FIG. 32 is a diagram illustrating the transflective layer and color filter of the liquid crystal display according to the eighth embodiment, and is a diagram corresponding to FIG. 16(A) described in the fourth embodiment.

In FIG. 32, reference numeral 703 denotes a transflective layer. The transflective layer 703 has, for each pixel, transmissive areas 701 formed by opening the metal film in window fashion for transmitting light emitted from the back-light 5 or incident light from the upper substrate 3, and reflective area 702 (hatched diagonally upwards toward the right in FIG. 32) for reflecting incident light from the upper substrate 3, as with the fourth embodiment.

However, unlike the fourth embodiment, in the present embodiment as shown in FIG. 32, the transflective layer 703 is such that the dimension of the opening portions corresponding to each of the sub-pixels 751R, 751G, and 751B, making up each pixel 751, that is to say, the dimension of the transmissive areas 701R, 701G, and 701B, making up the transflective layers 703R, 703G, and 703B, and the dimension of the reflective areas 702R, 702G, and 702B, are at dimension ratios according to the spectral properties of the illumination light emitted from the illumination device 5.

On the other hand, as with the fourth embodiment, the color filter is provided for each of the pixels making up the display area, including pigment layers 711 repeatedly arrayed in the order of the red layer 711R, green layer 711G, and blue layer 711B, with the red layer 711R and green layer 711G and blue layer 711B extending so as to be orthogonal to the transparent electrode 7 provided on the upper substrate 3.

As shown in FIG. 32, the pigment layers 711R, 711G, and 711B, are provided on the entirety of the area overlapping the transmissive areas 701R, 701G, and 701B of the transflective layers 703R, 703G, and 703B in a planar manner, and an area excluding a part of an area overlapping the reflective areas 702R, 702G, and 702B in a planar manner with the pigment layers 711R, 711G, and 711B opened in window forms. Accordingly, the color filter includes a pigment layer formation area where the pigment layers 711R, 711G, and 711B are formed, and pigment layer non-formation areas 711D, 711E, and 711F which are a part of an area overlapping with the reflective areas 702R, 702G, and 702B in a planar manner and where the pigment layers 711R, 711G, and 711B are not provided.

With the present embodiment, with regard to the sub-pixel 751G where the green layer (green color filter) 711G is formed, the dimension of the transmissive area 701G corresponding thereto is smaller in comparison to the sub-pixels 751R and 751B corresponding to the other colors. Conversely, with regard to the sub-pixel 751B where the blue layer (blue color filter) 711B is formed, the dimension of the transmissive area 701B corresponding thereto is larger in comparison to the sub-pixels 751R and 751G corresponding to the other colors.

Also, with this liquid crystal display, the dimension of the pigment layer formation area, i.e., the dimension of the pigment layers 711R, 711G, and 711B is set to be smaller in the order of the blue layer 711B, the red layer 711R, and the green layer 711G.

With such a liquid crystal display, the display colors and brightness are adjusted by performing both of the following first adjustment and second adjustment.

For the first adjustment, the brightness is adjusted such that transmittance sufficient for obtaining bright light can be obtained in the transmissive mode by changing the ratio of the transmissive areas 701R, 701G, and 701B, and the reflective areas 702R, 702G, and 702B.

Also, the sub-pixel 7510 where the green layer 711G is formed is made to be smaller in comparison with the other sub-pixels 751R and 751B, and the sub-pixel 751B where the blue layer 711B is formed is made to be larger in comparison with the other sub-pixels 751R and 751G, thereby changing the ratio of the transmissive areas 701R, 701G, and 701B, and the reflective areas 702R, 702G, and 702B. Thus, there is sufficient light of the wavelengths corresponding to the red light and blue light which have comparatively low luminance in the illumination light passing through the transflective layer 703, while light with the wavelength corresponding to green which have comparatively high luminance is restricted to pass through the transflective layer 703, thereby adjusting the color display.

For the second adjustment, the brightness is adjusted such that transmittance sufficient for obtaining bright light in the reflective mode can be obtained by changing the ratio of the dimension of the pigment layer formation area which is the dimension of the pigment layers 711R, 711G, and 711B, and the dimension of the pigment layer non-formation areas 711D, 711E, and 711F.

Also, the dimension of the pigment layers 711R, 711G and 711B, is set to be smaller in the order of the blue layer 711B, the red layer 711R, and the green layer 711G, and the ratio of the dimension of the pigment layer formation area which is the dimension of the pigment layers 711R, 711G, and 711B, as to the dimension of the pigment layer non-formation areas 711D, 711E, and 711F, is changed. Thus, the color properties of the color filter are adjusted, and display color is adjusted.

Note that display color in the reflective mode is changed in the first adjustment by changing the dimension of the reflective areas 702R, 702G, and 702B accompanying changing the ratio of the transmissive areas 701R, 701G, and 701B and the reflective areas 702R, 702G, and 702B. Even in the event that the display color in the reflective mode has changed due to the first adjustment, the second adjustment performs compensation, and change in the display color in the reflective mode due to the first adjustment can be prevented from causing problems in the display color in the actual reflective mode when the second adjustment is performed in consideration of the change in display color by the first adjustment.

With the liquid crystal display according to the present embodiment, both the first adjustment which can be carried out by changing the ratio of the transmissive areas 701R, 701G, and 701B, and the reflective areas 702R, 702G, and 702B, and the second adjustment which can be carried out by changing the ratio of the dimension of the pigment layer formation area and the dimension of the pigment layer non-formation areas 711D, 711E, and 711F, are performed, so in the event that the transmissive areas 701R, 701G, and 701B are enlarged to improve transmittance in the first adjustment so that bright display can be obtained in the transmissive mode, and the reflective areas 702R, 702G, and 702B become small, reducing the dimension of the pigment layer non-formation areas 711D, 711E, and 711F in the second adjustment allows reflectance sufficient for obtaining bright light in the reflective mode to be obtained. Accordingly, there is no problem that the display in the reflective mode becomes dark even in the event that the transmissive areas 701R, 701G, and 701B are enlarged so that bright display can be obtained in the transmissive mode.

Thus, according to the above-described liquid crystal display, brightness can be effectively adjusted, and a bright display can be made both in the reflective mode and the transmissive mode.

With the liquid crystal display according to the present embodiment, both the first adjustment which can be carried out by changing the ratio of the transmissive areas 701R, 701G, and 701B, and the reflective areas 702R, 702G, and 702B, and the second adjustment which can be carried out by changing the ratio of the dimension of the pigment layer formation area and the dimension of the pigment layer non-formation areas 711D, 711E, and 711F, are performed, so that display color can be effectively adjusted, and extremely excellent color reproduction can be obtained.

Specifically, with the liquid crystal display according to the present embodiment, the effects which irregularities in spectral properties of the illumination light have on the observed light can be suppressed, and event in the event that transmissive display is performed using illumination light wherein the luminance of wavelengths corresponding to the green light is greater than the luminance of the other wavelengths, and wherein the luminance of wavelengths corresponding to the blue light is smaller than the luminance of the other wavelengths, situations wherein the image visually recognized by the observer is colored, can be avoided. In other words, as with the first embodiment, the non-uniformity in the spectral properties of the illumination light is compensated, thereby realizing good color reproduction.

Further, whereas the first embodiment is only adjustment of the display color and brightness equivalent to the first adjustment in the present embodiment, and the fourth embodiment is only adjustment of the display color and brightness equivalent to the aid second adjustment in the present embodiment, both the first adjustment and second adjustment are performed with the liquid crystal display according to the present embodiment, so that color reproduction can be improved even further, and a liquid crystal display with even more excellent display quality can be realized.

Moreover, with this liquid crystal display, pigment layer non-formation areas 711D, 711E, and 711F are formed at a part of the area overlapping the reflective areas 702R, 702G, and 702B of the transflective layers 703R, 703G, and 703B in a planar manner, so that part of the external light incident onto the liquid crystal display in the reflective mode passes through the pigment layer non-formation areas 711D, 711E, and 711F. Further, the light passing trough the color filter twice in the reflective mode is the sum of the uncolored light which has passed through the pigment layer non-formation areas 711D, 711E, and 711F and the colored light which has passed through the pigment layers 711. On the other hand, the light which is incident from the back-light 5 in the transmissive mode and passes through the transmissive areas 701R, 701G, and 701B, all passes through the pigment layer 711, so that light passing through the color filter once in the transmissive mode is all colored. Accordingly, the difference in color concentration between the light passing through the color filter twice in the reflective mode and the light passing through the color filter once in the transmissive mode can be reduced.

Consequently, as with the fourth embodiment, a color transflective liquid crystal display capable of display with good coloring and high visibility both in the reflective mode and transmissive mode can be realized.

With the ninth embodiment, the overall configuration of the liquid crystal display is the same as the fifth embodiment shown in FIG. 17, and accordingly detailed description will be omitted.

Also, the liquid crystal display according to the ninth embodiment has different dimensions for the transmissive areas of the sub-pixels and also is formed so that the dimensions of the pigment layer non-formation areas in the pigment layers differ, as with the above-described eighth embodiment. Accordingly, the liquid crystal display according to the ninth embodiment differs from the liquid crystal display according to the eighth embodiment only in the forms of the transflective layer and color filter. Accordingly, the transflective layer and the color filter will be described in detail, with reference to the drawings.

FIG. 33 is a diagram illustrating the transflective layer and the color filter of the liquid crystal display according to the ninth embodiment, and is a diagram corresponding to FIG. 17(A) described with the fifth embodiment.

In FIG. 33, reference numeral 803 denotes a transflective layer. As with the fifth embodiment, the transflective layer 803 is extended and provided in a stripe form in the direction vertical to the paper so as to be orthogonal to the transparent electrode 7 provided on the upper substrate 3, and provided with the same pitch as the transparent electrodes 8 provided on the lower substrate 2. Then, as shown in FIG. 33, the width of the pattern of the transparent electrodes 8 provided on the lower substrate 2 is formed so as to be greater than the width of the metal film pattern making up the transflective layer 803, so that band-shaped areas where the metal film making up the transflective layer 803 and the transparent electrodes 8 do not overlap in a planar manner serve as transmissive areas 801, and the entire area where the metal film is provided serves as a reflective area 802 (hatched diagonally upwards toward the right in FIG. 33).

However, unlike the fifth embodiment, with the present embodiment, as shown in FIG. 33, the transflective layer 803 is such that the areas along the edges of the sub-pixels 851R, 851G, and 851B, making up each pixel 851, that is to say, the dimension of the transmissive areas 801R, 801G, and 801B, making up the transflective layers 803R, 803G, and 803B, and the dimension of the reflective areas 802R, 802G, and 802B, are at dimension ratios according to the spectral properties of the illumination light emitted from the illumination device 5.

On the other hand, as with the fifth embodiment, the color filter is provided for each of the pixels making up the display area, including pigment layers 811 repeatedly arrayed in the order of the red layer 811R, green layer 811G, and blue layer 811B, with the red layer 811R, the green layer 811G, and blue layer 811B extending so as to be orthogonal to the transparent electrode 7 provided on the upper substrate 3.

As shown in FIG. 33, the pigment layers 811R, 811G, and 811B, are provided on the entirety of the area overlapping the transmissive areas 801R, 801G, and 801B of the transflective layers 803R, 803G, and 803B in a planar manner, and an area excluding a part of an area overlapping the reflective areas 802R, 802G, and 802B of the transflective layers 803R, 803G, and 803B in a planar manner with the pigment layers 111R, 111G, and 111B opened in stripe forms.

Accordingly, the color filter includes a pigment layer formation area where the pigment layers 811R, 811G, and 811B are formed, and pigment layer non-formation areas 811D, 811E, and 811F which are a part of an area overlapping with the reflective areas 802R, 802G, and 802B in a planar manner and where the pigment layers 811R, 811G, and 811B are not provided.

Also, in the present embodiment, with regard to the sub-pixel 851G where the green layer (green color filter) 811G is formed, the dimension of the transmissive area 801G corresponding thereto is smaller in comparison to the sub-pixels 851R and 851B 3 corresponding to the other colors, as with the eighth embodiment. Conversely, with regard to the sub-pixel 851B where the blue layer (blue color filter) 811B is formed, the dimension of the transmissive area 801B corresponding thereto is greater in comparison to the sub-pixels 851R and 851G corresponding to the other colors. Also, with this liquid crystal display, the dimension of the pigment formation area, i.e., the dimension of the pigment layers 811R, 811G, and 811B, is set so as to be smaller in the order of the blue layer 811B, the red layer 811R, and the green layer 811G, as with the eighth embodiment.

With such a liquid crystal display as well, the display colors and brightness can be adjusted by changing the ratio of the transmissive areas 801R, 801G, and 801B, and the reflective areas 802R, 802G, and 802B, and also by changing the ratio of the dimension of the pigment layer formation area and the dimension of the pigment layer non-formation areas 811D, 811E, and 811F. Accordingly, display color and brightness can be effectively adjusted.

Consequently, as with the eighth embodiment, a liquid crystal display capable of bright display both in the reflective mode and in transmissive mode, and extremely excellent color reproduction can be realized.

Further, with this liquid crystal display as well, pigment layer non-formation areas 811D, 811E, and 811F are formed, so that the difference in color concentration between the light passing through the color filter twice in the reflective mode and the light passing through the color filter once in the transmissive mode can be reduced, and a color transflective liquid crystal display capable of display with good colorization and high visibility both in the reflective mode and transmissive mode, can be realized.

It should be understood that the liquid crystal display according to the present invention is not restricted to the above-described embodiments, but rather may be arranged wherein, for example the transflective layer is formed of aluminum, and the pigment layer includes a blue layer and a red layer, wherein the dimension of the pigment layer formation area is set so as to be smaller for the blue layer than for the red layer. With such a liquid crystal display, the dimension of the pigment layer formation area is set such as to be smaller for the blue layer than for the red layer, so even in the event that the light reflected by the transflective layer is colored blue due to the transflective layer being formed of aluminum, the light is compensated by passing through the color filter twice. Accordingly, a liquid crystal display with excellent color reproduction and high display quality can be realized.

Also, an arrangement may be made wherein the transflective layer is formed of silver, and the pigment layer includes a red layer and a blue layer, wherein the dimension of the pigment layer formation area is set such as to be smaller for the red layer than for the blue layer. With such a liquid crystal display, the dimension of the pigment layer formation area is set such as to be smaller for the red layer than for the blue layer, so that even in the event that the light reflected by the transflective layer is colored yellow due to the transflective layer being formed of silver, the light can be compensated by passing through the color filter twice. Accordingly, a liquid crystal display with excellent color reproduction and high display quality can be realized.

Also, with the liquid crystal display according to the present invention, the smoothing film may be formed so as to cover over the color filter as in the example shown in the above-described embodiments, but anything that will smooth the unevenness formed by the color filter is sufficient, and thus may be formed only on the pigment layer non-formation area of the color filter, for example. With an arrangement wherein the smoothing film is formed only on the pigment layer non-formation area of the color filter, and an overcoat layer is provided over the smoothing film, the thickness of the overcoat layer can be made thinner as compared to arrangements wherein an overcoat layer is provided without a smoothing film. Also, an arrangement may be made wherein, for example, an overcoat layer is formed without a smoothing layer, wherein the unevenness formed by the color filter is smoothed by the overcoat layer, so that the overcoat layer also serves as a smoothing film.

Also, smoothing may be performed by embedding a smoothing film in the pigment layer non-formation area, as with the example described in the above-described embodiment, but smoothing may be performed by forming a transparent layer separate from the smoothing film and embedding the pigment layer non-formation area, and then forming a smoothing film over the transparent layer and the pigment layer formation area.

Also, the transflective layer refers to an article with reflecting functions provided with a transmitting portions, and needs not be a simple reflective layer. In other words, this may be a reflective polarizer with polarizing functions. Examples of reflective polarizers include circular polarizers using cholesteric liquid crystal, beam-splitter linear polarizers using Brewster's angle, wire grid linear polarizers wherein a plurality of slits around 60 nm are formed in a reflective layer, and so forth.

Also, though passive matrix liquid crystal displays can be given as examples of liquid crystal displays to which the present invention can be applied as with the above-described embodiments, the present invention is also applicable to active matrix liquid crystal displays using thin film diodes (TFD), thin film transistors (TFT), and so forth, as switching devices.

Next, description will be given regarding electronic apparatus including the liquid crystal display according to the above embodiments.

First, an example wherein the above-described liquid crystal display is applied to the display unit of a cellular telephone will be described. FIG. 22 is a perspective view illustrating the configuration of this cellular telephone. As shown in the figure, the cellular telephone 1032 comprises a plurality of operating buttons 1321, an earpiece 1322, a mouthpiece 1323, and along with these, a display unit 1324 using the liquid crystal display according to the present invention (only the first substrate 3 is shown in FIG. 22).

FIG. 23 is a perspective view illustrating an example of a wristwatch-type electronic device. In FIG. 23, reference numeral 1100 denotes the main unit of the watch, and reference numeral 1101 denotes the liquid crystal display unit using the aforementioned liquid crystal display.

FIG. 24 is a perspective view illustrating an example of a mobile information processing device such as a word processor, mobile personal computer, or the like. In FIG. 24, reference numeral 1200 denotes the information processing device, reference numeral 1202 denotes an input unit such as a keyboard, reference numeral 1204 denotes the main unit of the information processing device, and reference numeral 1206 denotes the liquid crystal display unit using the liquid crystal display.

Now, in addition to the cellular telephone shown in FIG. 22, the wristwatch-type electronic device shown in FIG. 23, and the personal computer shown in FIG. 24, examples of electronic apparatus include liquid crystal televisions, viewfinder or monitor-viewing video cassette recorders, car navigation devices, pagers, electronic notebooks, calculators, word processors, workstations, video phones, POS terminals, equipment comprising touch panels, and the like.

As described above, with the liquid crystal display according to the present invention, irregularities in spectral properties of the illumination light from the illumination device can be compensated and high color reproduction can be realized, which-can be used to form an electronic apparatus comprising a liquid crystal display with good coloring and high visibility both in the reflective mode and transmissive mode, and accordingly this is particularly suitable for electronic apparatuses that require high-quality in display.

Next, the advantages of the present invention will be made clear through examples, but it should be understood that the present invention is not limited to the following embodiments. Also, the reflective film in the test example 1 through the test example 4 is a silver alloy colored yellow.

In a first test example, a liquid crystal display according to the fifth embodiment shown in FIG. 17 was fabricated, the dimension ratio of the transmissive area and the reflective area was set at 17:19, and dimension ratio of the pigment layer non-formation areas 111D, 111E, and 111F which are areas where the pigment layers 111R, 111G, and 111B, are not formed, is further set such that the red layer 111D:the green layer 111E:the blue layer 111F=4:14:6.

In a second test example, as shown in FIG. 25, a liquid crystal display was fabricated in the same manner as the liquid crystal display according to the fifth embodiment shown in FIG. 17, except that the dimension ratio of the transmissive area and the reflective area was set at 17:19, and the dimension ratio of the pigment layer non-formation areas 112D, 112E, and 112F in the color filter 102 which are areas where the pigment layers 112R, 112G, and 112B, are not formed, is further set such that the red layer 112D:the green layer 112E:the blue layer 112F=1:1:1.

In a third test example, as shown in FIG. 26, a liquid crystal display was fabricated in the same manner as the liquid crystal display according to the fifth embodiment shown in FIG. 17, except that the dimension ratio of the transmissive area and the reflective area was set at 11:25, and that there are no pigment layer non-formation areas in the pigment layers 113R, 113G, and 113B of the color filter 103, and that the color properties of the color filter were optimized (the color purity was lowered) to give priority to the display in the reflective mode.

Now, with regard to the above test example 1 through test example 3, the test example 1 is an example of the present invention, and test example 2 and test example 3 are comparative examples.

The light obtained in the reflective mode and in the transmissive mode was measured regarding the liquid crystal displays according to test example 1 through test example 3 thus manufactured.

The results thereof are shown in Table 1, and FIG. 27 through FIG. 30.

FIG. 27 is a diagram illustrating the results of measuring the light emitted from the liquid crystal display according to the test example 1, wherein FIG. 27(A) is a chromaticity diagram of the light obtained in the reflective mode, and 27(B) is a chromaticity diagram of the light obtained in the transmissive mode. Also, FIG. 28 is a diagram illustrating the results of measuring the light emitted from the liquid crystal display according to the test example 2, wherein FIG. 28(A) is a chromaticity diagram of the light obtained in the reflective mode, and 28(B) is a chromaticity diagram of the light obtained in the transmissive mode. Also, FIG. 29 is a diagram illustrating the results of measuring the light emitted from the liquid crystal display according to the test example 3, wherein FIG. 29(A) is a chromaticity diagram of the light obtained in the reflective mode, and 29(B) is a chromaticity diagram of the light obtained in the transmissive mode.

TABLE 1

| Mode Properties | Reflective mode | | Transmissive mode | |
| --- | --- | --- | --- | --- |
| | White display reflectivity | Color range dimension | White display transmittance | Color range dimension |
| Test Example 1 | 26.3% | $1.73 \times 10^{-2}$ | 2.3% | $1.50 \times 10^{-2}$ |
| Test Example 2 | 26.2% | $1.55 \times 10^{-2}$ | 2.3% | $1.50 \times 10^{-2}$ |
| Test Example 3 | 34.1% | $1.35 \times 10^{-2}$ | 2.1% | $0.50 \times 10^{-2}$ |

Here, the term "color range dimension" means the dimension of a triangle formed by connecting the three points of the x, y coordinates of the red, green, and blue display colors on a CIE chromaticity diagram.

The liquid crystal display according to the test example 3 which is a comparative example has a narrow color range dimension for both the light obtained in the reflective mode and the light obtained in the transmissive mode, as can be seen from Table 1, FIG. 29, and FIG. 30.

Also, the liquid crystal display according to the test example 2 which is a comparative example, has a color range dimension wider in comparison with the liquid crystal display according to the test example 3 for both the light obtained in the reflective mode and the light obtained in the transmissive mode, as can be seen from Table 1, FIG. 28, FIG. 29. Moreover, there is sufficient white display reflectivity. However, with the light obtained in the reflective mode, the red display is purplish.

In comparison, the liquid crystal display according to the test example 1, which is an example of the present invention, has a color range dimension wider in comparison with the liquid crystal display according to the test example 3 for both the light obtained in the reflective mode and the light obtained in the transmissive mode, as can be seen from Table 1, FIG. 27, and FIG. 28, and has sufficient white display reflectivity.

Further, the color range dimension for the light obtained in the reflective mode is also wider in comparison with the liquid crystal display according to the test example 2. Moreover, as with the liquid crystal display according to the test example 2, the color of purity of the red display and blue display increases in the light obtained in the reflective mode.

Accordingly, it was confirmed that with the liquid crystal display according to the test example 1 which is an example of the present invention, there is little difference in color concentration between the light obtained in the reflective mode and the light obtained in the transmissive mode, color reproduction is excellent, and there is sufficient white display reflectivity.

Thus, it is clear that in comparison with the liquid crystal displays according to the test example 2 and test example 3 which are comparative examples, the liquid crystal display according to the test example 1 which is an example of the present invention has good coloring in both the reflective mode and the transmissive mode, and that display with high visibility can be made.

In a fourth test example, a liquid crystal display according to a seventh embodiment shown in FIG. 20 and FIG. 21 was made, with the dimension ratio of the transmissive are and the reflective area at 17:19, and further the dimension ratio of the area where the green layer 114G is formed and the pigment layer non-formation area 111E where the green layer 114G is not formed was set at 7:1, using a color filter with the spectral properties shown in FIG. 31 as the color filter. That is, in comparison to the liquid crystal display according to the test example 1, the color purity of the green and the red color filters is increased, and instead the color purity of the blue color filter is lowered, thereby raising the transmittance.

Note that the above test example 4 is an example of the present invention.

The light obtained in the reflective mode and in the transmissive mode was measured regarding liquid crystal display according to the test example 4 thus manufactured, in the same manner as with the liquid crystal display according to the test example 1. The results thereof are shown in Table 2 and FIG. 30.

FIG. 30 is a diagram illustrating the results of measuring the light emitted from the liquid crystal display according to the test example 4, wherein FIG. 30(A) is a chromaticity diagram of the light obtained in the reflective mode, and FIG. 30(B) is a chromaticity diagram of the light obtained in the transmissive mode.

TABLE 2

| Mode Properties | Reflective mode | | Transmissive mode | |
| --- | --- | --- | --- | --- |
| | White display reflectivity | Color range dimension | White display transmittance | Color range dimension |
| Test Example 4 | 26.0% | $2.62 \times 10^{-2}$ | 2.2% | $2.65 \times 10^{-2}$ |

As can be seen in Table 2 and FIG. 30, with the liquid crystal display according to the test example 4, though the white display reflectivity and transmittance did not change much in comparison to the liquid crystal display according to the test example 1, the color purity of green increased, and the color range dimension for the light obtained in the reflective mode and the light obtained in the transmissive mode was also improved a great deal.

Accordingly, providing a pigment layer non-formation area 114E only for the green layer 114G that contributes to coloring of green, which is the most visually effective color, allows excellent colorization to be obtained, and deterioration of white display reflectivity due to providing the pigment layer non-formation area 114E can be reduced.

Also, lowering the color purity of the blue color filter to raise the transmittance, and providing the pigment layer non-formation area 114E only for the green layer 114G, improved the yellow coloring owing to the reflective layer in the reflective mode being silver.

In test examples 5–8, liquid crystal displays were fabricated, using the areas shown in Table 3 as the transmissive area, the pigment layer formation area which is the dimension of the pigment layers, and the pigment layer non-formation area.

Note that of the above test example 5 through test example 8, test example 5 through test example 7 are examples of the present invention, and test example 8 is a conventional example.

Also, an example of the dimensions of the components for fabricating the liquid crystal display according to the test example 7 is shown in FIG. 33. The units of dimensions of the components shown in FIG. 33 are in $\mu$m, with the sub-pixel pitch at 237×79 ($\mu$m), and the sub-pixel dimension at 14784 $\mu$m$^2$.

|  |  | Test example 8 | Test example 5 | Test example 6 | Test example 7 |
|---|---|---|---|---|---|
| Dimension of transmissive area ($\mu m^2$) | Red | 5824 | 6496 | 6496 | 6272 |
|  | Green | 5824 | 4928 | 4928 | 4928 |
|  | Blue | 5824 | 6496 | 6496 | 6270 |
| Dimension of pigment layer formation area ($\mu m^2$) | Red | 8960 | 8288 | 7748 | 7072 |
|  | Green | 8960 | 6796 | 6256 | 4456 |
|  | Blue | 8960 | 8288 | 8288 | 7344 |
| Dimension of pigment layer non-formation area ($\mu m^2$) | Red | 0 | 0 | 540 | 1440 |
|  | Green | 0 | 3060 | 3600 | 5400 |
|  | Blue | 0 | 0 | 0 | 720 |
| Reflectivity (%) |  | 17.1 | 20.0 | 21.2 | 25.1 |
| White display in reflective mode | x | 0.306 | 0.314 | 0.313 | 0.319 |
|  | y | 0.335 | 0.327 | 0.325 | 0.324 |
| Transmittance (%) |  | 3.0 | 3.0 | 3.0 | 3.0 |
| White display in transmissive mode | x | 0.312 | 0.311 | 0.311 | 0.310 |
|  | y | 0.339 | 0.324 | 0.324 | 0.319 |

The white display x, y coordinates on the CIE chromaticity diagram in the reflective mode and the transmissive mode, the reflectivity, and the transmittance, were measured for the liquid crystal displays according to test example 5 through test example 8 thus fabricated. The results thereof are shown in Table 3.

With the liquid crystal display according to the test example 8, it can be understood that the white display in the reflective mode and the white display in the transmissive mode are greenish. Also, it can be understood that the reflectivity is low, and that the display in the reflective mode is dark.

In comparison, with the test example 5, in the state that the transmittance in the test example 8 was maintained, the width of the pattern of the metal film making up the transflective layer was adjusted to make the dimension of the transmissive area for the green smaller, and to make the dimension of the transmissive area for red and the transmissive area for blue larger, and also a green pigment layer non-formation area was provided.

Consequently, with the test example 5, as shown in Table 3, the reflectivity improved in comparison with the test example 8, the greenness of the white display in the reflective mode and the transmissive mode was improved, coming closer to the ideal white display color coordinates (x=0.310, y=0.316) on the CIE chromaticity diagram.

Also, with the test example 6, in the state that the transmittance in the test example 8 and the dimension of the transmissive area in the test example 5 were maintained, the green pigment layer non-formation area was enlarged, and also a red pigment layer non-formation area was provided.

Consequently, with the test example 6, as shown in Table 3, the reflectivity improved even more in comparison with the test example 5, the greenness of the white display in the reflective mode was improved even further, coming even closer to the ideal white display color coordinates.

Also, with the test example 7, in the state that the transmittance in the test example 8 and the dimension of the green transmissive area in the test example 5 and the test example 6 were maintained, the green pigment layer non-formation area was enlarged even further while reducing the dimension of the red transmissive area and enlarging the dimension of the blue transmissive area, the red pigment layer non-formation area was enlarged, and a blue pigment layer non-formation area was provided.

Consequently, with the test example 7, as shown in Table 3, the reflectivity improved even more in comparison with the test example 6 with little change in the white display in the transmissive mode, coming even closer to the ideal white display color coordinates for white display in the transmissive mode.

It was thus confirmed from the test example 5 through test example 8 that securing transmittance whereby a bright display can be obtained in the transmissive mode while enlarging the dimension of the pigment layer non-formation area allows sufficient reflectivity for a bright display in the reflective mode to be obtained, and that a liquid crystal display capable of a bright display in both the reflective mode and transmissive mode can be obtained.

Also, it was confirmed that a liquid crystal display capable of display with excellent color reproduction in both the reflective mode and transmissive mode can be obtained, by adjusting the dimension of the transmissive area and the dimension of the pigment layer non-formation area (pigment layer formation area).

In test example 9, a liquid crystal display according to an eight embodiment shown in FIG. 32 was fabricated wherein the transmissive areas 701R, 701G, and 701B, the pigment layer formation area which is the dimension of the pigment layers 711R, 711G, and 711B, and the pigment layer non-formation areas 711D, 711E, and 711F are the same dimension as the seventh embodiment shown in Table 3. Note that the test example 9 is an example of the present embodiment.

Also, FIG. 32 shows an example of the dimensions of the components for fabricating the liquid crystal display according to the eighth embodiment including the same dimensions as those of the components for the liquid crystal display according to the test example 7. The units of dimension of the components shown in FIG. 32 are in lm, with the sub-pixel pitch at 237×79 ($\mu$m), and the sub-pixel dimension at 14784 $\mu m^2$.

The reflectivity, white display in the reflective mode, the transmittance, and the white display in the transmissive mode, were each measured for the liquid crystal display according to the test example 9 thus fabricated. Consequently, results the same as those of the seventh example shown in Table 3 were obtained.

As shown in Table 3, with the liquid crystal display according to the test example 9, in comparison with the test example 8, the reflectivity improved, the greenness in the white display in the reflective mode and the transmissive mode was improved, being closer to white.

Accordingly, it was confirmed with the liquid crystal display according to the eighth embodiment as well, as with the liquid crystal display according to the ninth embodiment, that a liquid crystal display capable of display with excellent color reproduction in both the reflective mode and transmissive mode can be obtained, and regardless of the shape of the transmissive area and pigment layer non-formation area (pigment layer formation area), adjusting the dimension of the transmissive area and pigment layer non-formation area (pigment layer formation area) for each color enables a liquid crystal display capable of display with excellent color reproduction in both the reflective mode and transmissive mode to be obtained.

As described above, according to the present invention, the percentage of transmissive area in the sub-pixels is a percentage according to the spectral properties of the illumination light, so that even in the event that the spectral properties of the illumination light used for transmissive display are not uniform, deterioration in color reproduction due to this can be suppressed.

Also, with the liquid crystal display according to the present invention, the pigment layers are formed on the entirety of the area overlapping the transmissive area in a planar manner, and an area excluding a part of an area overlapping the reflective area in a planar manner, with a pigment layer formation area where the pigment layers are formed, and a pigment layer non-formation area at a part of an area overlapping the reflective area in a planar manner, so that the light passing trough the color filter twice in the reflective mode is the sum of the uncolored light which has passed through the pigment layer non-formation area and the colored light which has passed through the pigment layer formation area.

On the other hand, light passing through the color filter once in the transmissive mode is all colored. Accordingly, the difference in color concentration between the light passing through the color filter twice in the reflective mode and the light passing through the color filter once in the transmissive mode can be reduced. Consequently, a color transflective liquid crystal display capable of display with good coloring and high visibility both in the reflective mode and transmissive mode can be realized.

Moreover, with the liquid crystal display according to the present invention, the dimension of the pigment layer formation area differs between at least one color pigment layer of the pigment layers and another color pigment layer, so that the color properties of the color filter can be adjusted by changing the dimension of the pigment layer formation area, thereby improving color reproduction, and realizing a liquid crystal display with excellent display quality.

Also, with the liquid crystal display according to the present invention, a transparent film for smoothing the steps between the pigment layer formation area and the areas where the pigment layers are provided is provided, so that adverse effects due to the steps between the pigment layer formation area and the areas where the pigment layers are not provided can be prevented, thereby improving the reliability of the liquid crystal display.

What is claimed is:

1. A liquid crystal display, comprising:
a liquid crystal display panel formed of liquid crystals sandwiched between a pair of opposing substrates, and including pixels having a plurality of sub-pixels each corresponding to different colors, the sub-pixels having outer edges;
an illumination device provided to an opposite side of the liquid crystal display panel in relation to an observation side that illuminates the liquid crystal display panel with illumination light;
a transflective layer disposed on the opposite side of the liquid crystals in relation to the observation side, the transflective layer including for each sub-pixel a reflective portion and a transmissive portion that transmits the illumination light, each reflective portion having an outer edge disposed at at least one of the outer edges of the corresponding sub-pixel, at least one sub-pixel out of the plurality of sub-pixels having a transmissive area with a first dimension, and another sub-pixel out of the plurality of sub-pixels having a transmissive area with a second dimension, the first dimension being different from the second dimension; and
a color filter provided corresponding to each of the sub-pixels that transmits light of a wavelength corresponding to a color of each sub-pixel.

2. The liquid crystal display according to claim 1, the dimension of the transmissive area at each sub-pixel being a dimension differing according to the luminance of a wavelength of the illumination light corresponding to a color of the sub-pixel.

3. The liquid crystal display according to claim 2, the dimension of the transmissive area at a sub-pixel of a color corresponding to a wavelength of the illumination light with great luminance being smaller than the dimension of the transmissive area at a sub-pixel of a color corresponding to a wavelength of the illumination light with small luminance.

4. The liquid crystal display according to of claim 1, the dimension of the transmissive area at each of the sub-pixels differs for each sub-pixel corresponding to a different color.

5. The liquid crystal display according to claim 1, the dimension of the transmissive area at each of the sub-pixels differing according to a position of the sub-pixel within a substrate face of the liquid crystal display panel.

6. The liquid crystal display according to claim 1, the transmissive portion being an opening portion formed in the transflective layer corresponding to each of the sub-pixels.

7. The liquid crystal display according to claim 6,
the opening portion comprising opening parts of generally the same dimension, wherein a number of opening parts depends on the dimension of the transmissive area at the sub-pixels.

8. The liquid crystal display according to claim 1, the transflective layer having the transmissive portion formed such that an area along at least one side of a plurality of sides defining each sub-pixel serves as the transmissive area.

9. A liquid crystal display, serving as a transflective liquid crystal display which performs displaying by switching between a transmissive mode and a reflective mode, comprising:
a liquid crystal layer sandwiched between an upper substrate and a lower substrate opposing one another;
a transflective layer which has a transmissive area that transmits light and a reflective area that reflects incident light from an upper substrate side, and which is disposed on an inner side of the lower substrate;
a color filter disposed on an upper side of the transflective layer, upon which a plurality of pigment layers with different colors according to each of sub-pixels forming a display area are arrayed; and
an illumination device providing illumination light and disposed on an outer side of the lower substrate;
the pigment layers being formed over an entirety of an area overlapping the transmissive area in a planar manner and an area overlapping the reflective area in a planar manner, and at least one color pigment layer not being formed at a part of an area overlapping the reflective area in a planar manner;
and a dimension of a pigment layer formation area, where the pigment layers are formed, the dimension being different between at least one color pigment layer out of the plurality of pigment layers of differing colors and another color pigment layer;
each sub-pixel having outer edges, the transflective layer including a reflective area for each sub-pixel, each reflective area having an edge disposed at at least one of the edges of the corresponding sub-pixel.

10. The liquid crystal display according to claim 9, the pigment layers comprising a red layer, a green layer, and a blue layer, and the dimension of the pigment layer formation area being formed so as to be smaller for the green layer than for the red layer and blue layer.

11. The liquid crystal display according to claim 9, further comprising a transparent film for smoothing a step between the pigment layer formation area and the area where the pigment layers are not provided.

12. The liquid crystal display according to claim 9, the transmissive area is formed of window-like openings in the transflective layer.

13. The liquid crystal display according to claim 9, band-shaped transparent electrodes being disposed on the inner side of the lower substrate, and the transmissive area of a band shape being formed in the transflective layer by having a transparent electrode pattern width that is formed wider than a transflective layer pattern width.

14. The liquid crystal display according to claim 10, the transflective layer being formed of at least one of aluminum and an aluminum alloy, and the pigment layer containing the blue layer, and the dimension of the pigment layer formation area being provided so as to be smaller for the blue layer than for the red layer.

15. The liquid crystal display according to claim 10, the transflective layer being formed of at least one of silver and a silver alloy, and the pigment layer containing the red layer and the blue layer, and the dimension of the pigment layer formation area being provided so as to be smaller for the red layer than for the blue layer.

16. The liquid crystal display according to claim 9, the color properties of the color filter being adjusted by changing the dimension of the pigment layer formation area.

17. A liquid crystal display, serving as a transflective liquid crystal display which performs displaying by switching between a transmissive mode and a reflective mode, comprising:

a liquid crystal display panel formed of a liquid crystal layer sandwiched between an upper substrate and lower substrate opposing each other, and including pixels that have a plurality of sub-pixels each corresponding to different colors and form a display area; and an illumination device provided to an opposite side of the liquid crystal display panel in relation to an observation side that illuminates the liquid crystal display panel with illumination light;

a transflective layer disposed on an opposite side of the liquid crystal layer in relation to the observation side; and a color filter provided above the transflective layer with a plurality of pigment layers of different colors corresponding to each of the sub-pixels arrayed thereupon, that transmits light of a wavelength corresponding to a color of the sub-pixel;

the transflective layer including a transmissive area that transmits light and a reflective area that reflects incident light from an upper substrate side;

and a transmissive area of at least one sub-pixel of the plurality of sub-pixels having a first dimension and a transmissive portion at another sub-pixel having a second dimension, the first and the second dimensions differing to provide compensation for irregularities of spectral properties of the illumination light;

and at least one color pigment layer is formed over an entirety of an area overlapping the transmissive area in a planar manner and an area overlapping the reflective area in a planar manner, and at least one color pigment layer not being formed at a part of an area overlapping the reflective area in a planar manner;

and a dimension of a pigment layer non-formation area where the pigment layer is not formed at least at one sub-pixel of the plurality of sub-pixels and the dimension of a pigment layer non-formation area at another sub-pixel, differ.

18. An electronic apparatus, comprising the liquid crystal display according to claim 1.

19. An electronic apparatus, comprising the liquid crystal display according to claim 9.

20. The liquid crystal display according to claim 1, the first and second dimensions providing compensation for irregularities of spectral properties of the illumination light by being different.

21. The liquid crystal display according to claim 9, the dimension of at least one color pigment layer and another color pigment layer providing compensation for irregularities of spectral properties of the illumination light by being different.

22. A liquid crystal display, comprising:

a first substrate;

a second substrate opposing the first substrate;

a liquid crystal layer sandwiched between first and second substrates;

a first color filter layer having outer edges that define a first sub-pixel, the first color filter layer transmitting light in a first color;

a second color filter layer having outer edges that define a second sub-pixel, the second color filter layer transmitting light in a second color different from the first color;

an illumination device provided to an opposite side of the second substrate than the liquid crystal layer; and a transflective layer including:

a first reflecting area that reflects light incident from the first substrate, the first reflecting area including an outer edge substantially aligned with at least one of the outer edges of the first color filter;

a second reflecting area that reflects light incident from the first substrate, the second reflecting area including an outer edge substantially aligned with at least one of the outer edges of the second color filter;

a first transmissive area located at the first sub-pixel, the first transmissive area transmitting light therethrough; and a second transmissive area located at the second sub-pixel, the second transmissive area transmitting light therethrough and being a different size than the first transmissive area.

23. The liquid crystal display as claimed in claim 22, wherein:

the first transmissive area includes two apertures, the second transmissive area includes two apertures, the first color filter layer includes a non-formation area disposed, as viewed in plan, between the two apertures of the first transmissive area, and the second color filter layer includes a non-formation area disposed, as viewed in plan, between the two apertures of the second transmissive area.

24. The liquid crystal display as claimed in claim 22, wherein:

the first and second color filter layers are disposed in between the liquid crystal layer and the second substrate and the transflective layer is disposed in between the first and second color filter layers on one side and the second substrate on the other.

25. A liquid crystal display, comprising:
a first substrate;
a second substrate opposing the first substrate;
a liquid crystal layer sandwiched between first and second substrates;
a first color filter layer having outer edges that define a first sub-pixel, the first color filter layer including:
 a first color portion that selectively transmits light in a first color; and
 a first transmission portion that transmits light in the first color and in colors other than the first color;
a second color filter layer having outer edges that define a second sub-pixel, the second color filter layer including:
 a second color portion that transmits light in a second color different from the first color; and
a second transmission portion that transmits light in the second color and in colors other than the second color, the second transmission portion being a different size than the first transmission portion;
an illumination device provided to an opposite side of the second substrate than the liquid crystal layer; and
transflective layer including:
 a first reflecting area that reflects light incident from the first substrate, the first reflecting area overlapping the first color filter layer as viewed in plan, the first reflecting area including an outer edge substantially aligned with at least one of the outer edges of the first color filter;
 a second reflecting area that reflects light incident from the first substrate, the second reflecting area overlapping the second color filter layer as viewed in plan, the second reflecting area including an outer edge substantially aligned with at least one of the outer edges of the second color filter;
 a first transmissive area that transmits light therethrough, the first transmissive area being located at the first sub-pixel in overlap with the first color portion of the first color layer as viewed in plan; and
 a second transmissive area that transmits light therethrough, the second transmissive area being located at the second sub-pixel in overlap with the second color portion of the second color layer, the second transmissive area being a different size than the first transmissive area.

26. The liquid crystal display as claimed in claim 25, wherein:
the first transmissive area includes two apertures,
the second transmissive area includes two apertures,
the first transmission portion of the first color filter layer is disposed, as viewed in plan, between the two apertures of the first transmissive area, and
the second transmission portion of the color filter layer is disposed, as viewed in plan, between the two apertures of the second transmissive area.

27. The liquid crystal display as claimed in claim 25, wherein:
the first and second color filter layers are disposed in between the liquid crystal layer and the second substrate and
the transflective layer is disposed in between the first and second color filter layers on one side and the second substrate on the other.

28. A liquid crystal display, comprising:
a first substrate;
a second substrate opposing the first substrate;
a liquid crystal layer sandwiched between first and second substrates;
a first color filter layer of a first sub-pixel, the first color filter layer transmitting light in a first color;
a second color filter layer of a second sub-pixel, the second color filter layer transmitting light in a second color different from the first color;
an illumination device provided to an opposite side of the second substrate than the liquid crystal layer; and
a transflective layer disposed between the liquid crystal layer and the illumination device, the transflective layer including:
 a first reflecting area that reflects light incident from the first substrate, the first reflecting area having an elongated shape that extends substantially from one end of the first sub-pixel to the other;
 a second reflecting area that reflects light incident from the first substrate, the second reflecting area having an elongated shape that extends substantially from one end of the second sub-pixel to the other, the second reflecting area being wider than the first reflecting area; and
 a first transmissive area located in between the first and second reflecting areas.

* * * * *